(12) United States Patent
Oshima et al.

(10) Patent No.: US 6,688,789 B2
(45) Date of Patent: Feb. 10, 2004

(54) FLUORESCENT SUBSTANCE, FLUORESCENT COMPOSITION, FLUORESCENT MARK CARRIER AND OPTICAL READER THEREFOR

(75) Inventors: Toshio Oshima, Osaka (JP); Yukinori Yamada, Toride (JP); Shoji Saibara, Toride (JP); Takanori Kamoto, Takatsuki (JP); Tomio Nabeshima, Suita (JP)

(73) Assignee: Hitachi Maxell, Ltd., Osaka (JP)

( * ) Notice: Subject to any disclaimer, the term of this patent is extended or adjusted under 35 U.S.C. 154(b) by 217 days.

(21) Appl. No.: 09/855,545

(22) Filed: May 16, 2001

(65) Prior Publication Data

US 2001/0031163 A1 Oct. 18, 2001

Related U.S. Application Data

(62) Division of application No. 09/265,988, filed on Mar. 11, 1999, now Pat. No. 6,303,929, which is a division of application No. 08/553,667, filed as application No. PCT/JP95/00463 on Mar. 17, 1995, now Pat. No. 5,932,139.

(30) Foreign Application Priority Data

| Mar. 17, 1994 | (JP) | 6-73998 |
| Mar. 25, 1994 | (JP) | 6-79572 |
| May 2, 1994 | (JP) | 6-115991 |
| Jul. 25, 1994 | (JP) | 6-172716 |
| Aug. 24, 1994 | (JP) | 6-199657 |
| Sep. 14, 1994 | (JP) | 6-246986 |
| Sep. 26, 1994 | (JP) | 6-256309 |

(51) Int. Cl.$^7$ .................................. B41J 31/00
(52) U.S. Cl. ............. 400/241; 400/241.1; 428/488.1; 428/690
(58) Field of Search ............ 400/241, 242, 400/241.1, 241.4; 101/491, 483; 347/241, 234; 428/484, 488.1, 690, 913, 914

(56) References Cited

U.S. PATENT DOCUMENTS

| 3,180,988 A | 4/1965 | Burkhardt et al. |
| 3,666,946 A | 5/1972 | Trimble |
| 4,003,021 A | 1/1977 | Sasaki et al. |

(List continued on next page.)

FOREIGN PATENT DOCUMENTS

| DE | 2750321 | 5/1978 |
| EP | 0115236 | 8/1984 |
| EP | 0256922 | 2/1988 |
| EP | 463586 A2 | 1/1992 |
| EP | 498366 A2 | 8/1992 |
| EP | 0524349 A | 1/1993 |
| EP | 0581622 | 2/1994 |
| FR | 2464292 | 3/1981 |
| FR | 2509319 | 1/1983 |
| GB | 1175573 | 12/1969 |
| GB | 2013233 | 8/1979 |
| GB | 2194244 | 3/1988 |
| JP | 5050820 | 5/1975 |

(List continued on next page.)

OTHER PUBLICATIONS

Kvantovaya Elektron. (Moscow) (1988); 15(2), 321–4 Coden:KVEKA3;ISSN:0368–7147, 1988 (Abstract).
Taylor et al. (1968), J.Inorg.Nucl.Chem., vol. 30, pp. 1503–1511.
Kapoor et al. (1987) Synth.React.Inorg.Met.Org.Chem., 7(5) pp. 507–523.

*Primary Examiner*—Stephen R. Funk
(74) *Attorney, Agent, or Firm*—Birch, Stewart, Kolasch & Birch, LLP

(57) ABSTRACT

An inked ribbon containing a tape-like carrier deposited with a fluorescent composition that contains a fluorescent substance containing at least one of Nd and Yb as an optical active element and, other than this optical active element, at least one oxide of one of Mo and W and an alkaline earth metal, which fluorescent substance is dispersed and retained in an organic binder, wherein the organic binder is a mixture of wax and resin, and wherein the fluorescent substance has an average particle size of not more than 1 micron.

10 Claims, 42 Drawing Sheets

U.S. PATENT DOCUMENTS

| | | | |
|---|---|---|---|
| 4,149,989 A | 4/1979 | Kashiwada et al. | |
| 4,202,491 A | 5/1980 | Suzuki | |
| 4,275,299 A | 6/1981 | Favre | |
| 4,445,225 A | 4/1984 | White | |
| 4,452,843 A | 6/1984 | Kaule et al. | |
| 4,540,595 A | 9/1985 | Acitelli et al. | |
| 4,657,697 A * | 4/1987 | Chiang | 252/301.35 |
| 4,721,860 A | 1/1988 | Troendle | |
| 4,742,220 A | 5/1988 | Beyor | |
| 4,762,639 A | 8/1988 | Kasenga et al. | |
| 4,816,344 A * | 3/1989 | Chiang | 428/483 |
| 4,924,088 A | 5/1990 | Carman et al. | |
| 4,983,817 A | 1/1991 | Dolash et al. | |
| 5,149,139 A | 9/1992 | Kaule | |
| 5,164,584 A | 11/1992 | Wilke, Jr. et al. | |
| 5,210,411 A | 5/1993 | Oshima et al. | |
| 5,292,855 A | 3/1994 | Krutak et al. | |
| 5,313,193 A | 5/1994 | Dubois et al. | |
| 5,380,992 A | 1/1995 | Damen et al. | |
| 5,478,381 A | 12/1995 | Ohiwa et al. | |
| 5,569,531 A * | 10/1996 | Ohiwa et al. | 428/323 |
| 5,611,958 A | 3/1997 | Takeuchi et al. | |
| 5,665,151 A | 9/1997 | Escano et al. | |
| 5,667,317 A * | 9/1997 | Tan | 400/197 |

FOREIGN PATENT DOCUMENTS

| | | | |
|---|---|---|---|
| JP | 5263032 | 5/1977 | |
| JP | 5064598 | 1/1978 | |
| JP | 54002284 | 1/1979 | |
| JP | 5441286 | 4/1979 | |
| JP | 5422326 | 8/1979 | |
| JP | 54033634 | 8/1979 | |
| JP | 55115163 | 4/1980 | |
| JP | 57108189 | 7/1982 | |
| JP | 58140875 | 8/1983 | |
| JP | 6083184 A | 5/1985 | |
| JP | 6029996 | 7/1985 | |
| JP | 6118231 | 5/1986 | |
| JP | 62278684 | 12/1987 | |
| JP | 02173181 | 7/1990 | |
| JP | 02199633 | 8/1990 | |
| JP | 04189892 | 7/1992 | |
| JP | 520512 | 1/1993 | |
| JP | 06333127 | 12/1994 | |
| JP | 07090266 | 4/1995 | |
| JP | 2001-246861 * | 9/2001 | B41M/5/30 |
| WO | 8604347 | 7/1986 | |

* cited by examiner

Fig.9

| | Nd$_2$O$_3$ | Yb$_2$O$_3$ | Er$_2$O$_3$ | Gd$_2$O$_3$ | Y$_2$O$_3$ | La$_2$O$_3$ | Li$_2$CO$_3$ | NH$_4$H$_2$PO$_4$ | LiH$_2$PO$_4$ |
|---|---|---|---|---|---|---|---|---|---|
| Sample 1 | 3.5 | 4.0 | — | — | 17.5 | — | — | — | 65.0 |
| Sample 2 | 3.5 | 4.0 | — | 3.6 | 15.3 | — | — | — | 65.0 |
| Sample 3 | 3.5 | 4.0 | — | 3.6 | 15.3 | — | — | 10.0 | 51.0 |
| Sample 4 | 0.8 | — | — | — | 21.5 | — | — | — | 65.0 |
| Sample 5 | 0.8 | — | — | — | 15.3 | 9.8 | — | — | 65.0 |
| Sample 6 | 0.8 | — | — | 24.5 | — | 9.8 | — | — | 65.0 |
| Sample 7 | — | 2.5 | — | — | 12.7 | — | — | — | 65.0 |

Charge Stocks (g)

Fig.10

| | Charge Stocks (g) | | | | | | | | | |
|---|---|---|---|---|---|---|---|---|---|---|
| | $Nd_2O_3$ | $Yb_2O_3$ | $Er_2O_3$ | $Gd_2O_3$ | $Y_2O_3$ | $La_2O_3$ | $Li_2CO_3$ | $NH_4H_2PO_4$ | $LiH_2PO_4$ |
| Sample 8 | — | 2.5 | — | 16.8 | — | — | — | — | 65.0 |
| Sample 9 | — | 7.4 | 0.1 | — | 9.8 | — | — | — | 65.0 |
| Sample 10 | — | — | 0.1 | — | 6.7 | — | — | — | 65.0 |
| Sample 11 | 15.2 | — | — | — | — | — | — | 10.4 | 46.8 |
| Sample 12 | 7.6 | — | — | — | — | 7.3 | — | 10.4 | 46.8 |
| Sample 13 | 6.8 | 7.8 | — | — | — | — | — | 10.4 | 46.8 |
| Sample 14 | — | — | 0.1 | — | 6.7 | — | — | 10.4 | 46.8 |
| Sample 15 | 30.0 | 4.0 | — | — | — | — | 11.0 | 14.0 | — |

Fig.11

| | Calcin. Temp.(°C) | Infrared-Excitable Fluorescent Substance | Particle Size ($\mu$m) |
|---|---|---|---|
| Sample 1 | 700°C | $Nd_{0.1}Yb_{0.1}Y_{0.8}PO_4$ | 0.6 |
| Sample 2 | 750°C | $Nd_{0.1}Yb_{0.1}Gd_{0.1}Y_{0.7}PO_4$ | 0.8 |
| Sample 3 | 670°C | $Nd_{0.1}Yb_{0.1}Gd_{0.1}Y_{0.7}PO_4$ | 0.4 |
| Sample 4 | 850°C | $Nd_{0.02}Y_{0.98}PO_4$ | 2.6 |
| Sample 5 | 750°C | $Nd_{0.02}La_{0.3}Y_{0.68}PO_4$ | 1.0 |
| Sample 6 | 700°C | $Nd_{0.02}La_{0.3}Gd_{0.68}PO_4$ | 3.3 |
| Sample 7 | 750°C | $Yb_{0.1}Y_{0.9}PO_4$ | 1.0 |

Fig.12

| | Calcin. Temp.(°C) | Infrared-Excitable Fluorescent Substance | Particle Size ($\mu$m) |
|---|---|---|---|
| Sample 8 | 850°C | $Yb_{0.1}Gd_{0.9}PO_4$ | 3.5 |
| Sample 9 | 750°C | $Yb_{0.3}Er_{0.005}Y_{0.695}PO_4$ | 0.9 |
| Sample 10 | 750°C | $Er_{0.005}Y_{0.995}PO_4$ | 0.9 |
| Sample 11 | 700°C | $LiNdP_4O_{12}$ | 1.2 |
| Sample 12 | 700°C | $LiNd_{0.5}La_{0.5}P_4O_{12}$ | 1.0 |
| Sample 13 | 700°C | $LiNd_{0.9}Yb_{0.1}P_4O_{12}$ | 1.5 |
| Sample 14 | 700°C | $LiEr_{0.005}Y_{0.995}P_4O_{12}$ | 1.5 |
| Sample 15 | 750°C | $LiNd_{0.9}Yb_{0.9}P_4O_{12}$ | 6.0 |

Fig.16

| | Fluorescent Substance | $Er_2O_3$ | $Y_2O_3$ | $Gd_2O_3$ | $La_2O_3$ | $Fe_2O_3$ | $Al_2O_3$ | $Gd_2O_3$ | LiF | Calcinating Condition |
|---|---|---|---|---|---|---|---|---|---|---|
| Sample 16 | $Er_{0.2}Y_{2.8}Fe_{1.5}Al_{3.5}O_{12}$ | 32.4 | 265.8 | – | – | 100.8 | 150.0 | – | 5.4 | 1200°C, 4hr |
| Sample 17 | $Er_{0.5}Y_{2.5}Fe_{1.5}Ga_{3.5}O_{12}$ | 81.0 | 237.3 | – | – | 100.8 | – | 275.8 | 5.4 | 1200°C, 4hr |
| Sample 18 | $Er_{0.2}Gd_{2.8}Fe_{2.5}Al_{2.5}O_{12}$ | 32.4 | – | 380.9 | – | 168.0 | 107.1 | – | 5.4 | 1200°C, 4hr |
| Sample 19 | $Er_{0.05}La_{0.95}Fe_{0.3}Al_{0.3}O_3$ | 19.1 | – | – | 309.5 | 47.9 | 71.4 | – | 20.9 | 1200°C, 4hr |
| Sample 20 | $Er_{0.02}La_{0.96}Fe_{0.1}Ga_{0.3}O_3$ | 7.7 | – | – | 319.3 | 16.0 | – | 168.7 | 20.9 | 1200°C, 4hr |

|  | $Y_2O_3$ | $Yb_2O_3$ | $A_2O_3$ | $Gd_2O_3$ | $Ga_2O_3$ | LiF |
|---|---|---|---|---|---|---|
| Sample 21 | 91.5 | 17.7 | 76.5 | — | — | 7.8 |
| Sample 22 | — | 11.8 | 68.9 | 48.9 | 14.0 | 7.8 |
| Sample 23 | 88.1 | 23.6 | — | — | 14.1 | 7.8 |
| Sample 24 | 131.9 | 17.6 | 45.9 | — | — | 23.4 |
| Sample 25 | 139.2 | 8.8 | 41.3 | — | 8.5 | 23.4 |

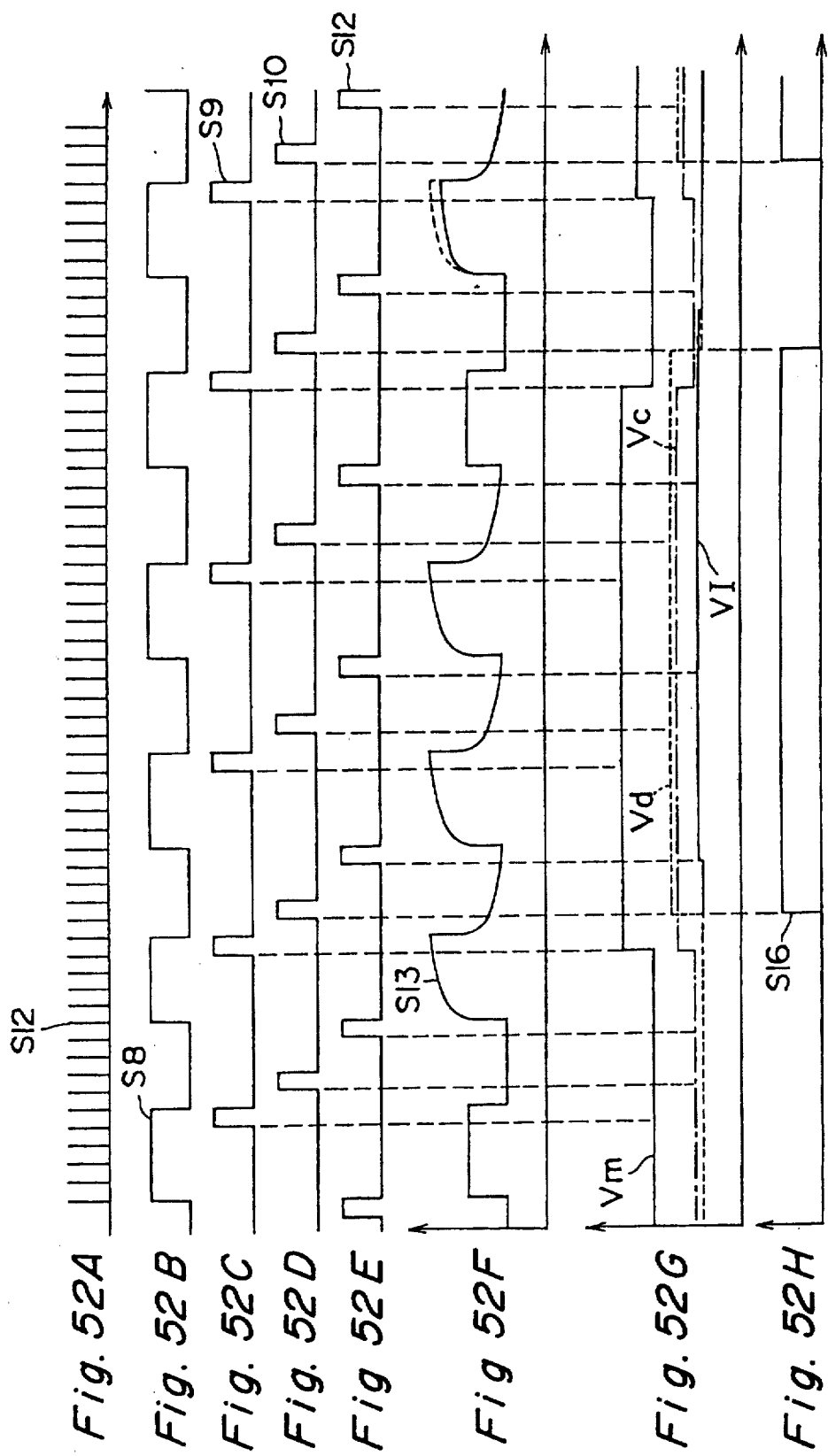

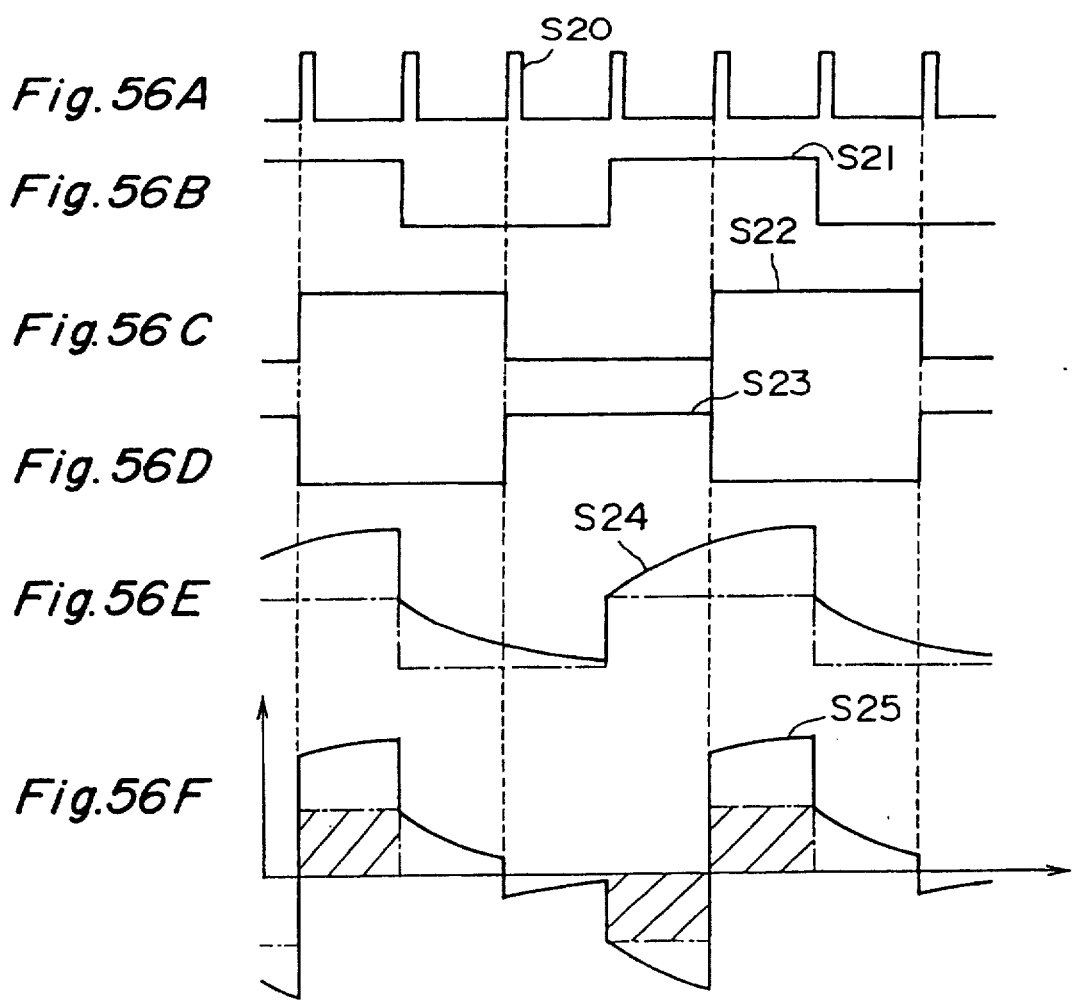
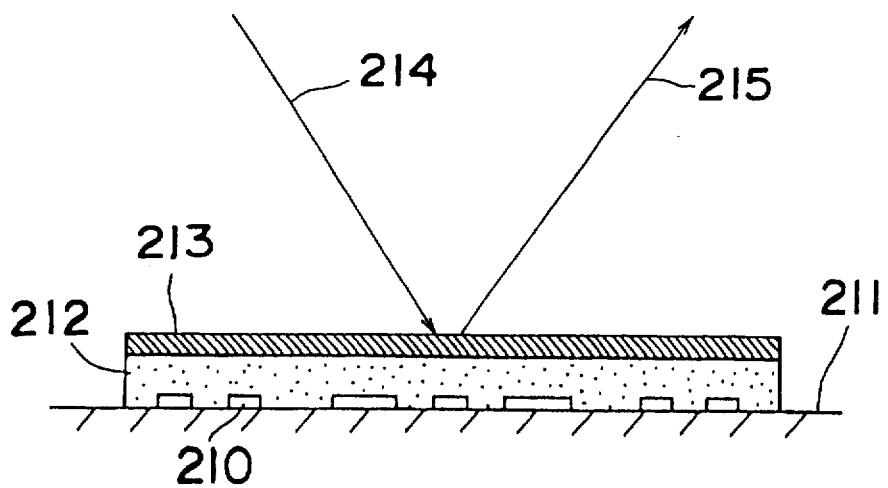

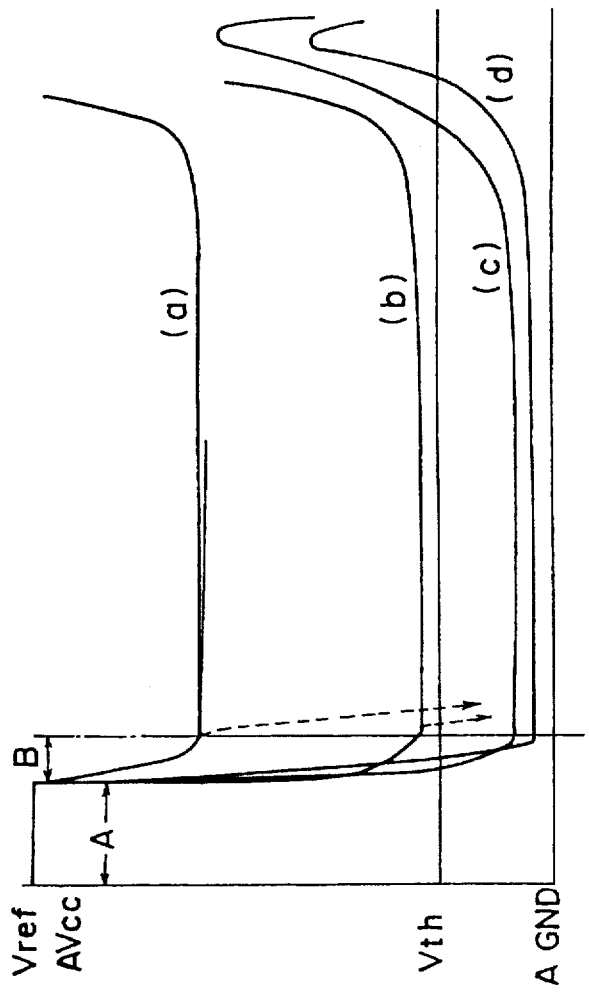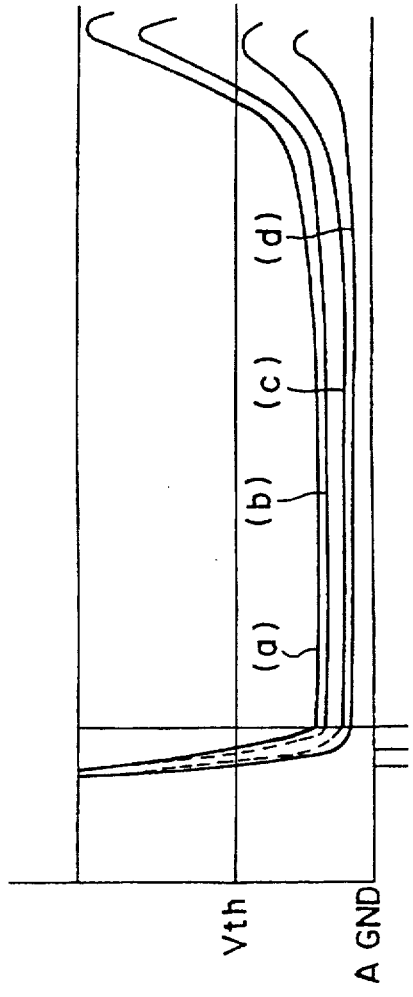
Fig. 61A
Fig. 61B

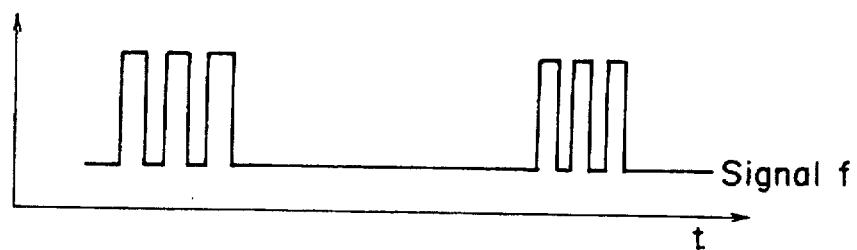
Fig. 68A — Signal f
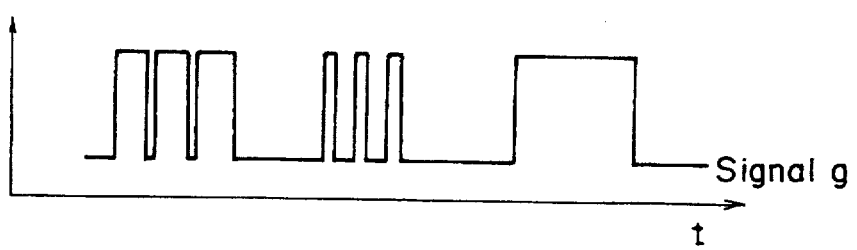
Fig. 68B — Signal g
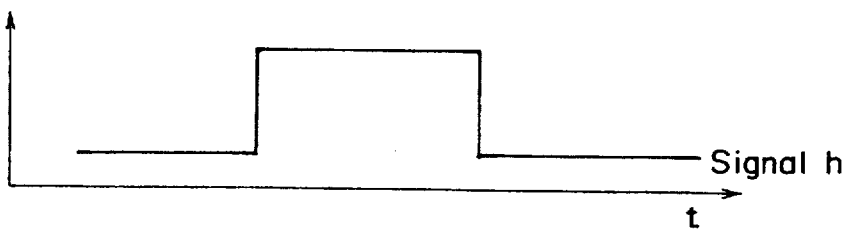
Fig. 68C — Signal h
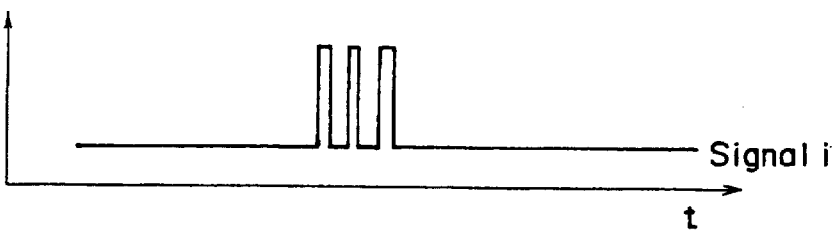
Fig. 68D — Signal i
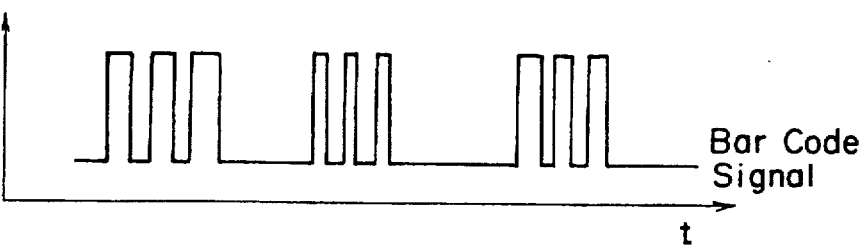
Fig. 68E — Bar Code Signal

FLUORESCENT SUBSTANCE, FLUORESCENT COMPOSITION, FLUORESCENT MARK CARRIER AND OPTICAL READER THEREFOR This application is a divisional of application Ser. No. 09/265,988, filed on Mar. 11, 1999, now U.S. Pat. No. 6,303,929, which is a divisional of application Ser. No. 08/553,667, filed on Nov. 17, 1995, now U.S. Pat. No. 5,932,139, which issued on Aug. 3, 1999; and for which priority is claimed under 35 U.S.C. §120. Application Ser. No. 08/553,667 is the national phase of PCT International Application No. PCT/JP95/00463 filed on Mar. 17, 1995 under 35 U.S.C. §371. The entire contents of each of the above-identified applications are hereby incorporated by reference. This application also claims priority of Application 6-73998; 6-79572; 6-115991; 6-172716; 6-199657; 6-246986 and 6-256309 filed in Japan on Mar. 17, 1994; Mar. 25, 1994; May 2, 1994; Jul. 25, 1994; Aug. 24, 1994; Sep. 14, 1994 and Sep. 26, 1994, respectively, under 35 U.S.C. §119.

FIELD OF TECHNOLOGY

The present invention relates to a fluorescent substance excellent in light emission, a method of preparing the fluorescent substance, a fluorescent composition such as, for example, an inking medium for use in an ink jet printer, containing the fluorescent substance, a fluorescent mark carrier such as, for example, postal envelopes, postal cards or postal parcels having a fluorescent mark formed by printing the fluorescent composition, and an optical reader and an optical reading system both operable to optically read the fluorescent mark at a high speed.

BACKGROUND ART (Prior Art 1)

In various fields of industries including the distribution industry, bar codes are widely utilized to control the physical distribution of commodities. The bar codes are also utilized having been printed on various cards such as, for example, pre-paid cards, commutation cards and data cards. These bar codes are read by an optical reader such as, for example, an optical scanner which subsequently processes information represented by the bar codes. Most bar codes carried by surfaces of commodities or cards are in the form of a pattern of stripes printed by the use of a black inking medium against a white background and visible to human eyes under visible rays of light. This visible mark is printed directly on merchandise or printed on a shaped sheet-like carrier which is in turn affixed to merchandise.

On the other hand, attempts have been made to form a mark such as a bar code by the use of a fluorescent substance capable of emitting an infrared region of light so that the fluorescent mark can be identified by an optical reader. While the fluorescent mark is generally invisible to the human eyes, the fluorescent mark emits a fluorescent light when the fluorescent substance contained therein is excited upon irradiation of an external light of a particular wavelength and, therefore, by analyzing the fluorescent light with an optical reader, information represented by the fluorescent mark can be decoded or identified. Even the fluorescent mark is, as is the case with the visible mark, printed directly on merchandise or printed on a shaped sheet-like carrier which is in turn affixed to merchandise.

As compared with the system in which change in intensity of light reflected from the visible mark is read in handling merchandise, a system for handling merchandise, including an optical reader for reading the fluorescent mark, has numerous advantages, some of which are listed below.

(1) Reading of the fluorescent mark is seldom affected adversely by the color of the merchandise and, therefore, the reliability in reading the fluorescent mark is high with the reading error minimized.

(2) Even though the surface on which the fluorescent mark is formed becomes dirty, infrared rays of light emitted from the fluorescent mark has such a long wavelength that the reading error would seldom occur and the reliability is therefore high.

(3) Since the fluorescent substance is substantially colorless under visible rays of light, printing of the fluorescent mark on the merchandise will bring no adverse effect on the aesthetic appearance of the merchandise.

(4) Since the fluorescent substance is so invisible under visible rays of light that no one can recognize the presence of the fluorescent substance, it can provide security of information.

Particulars of interest in this connection are disclosed in, for example, the Japanese Patent Publications No. 55-33837, No. 60-29996 and No. 62-24024.

(Prior Art 2)

The fluorescent mark discussed above is formed by printing a fluorescent inking medium containing a fluorescent substance on a carrier such as, for example, a surface of the merchandise in a predetermined pattern. An infrared fluorescent inking medium has long been known and is disclosed in, for example, the U.S. Pat. No. 4,202,491. The infrared fluorescent inking medium disclosed therein is prepared from an inorganic fluorescent substance containing one or a mixture of neodymium (Nd), ytterbium (Yb) and erbium (Er). The inorganic fluorescent substance which utilizes Nd as an optically active element is known to emit a fluorescent light having a maximum intensity at about 1,050 nm in wavelength when irradiated with an exciting light of 800 nm emitted by a GaAlAs light emitting diode. The inorganic fluorescent substance containing a mixture of Nb and Yb as an optically active element is known to emit a fluorescent light having a maximum intensity at about 980 nm in wavelength when irradiated with an exciting light of 800 nm emitted by a GaAlAs light emitting diode. Similarly, the inorganic fluorescent substance containing a mixture of Yb and Er as an optically active element is known to emit a fluorescent light having a maximum intensity at about 1,050 nm in wavelength when irradiated with an exciting light of 940 nm emitted by a GaAs light emitting diode, and the inorganic fluorescent substance containing a mixture of Nd, Yb and Er as an optically active element is known to emit a fluorescent light having a maximum intensity at about 1,050 nm in wavelength when irradiated with an exciting light of 800 nm emitted by a GaAlAs light emitting diode.

(Prior Art 3)

The fluorescent substance disclosed in, for example, the Japanese Patent Publication No. 56-4598 makes use as the optically active element of Nd having a high absorption characteristic with respect to the infrared region of light, in combination with a fluorescent material capable of exhibiting a high intensity of light emission such as, for example, an alkaline metal salt (for example, $Na_2MoO_4$ or the like) which is material for the matrix having a high efficiency of transmission of exciting energies from the optically active element to the emission center, or Yb having an emission center capable of favorably matching in wavelength with a Si photodetector.

(Prior Art 4)

For example, the Japanese Patent Publications No. 54-22326 and No. 61-18231 disclose a method of detecting the presence or absence of the fluorescent mark. In this known method, the fluorescent mark is prepared by the use of a fluorescent substance which emits a fluorescent light when irradiated with an exciting light within the infrared region of wavelength. This known method utilizes the difference between the center wavelength of the exciting light projected onto the fluorescent mark and that of the fluorescent light emitted from the fluorescent substance as a result of the irradiation of the exciting light and, for this purpose, only the fluorescent light is separated by an optical filter from rays of light reflected from the fluorescent mark so that the presence or absence of the fluorescent mark can be eventually detected.

The applicant has suggested a method of and an apparatus for detecting the position of a fluorescent mark by intermittently irradiating the fluorescent marking with the exciting light and then detecting the presence or absence of afterglow emitted from the fluorescent marking during the intermission of irradiation of the exciting light. (See, for example, the Japanese Laid-open Patent Publication No. 5-20512.) (Prior Art 5)

FIG. 70 illustrates the prior art optical reading apparatus. The fluorescent mark shown therein is in the form of a fluorescent bar code 401 comprised of a pattern of parallel bars formed by printing the fluorescent inking medium on a sheet-like carrier 404 such as, for example, a label. The fluorescent inking medium used to form the bar code 401 contains fluorescent microparticles dispersed and retained in a binder, said fluorescent microparticles being of a kind which emit, when excited by an exciting light of a particular wavelength, for example, infrared rays of light 402, a fluorescent light 403 of a wavelength different from that of the infrared rays of light 402.

An optical reading apparatus for reading information from the fluorescent bar code 401 includes a light emitter 405 for emitting the infrared rays of light 402, a light receiver 407 for detecting the fluorescent light 403 from the bar code 401 and rays of light 406 reflected from the carrier 404 and for converting them into an electric signal, an amplifier 408 for amplifying the electric signal and for outputting an analog reproduction signal, and a signal detector 409 for detecting from the analog reproduction signal of the amplifier 408 information represented by the bar code 401. The signal detector 409 used therein includes an analog-to-digital (A/D) converter which is operable to digitize the analog reproduction signal so that the information represented by the fluorescent bar code 401 can be reproduced.

For digitization of the analog reproduction signal, a comparator is generally utilized, having an input stage which is adapted to receive the analog reproduction signal A and a slice signal B of a predetermined level shown in FIG. 66 so that the analog reproduction signal A can be sliced by the slice signal B to provide a digitized signal.

(Problem 1)

In the various fluorescent substances and the various fluorescent marks formed by printing the fluorescent inking media containing the respective fluorescent substances, both having hitherto been suggested, neither the relationship between the particle size of the particular fluorescent substance and the wavelength of the exciting light used nor the relationship between the particle size of the particular fluorescent substance and the wavelength of the fluorescent light emitted by such particular fluorescent substance has been taken into consideration. The conventional fluorescent substance has a particle size as relatively large as 5 to 6 μm. On the other hand, for a light source for exciting the fluorescent substance, a semiconductor laser, for example, is generally utilized, capable of emitting a laser beam of about 0.8 μm in wavelength while the fluorescent light emitted from the conventional fluorescent substance has a wavelength of about 1 μm.

As discussed above, the conventional fluorescent particles have a relatively great particle size, i.e., a particle size as great as about 5 to 7.5 times the wavelength of any one of the exciting light and the fluorescent light. For this reason, if the fluorescent mar is prepared by the use of the fluorescent inking medium containing the fluorescent particles of that particle size, the fluorescent particles are deposited in such an overlapping relation that the exciting light projected towards a deposit of the fluorescent inking medium will not reach some of the fluorescent particles at a deep region of the deposit of the fluorescent inking medium, and for this reason, the efficiency of activation (excitation) of the fluorescent substance is lowered.

Even if some of the fluorescent particles at the deep region of the deposit of the fluorescent inking medium are excited to emit a fluorescent light, the fluorescent light so emitted tends to be partly intercepted by other fluorescent particles residing over such some of the fluorescent particles within the deposit of the inking medium, with the intensity of the fluorescent light consequently lowered. Consequently, the fluorescent light of such a low intensity often creates a problem associated with the reliability in detecting the presence or absence of the fluorescent mark.

Thus, partly because the efficiency of activation (excitation) of the fluorescent substance is low and partly because part of the fluorescent light excited will not emerges outwardly from an exterior surface of the deposit of the fluorescent inking medium and, hence, the intensity of the fluorescent light is consequently low, the prior art fluorescent substance poses a problem associated with the reliability in detecting the presence or absence of the fluorescent mark.

(Problem 2)

The fluorescent substance generally has such a property that when irradiated with the exciting light the fluorescent substance is activated to emit a fluorescent light in a progressively increasing quantity, but in the absence of the exciting light the quantity of the fluorescent light emitted decreases progressively. With the conventional fluorescent substance, the length of time, that is, the rise time, which passes from the start of irradiation of the exciting light upon the fluorescent substance and until the resultant fluorescent light attains a desired intensity is long. For this reason, a high velocity of movement of the fluorescent mark carrier relative to the optical reader cannot be employed, constituting an obstruction to the use of a high speed optical reader. If the relative velocity is increased, information represented by the fluorescent mark will no longer be read accurately and properly.

Although this is related to the relatively long rise time of the fluorescent light referred to above, the conventional fluorescent substance has a length of time (that is, the fall time) which passes from the interruption of irradiation of the exciting light upon the fluorescent substance and until the intensity of the fluorescent afterglow attains zero, that is, until the fluorescent light is no longer detected is long as well. For this reason, where the fluorescent mark consists of a plurality of parallel fluorescent bars, reduction in spacing between each neighboring fluorescent bars will render the light receiving element to detect a fluorescent afterglow emanating from the adjoining fluorescent bar, failing to provide an accurate information reading.

(Problem 3)

Inorganic powdery fluorescent pigments such as Nd, Yb and Er discussed hereinbefore have a relatively large particle size. Although this particle size would pose no problem if the fluorescent particles are tramped down with resin before use, the use of the fluorescent pigment of a relatively large particle size in an inking medium for use with an ink jet printer would, unless the particle size is reduced, result neither in a homogenous and beautiful print, nor in a high resolution during information reading. On the other hand, if the fluorescent particles are finely pulverized with the use of a mill, the fluorescent output would eventually decrease considerably.

The inventors of the present invention have also found that, in addition to the above discussed problems, the inorganic fluorescent pigments bring about an additional problem in that the response of the fluorescent substance to emit the fluorescent light subsequent to receipt of the exciting light is so low that a high speed reading is difficult to achieve.

(Problem 4)

In the Japanese Patent Publication No. 56-4598 referred to above, there is disclosed that the matrix material of the infrared-excitable fluorescent substance contains alkaline metal cations, $Li^+Na^+$, if an anion thereof is chosen $MoO_2^{2-}$ or $WO_4^{2-}$. Since a salt of alkaline metal which is generally a monovalent metal has a relatively weak bond between the anion and the cation because of a small valence sufficient to be easily released to form a hydrate, the alkaline metal salt is water-soluble. Accordingly, the fluorescent substance prepared from the alkaline metal salt as a matrix material is extremely poor in water resistance to such an extent as to result in an obnoxious problem in practical use.

The infrared-excitable fluorescent substance is prepared by weighing, mixing and pressure-forming only the starting materials (for example, $Na_2CO_3$, $MoO_3$, $Nd_2O_3$ and $Yb_2O_3$), incinerating the preformed mixture and subsequently mechanically pulverizing it to provide the powdery fluorescent substance. In such case, the resultant fluorescent particles have a minimum particle size as small as about 5 μm. Although this particle size permits the fluorescent particles to be used as a material for a printing ink medium such as used in, for example, a screen printing technique, the fluorescent particles of this particle size cannot be used as a material for an inking medium for use with an ink jet printer or for use in an inked ribbon. This is because the inking medium for use in the practice of a printing technique requires the fluorescent substance of 1 μm or smaller in particle size, the fluorescent substance of about 5 μm in particle size is not suited as a material for the inking medium that is used with the ink jet printer or in the inked ribbon.

The Japanese Laid-open Patent Publication No. 5-261634 referred to above discloses that the fluorescent substance having its matrix material in the form of a salt of $PO_4$ and activated by Nd and Yb can be used in an inking medium for use in an offset printing technique provided that such fluorescent substance is pulverized to a particle size within the range of 0.1 to 3 μm.

However, the infrared-excitable fluorescent substance of this system has been found that both of the rise time, required for it to emit a fluorescent light of the maximum intensity subsequent to irradiation of infrared rays of light, and the fall time required for the intensity of the fluorescent light to attain zero subsequent to interruption of the infrared irradiation are extremely long, and therefore, it cannot satisfactorily be used where the exciting light is in the form of a pulsating light of short duration and/or where a high speed reading with, for example, a high speed scanner is desired.

The inventors of the present invention, in an attempt to develop an infrared-excitable fluorescent substance having a high response, have examined the use of $Na_2MoO_4$ as a matrix of the infrared-excitable fluorescent substance, but have found that, because $Na_2MoO_4$ is water-soluble, the fluorescent substance having its matrix added with optically active elements has exhibited a poor water resistance. Also, the fluorescent substance obtained had a particle size greater than a few microns and have therefore been found not suited for use as a material for the ink jet printer or the inked ribbon or in a printing technique such as an offset printing process.

(Problem 5)

Hitherto, in preparing a fluorescent composition such as, for example, the inking medium for use with an ink jet printer and containing fluorescent particles, none of the particle size of the fluorescent substance used, the density of the fluorescent substance and/or the density of a binder used, and the relationship among viscosity, surface tension, specific resistance and pH value has not taken into consideration. For this reason, the fluorescent particles contained in the fluorescent composition have such problems that the fluorescent particles are apt to sediment in the fluorescent composition, exhibiting an unsatisfactory dispersion stability, that the fluorescent composition tends to run during the printing and/or that the fluorescent output is low.

(Problem 6)

In the prior art fluorescent inking medium containing the fluorescent particles, the fluorescent substance is employed in a quantity generally within the range of 30 to 85 wt % relative to the total weight of the inking medium and is in the form of an inorganic compound having a relatively large particle size as discussed hereinabove. The use of the fluorescent substance in such a large quantity brings about such a problem that a fluorescent ink deposit formed by printing the fluorescent inking medium is so raised as to provide a visible indication of the presence of the ink deposit. This is problematic in terms of security particularly when a fluorescent mark is desired to be formed by depositing the inking medium at a location where the ink deposit will not constitute any obstruction to the eyes.

(Problem 7)

With respect to the fluorescent ink deposit formed by the use of the conventional fluorescent inking medium containing the fluorescent particles, no surface roughness of the ink deposit has been studied. Since the fluorescent substance of the relatively large particle size as discussed above has been employed, the surface of the ink deposit is relatively rough, having minute surface irregularities. Irradiation of the exciting light upon the rough-surfaced ink deposit tends to result in scattering of the exciting light upon the surface of the ink deposit, accompanying reduction in quantity of the exciting light penetrating into the fluorescent ink deposit. Also, with the rough-surfaced ink deposit, the fluorescent light emitted internally from the fluorescent ink deposit is apt to scatter in all directions at the surface of the ink deposit and, therefore, the quantity of the fluorescent light received by a light receiving element may be reduced correspondingly.

Once the above discussed phenomenon occurs, an output generated from the light receiving element in response to detection of the fluorescent light emitted from the fluorescent ink deposit is so low as to bring about a problem associated with the reliability in detecting the presence or absence of the fluorescent mark.

(Problem 8)

An optical reading apparatus used in connection with the fluorescent mark is known and includes a semitransparent mirror disposed generally intermediate between the fluorescent mark to be detected and a photoelectric detector assembly inclusive of light emitting and receiving elements. The known optical reading apparatus is so structured that the exciting light emitted from the light emitting element may be projected through the semitransparent mirror onto the fluorescent mark carrier so that the fluorescent light emitted from the fluorescent mark on the carrier can pass through the same semitransparent mirror before it is detected by the light receiving element. With this structure, it has been observed that as the exciting light travels through the semitransparent mirror, generally half of the exciting light may be reflected in directions other than the direction towards the fluorescent mark carrier and/or that as the fluorescent light emitted from the fluorescent mark on the carrier travels through the semitransparent mirror, generally half o the fluorescent light may be reflected in directions other than the direction towards the light receiving element. For this reason, the quantity of the exciting light necessary to activate the fluorescent substance is in practice small and, hence, the quantity of the fluorescent light emitted is correspondingly small and, yet, the light receiving element receives the fluorescent light in a quantity generally half of the actually emitted fluorescent light. Therefore, the light receiving element issues a considerably low output, so low as to bring about a problem associated with the reliability in detecting the fluorescent mark.

(Problem 9)

In the prior art optical reading apparatus, the exciting light emitted from the light emitting element forms a round irradiating pattern of a size sufficient to encompass the size of the bar code forming the fluorescent mark. Irradiation of the round light spot upon the fluorescent mark does not affords a sufficient area of surface to be illuminated and the intensity of the fluorescent light emitted from the fluorescent mark is consequently low. If an attempt is made to increase the size of the round light spot to thereby increase the area of surface to be illuminated, the exciting light will encompass not only the bar code of interest, but also the bar code adjoining such bar code of interest. This in turn brings about reduction in S/N (signal-to-noise) ratio, accompanying a problem associated with the reliability in detecting the fluorescent mark.

(Problem 10)

In designing the prior art optical reading apparatus, neither the rise time of the fluorescent light subsequent to an irradiation of the exciting light, nor the relationship between the width of a slit extending in a direction of transport of the fluorescent mark carrier and the speed of transport of the fluorescent mark carrier is taken into consideration.

Also, neither the fall time of the fluorescent light subsequent to interruption of the exciting light, nor the relationship between the interval between the neighboring bars of the fluorescent mark (i.e., the fluorescent bar code) and the speed of transport of the fluorescent mark carrier is taken into consideration.

Because of the foregoing, no information represented by the fluorescent ink deposit on the fluorescent mark carrier can be read.

(Problem 11)

In the prior art optical reading apparatus, a slit member is interposed between the sheet-like fluorescent mark carrier such as, for example, a paper, and an object lens assembly so that only that portion of the fluorescent light emitted from the fluorescent mark which is desired to be detected is received by the light receiving element through the slit in the slit member. Although this will bring about no problem if the fluorescent mark carrier has a substantially uniform thickness, there is a problem in that, if the fluorescent mark carrier having a relatively great, but irregular thickness is transported, the fluorescent mark carrier being transported may be blocked with its front engaged with the slit and/or the slit will be damaged.

(Problem 12)

The prior art method of detecting the mark such as disclosed in the Japanese Patent Publications No. 54-22326 and No. 61-18231 and the Japanese Laid-open Patent Publications No. 3-16369 and No. 5-20512 all referred to above, is such that the fluorescent light emitted from the fluorescent mark as a result of excitation by the exciting light is detected by a detector. However, the quantity of the fluorescent light incident on the detector considerably varied with change in environments and conditions in and under which the detection is performed and, therefore, in order to secure a high accuracy of detection, a complicated circuit processing is required, or the condition of use is limited.

As a result of studies conducted by the inventors of the present invention in view of the foregoing problems, it has been found that any one of the prior art detecting method is unable to properly and accurately monitor the change in detecting condition because of an insufficient quantity of information available other than data associated with the fluorescent mark.

(Problem 13)

In another prior art method in which an optical filter used to separate the exciting light, which has been reflected, and the fluorescent light from each other, since the wavelength of the emission center of the reflected exciting light and that of the fluorescent light are close to each other and the intensity of the fluorescent light is extremely low as compared with that of the reflected exciting light, the both cannot be properly separated from each other with no difficulty and, in a certain case, most of the reflected exciting light may remain unseparated and enter the light receiving element together with the fluorescent light. Once this occurs, the accuracy of detection is lowered.

(Problem 14)

According to the fluorescent mark detecting method disclosed in, for example, the Japanese Laid-open Patent Publications No. 3-16369 and No. 5-20512 referred to above, if external rays of light of a wavelength matching with or in the vicinity of the wavelength of the fluorescent light exist in the environment in which the fluorescent light is being detected, such rays of light may be sensed by and converted into an electric output by the light receiving element. This leads to generation of false information that, even though no fluorescent light has yet been emitted, the fluorescent light was detected. In order to avoid such false information, both of the site of emission of the exciting light and the site of detection of the fluorescent light are required to be shielded from the external light, thus limiting the environment in which the system is used.

(Problem 15)

In the optical reading apparatus of a structure shown in FIG. 71, both of the level and the amplitude of the analog reproduction signal discussed hereinbefore are considerably affected by physical surface properties of the carrier on which the bar code is formed in the form of the fluorescent mark. More specifically, where the surface of the carrier is made of material having a propensity of absorbing a transparent inking medium and also the exciting light projected from an illuminator unit, the quantity of the fluorescent light emitted from the fluorescent bar code and the quantity of light reflected from the carrier are so small that, as shown in FIG. 71(b), the analog reproduction signal exhibits a low level and a low amplitude.

Also, where the carrier is made of material having a propensity of absorbing the transparent inking medium and also that of reflecting the light projected by the illuminator unit, the analog reproduction signal is apt to offset towards a high level as shown in FIG. 71(c). Moreover, where the carrier is made of material having a propensity of absorbing little transparent inking medium, but absorbing the light projected by the illuminator unit, the analog reproduction signal exhibits an increased amplitude as shown in FIG. 71(a).

Accordingly, with the prior art reading apparatus in which variation in waveform of the analog reproduction signal resulting from difference in type of the carriers on which the fluorescent bar codes are formed is taken into consideration, when the single reading apparatus is used to read one at a time the fluorescent bar codes formed on, for example, the respective carriers made of different materials, or when the reading apparatus is used to read one at a time the fluorescent bar codes formed on different portions of the single carrier which are made of varying materials, a problem is apt to occur in that the bar codes will not be accurately read. This problem may be avoided if an optical filter (a single wavelength filter) operable to cut off the entire light reflected from the carrier is disposed in front of the light receiving element. However, the single wavelength filter is expensive and cannot, in terms of cost, be installed in the optical reading apparatus and, instead, the above discussed problem does often occur since a band-pass filter operable to cut off a portion of the reflected light is generally employed.

Accordingly, a primary object of the present invention is to provide a highly reliable fluorescent substance having a high emissive output, a fluorescent composition, a fluorescent mark carrier, an optical reading apparatus, a merchandise sorting apparatus and a merchandise sorting system all of which are effective to substantially eliminate the above discussed problems inherent in the prior art.

Another important object of the present invention is to provide the fluorescent substance and the fluorescent composition which are effective to substantially eliminate the above discussed problems inherent in the prior art, excellent in durability, fine in particle size suitable for use in various printing techniques such as those employing an ink jet printer or an inked ribbon, and capable of exhibiting a high response.

A further important object of the present invention is to provide an optically detectable mark effective to substantially eliminate the above discussed problems inherent in the prior art and with which change in environmental conditions in which data are being detected can be readily and properly determined.

A still further important object of the present invention is to provide a detecting method and an optical reading apparatus effective to substantially eliminate the above discussed problems inherent in the prior art and capable of accomplishing accurate detection of the position at which the mark is formed, regardless of deterioration in condition in which the fluorescent light emitted from the mark is detected.

A yet further important object of the present invention is to provide the optical reading apparatus effective to substantially eliminate the above discussed problems inherent in the prior art and capable of accomplishing assured detection of the fluorescent mark without being adversely affected by environments in which it is used.

A different important object of the present invention is to provide the reading apparatus effective to substantially eliminate the above discussed problems inherent in the prior art and capable of accurately reading the fluorescent light at all times with no need to use the expensive single wavelength filter and regardless of the waveform of the analog reproduction signal.

DISCLOSURE OF THE INVENTION

The first invention is directed to the fluorescent substance of a kind capable of emitting, in response to irradiation of the exciting light, a fluorescent light of a wavelength different from that of the exciting light and is characterized in that, in order to accomplish the foregoing objects, the average particle size of the fluorescent substance being of super microparticles is smaller than the maximum intensity of the fluorescent light emitted by such fluorescent substance.

The second invention is directed to the fluorescent substance of a kind capable of emitting, in response to irradiation of the exciting light, a fluorescent light of a wavelength different from that of the exciting light and is characterized in that, in order to accomplish the foregoing objects, the average particle size of the fluorescent substance being of ultra-microparticles is smaller than the maximum intensity of the exciting light.

The fluorescent substance according to the third invention is characterized in that, in order to accomplish the foregoing objects, it comprises a salt of oxyacid containing at least one optical active element selected from the group consisting of Nd, Yb and Er, said salt of oxyacid being expressed by, for example, the following general formula (1) or (2):

$$Ln_xA_{1-x}PO_4 \qquad (1)$$

wherein:

Ln represents at least one element selected from the group consisting of Nd, Yb and Er;

A represents at least one element selected from the group consisting of Y, La, Gd, Bi, Ce, Lu, In and Tb; and X represents a value within the range of 0.01 to 0.99.

$$DE_{1-x}Ln_xP_yO_z \qquad (2)$$

wherein:

D represents at least one element selected from the group consisting of Li, Na, K, Rb and Cs;

E represents at least one element selected from the group consisting of Y, La, Gd, Bi, Ce, Lu, In and Tb;

Ln represents at least one element selected from the group consisting of Nd, Yb and Er;

X represents a value within the range of 0.01 to 0.99;

Y represents a value within the range of 1 to 5; and

Z represents a value within the range of 4 to 14.

The fluorescent substance according to the fourth invention is characterized in that, in order to accomplish the foregoing objects, it comprises Fe and Er, both as an optical active element, and, other than these optical active elements, at least one element selected from the group consisting of Sc, Ga, Al, In, Y, Bi, Ce, Gd, Lu and La and is expressed by one of the following general formulas (3), (4) and (5):

$$G_3J_5O_{12} \qquad (3)$$

$$GJO_3 \qquad (4)$$

$$G_2J_4O_{12} \qquad (5)$$

wherein:

G represents at least one element selected from the group consisting of Y, Bi, Ce, Gd, Lu and La, and Er; and J represents at least one element selected from the group consisting of Sc, Ga, Al and In, and Fe.

The fluorescent substance according to the fifth invention is characterized in that, in order to accomplish the foregoing objects, it comprises Yb as an optical active element and, other than that optical active element, at least one element selected from the group consisting of Sc, Ga, Al, In, Y, Bi, Ce, Gd, Lu and La and is expressed by one of the following general formulas (6), (7) and (8):

$$L_3M_5O_{12} \tag{6}$$

$$LMO_3 \tag{7}$$

$$L_2M_4O_{12} \tag{8}$$

wherein:

L represents at least one element selected from the group consisting of Y, Bi, Ce, Gd, Lu and La, and Yb; and M represents at least one element selected from the group consisting of Sc, Ga, Al and In.

The fluorescent substance according to the sixth invention is characterized in that, in order to accomplish the foregoing objects, it comprises at least one organic substance containing rare earth element, said organic substance being selected from the group consisting of Nb, Yb and Er and carried with an organic substance such as, for example, polymethine, anthraquinone, dithiol metal, phthalocyanine, indophenol or azo dyestuff of a kind having an absorption band within the infrared region of rays of light.

The seventh invention is characterized in that, in order to accomplish the foregoing objects, it contains at least one of Nb and Yb as an optical active element and, other than this optical active element, at least one oxide of Mo or W and an alkaline earth metal and is expressed by one of the following general formulas (9) and (10):

$$(Nd_{1-x}Yb_x)_YQ_Z(RO_4) \tag{9}$$

wherein:

Q represents at least one element selected from the group consisting of Ca, Mg, Sr and Ba;

R represents at least one element selected from the group Mo and W;

X represents a value within the range of 0 to 1;

Y represents a value greater than 0, but smaller than 1; and

Z represents a value greater than 0, but smaller than 1.

$$(Nd_{1-x}Yb_x)_{2Y}Q_{8-3Y}(RO_4)_8 \tag{10}$$

wherein:

Q represents at least one element selected from the group consisting of Ca, Mg, Sr and Ba;

R represents at least one element selected from the group Mo and W;

X represents a value within the range of 0 to 1; and

Y represents a value greater than 0, but equal to or smaller than 8/3.

A method of preparing the fluorescent substance according to the eighth invention is characterized in that, in order to accomplish the foregoing objects, at least one optical active element selected from the group consisting of Nd and Yb, at least one oxide of one of Mo and W and an alkaline earth metal are added to a flux material containing a salt expressed by $T_2RO_4.nH_2O$ (wherein T is at least one element selected from the group consisting of Li, Na and K, R is at least one element selected from the group consisting of Mo and W, and n is a value greater than 0) which is subsequently calcinated, followed by dissolution of the incinerated product with the use of a solvent to remove the flux material.

The fluorescent composition according to the ninth invention is characterized in that, in order to accomplish the foregoing objects, it comprises a fluorescent substance in the form of ultra-microparticles capable of emitting a fluorescent light of a wavelength different from that of the exciting light and having an average particle size smaller than the wavelength of the maximum intensity of the fluorescent light, a binder transparent to both of the exciting light and the fluorescent light, and a solvent.

The fluorescent composition according to the tenth invention is characterized in that, in order to accomplish the foregoing objects, it comprises a fluorescent substance in the form of ultra-microparticles capable of emitting a fluorescent light of a wavelength different from that of the exciting light and having an average particle size smaller than the wavelength of the maximum intensity of the exciting light, a binder transparent to both of the exciting light and the fluorescent light, and a solvent.

The fluorescent composition according to the eleventh invention is characterized in that, in order to accomplish the foregoing objects, it comprises a fluorescent substance containing at least one organic substance which contains a rare earth element and which is selected from the group consisting of Nb, Yb and Er carried with an organic substance having an absorption band within the infrared region of light, and an organic binder.

The fluorescent composition according to the twelfth invention is characterized in that, in order to accomplish the foregoing objects, it comprises a fluorescent substance containing at least one of Nb and Yb as an optical active element and, other than this optical active element, at least one oxide of one of Mo and W and an alkaline earth metal, and an organic binder.

The inked ribbon according to the thirteenth invention is characterized in that, in order to accomplish the foregoing object, it comprises a tape-like carrier deposited with the fluorescent composition comprising a fluorescent substance containing at least one of Nb and Yb as an optical active element and, other than this optical active element, at least one oxide of one of Mo and W and an alkaline earth metal, which fluorescent substance is dispersed and retained in an organic binder.

The fluorescent mark carrier according to the fourteenth invention is characterized in that, in order to accomplish the foregoing objects, the fluorescent mark containing the fluorescent substance in the form of ultra-microparticles capable of emitting a fluorescent light of a wavelength different from that of the exciting light and having an average particle size smaller than the wavelength of the maximum intensity of the fluorescent light is printed thereon.

The fluorescent mark carrier according to the fifteenth invention is characterized in that, in order to accomplish the foregoing objects, the fluorescent mark containing the fluorescent substance in the form of ultra-microparticles capable of emitting a fluorescent light of a wavelength different from that of the exciting light and having an average particle size smaller than the wavelength of the maximum intensity of the exciting light is printed thereon.

In order to accomplish the foregoing objects, the sixteenth invention is characterized by a fluorescent mark carrier printed with a fluorescent mark containing fluorescent particles capable of emitting a fluorescent light of a wavelength different from that of the exciting light, the content of said fluorescent particles in the fluorescent mark being greater than 1 wt %, but smaller than 30 wt %.

In order to accomplish the foregoing objects, the seventeenth invention is characterized by the fluorescent mark carrier printed with a fluorescent mark containing fluorescent particles capable of emitting a fluorescent light of a wavelength different from that of the exciting light, a deposit of the fluorescent inking medium having a thickness not greater than 35 times the particle size of the fluorescent particles.

In order to accomplish the foregoing objects, the eighteenth invention is characterized by the fluorescent mark carrier printed with a fluorescent mark containing fluorescent particles capable of emitting a fluorescent light of a wavelength different from that of the exciting light and a binder, said binder having a light transmissivity with respect to each of the exciting and fluorescent light being not lower than 80%.

In order to accomplish the foregoing objects, the fluorescent mark carrier according to the nineteenth invention is characterized in that the fluorescent particles capable of emitting a fluorescent light of a wavelength different from that of the exciting light are deposited on an aggregation of fibers.

In order to accomplish the foregoing objects, the fluorescent mark carrier according to the twentieth invention is characterized in that a fluorescent ink deposit containing the fluorescent substance capable of emitting a fluorescent light of a wavelength different from that of the exciting light has a 20% or lower visible ray absorption characteristic.

In order to accomplish the foregoing objects, the twenty-first invention is directed to an optical reading apparatus comprising a light emitting element for irradiating with the exciting light a fluorescent mark carrier carrying a fluorescent mark containing the fluorescent substance, a mirror for reflecting light from the fluorescent substance and a light receiving element for receiving the light reflected by the mirror, which apparatus is characterized in that the mirror has a portion thereof provided with a light transmitting region such as, for example, a perforation, for allowing a substantially entire quantity of the exciting light from the light emitting element to pass therethrough and is in the form of a total reflecting mirror such as, for example, a front surfaced mirror, having a reflectivity of higher than 50%.

In order to accomplish the foregoing objects, the twenty-second invention is directed to an optical reading apparatus comprising a light emitting element for irradiating with the exciting light a fluorescent mark carrier carrying a bar code containing the fluorescent substance, and a light receiving element for receiving light from the fluorescent substance, which apparatus is characterized in that the exciting light is projected in an irradiating pattern of a generally elliptical shape having its major axis extending in a direction lengthwise of the bar code.

In order to accomplish the foregoing objects, the twenty-third invention is directed to an optical reading apparatus comprising a light emitting element for irradiating with the exciting light a fluorescent mark carrier printed with the fluorescent substance, a light receiving element for receiving a fluorescent light from the fluorescent mark carrier, a slit member disposed on an optical path between the light emitting element and the light receiving element, and a transport means for transporting the fluorescent mark carrier in a predetermined direction, which apparatus is characterized in that the transport means transports the fluorescent mark carrier at a velocity v which has the following relationship:

$$d/v \geq tu$$

wherein d represents the length of an opening in the slit member as measured in a direction conforming to the direction of transport of the fluorescent mark carrier, v represents the velocity of transport of the fluorescent mark carrier and tu represents the length of time from the timing at which the fluorescent substance receives the exciting light to the timing at which the intensity of the light emitted by the fluorescent substance attains 90% of the maximum possible intensity thereof.

In order to accomplish the foregoing objects, the twenty-fourth invention is directed to an optical reading apparatus comprising a light emitting element for irradiating with the exciting light a fluorescent mark carrier printed with the fluorescent substance, a light receiving element for receiving a fluorescent light from the fluorescent mark carrier and a transport means for transporting the fluorescent mark carrier in a predetermined direction, which apparatus is characterized in that the transport means transports the fluorescent mark carrier at a velocity v which has the following relationship:

$$L/v \geq td$$

wherein L represents the interval between neighboring portions printed with the fluorescent substance with respect to the direction of transport, v represents the velocity of transport of the fluorescent mark carrier, and td represents the length of time from the timing at which irradiation of the exciting light is interrupted to the timing at which the fluorescent afterglow attenuates by a quantity corresponding to 80% of the maximum possible intensity thereof.

In order to accomplish the foregoing objects, the twenty-fifth invention provides an optical reading apparatus comprising a light emitting element for irradiating with the exciting light a fluorescent mark carrier carrying the fluorescent substance, a light receiving element for receiving a fluorescent light from the fluorescent mark carrier, a transport means for transporting the fluorescent mark carrier in a predetermined direction, a first convex lens disposed on an optical path from the fluorescent mark carrier to the light receiving element and having a flat surface oriented towards the fluorescent mark carrier, a second convex lens disposed on an optical path from the fluorescent mark carrier to the light receiving element and having a flat surface oriented towards the light receiving element, and a slit member disposed between the second convex lens and the light receiving element.

In order to accomplish the foregoing objects, the twenty-sixth invention is directed to an optical reading apparatus comprising a light emitting element for irradiating with the exciting light a fluorescent mark carrier printed with the fluorescent substance, and a light receiving element for receiving a fluorescent light from the fluorescent mark carrier, characterized in that the light emitting element is a semiconductor laser diode, a drive circuit for driving the semiconductor laser diode having an automatic power control function, and there is provided a hold circuit for monitoring the exciting light emitted from the semiconductor laser diode and holding an output condition of the exciting light such that based on a signal from the hold circuit an output condition of the exciting light from the semiconductor laser diode is controlled by the drive circuit.

In order to accomplish the foregoing objects, a merchandise sorting apparatus according to the twenty-seventh invention is characterized in that the merchandise sorting apparatus comprises a light emitting element for irradiating with the exciting light a fluorescent mark carrier printed with the fluorescent substance, a light emitting element for receiving a fluorescent light from the fluorescent mark carrier, a slit member disposed on an optical path between the light emitting element and the light receiving element, a transport means for transporting the fluorescent mark carrier in a predetermined direction, and a sorting means for sorting the fluorescent mark carrier, in that the length d of an opening in the slit member as measured in a direction conforming to the direction of transport of the fluorescent mark carrier, the velocity v of transport of the fluorescent mark carrier by the transport means, and the length of time tu from the timing at which the fluorescent substance receives the exciting light to the timing at which the intensity of the light emitted by the fluorescent substance attains 90% of the maximum possible intensity thereof have a relationship of $(d/v \geq tu)$, and in that information represented by a fluorescent ink deposit provided on the fluorescent mark carrier is read by the exciting light and the fluorescent light passing through a slit formed in the slit member, said fluorescent mark carrier being sorted according to such information.

In order to accomplish the foregoing objects, a merchandise sorting apparatus according to the twenty-eighth invention is characterized in that the merchandise sorting apparatus comprises a light emitting element for irradiating with the exciting light a fluorescent mark carrier printed with the fluorescent substance, a light emitting element for receiving a fluorescent light from the fluorescent mark carrier, a slit member disposed on an optical path between the light emitting element and the light receiving element, a transport means for transporting the fluorescent mark carrier in a predetermined direction, and a sorting means for sorting the fluorescent mark carrier, in that the interval between neighboring portions printed with the fluorescent substance with respect to the direction of transport, the velocity v of transport of the fluorescent mark carrier, and the length of time td from the timing at which irradiation of the exciting light is interrupted to the timing at which the fluorescent afterglow attenuates by a quantity corresponding to 80% of the maximum possible intensity thereof have a relationship of $(L/v \geq td)$, and in that information represented by a fluorescent ink deposit provided on the fluorescent mark carrier being transported is optically read and the fluorescent mark carrier is sorted according to such information.

In order to accomplish the foregoing objects, the twenty-ninth invention provides a merchandise sorting apparatus characterized by the provision of an visible image optical reading means for optically reading destination information described on a surface of a merchandise to be sorted, a fluorescent substance printing means for printing the destination information on the merchandise with the use of a fluorescent substance according to the destination information read by the visible image optical reading means, a fluorescent mark optical reading means for optically reading information represented by a fluorescent ink deposit formed by the fluorescent substance printing means, and a sorting means for sorting the merchandise according to the destination information read by the fluorescent mark optical reading means.

In order to accomplish the foregoing objects, the thirtieth invention provides a merchandise sorting method characterized by the steps of optically reading destination information described on a surface of a merchandise with the use of a visible image optical reading means, printing destination information on the merchandise with the use of a fluorescent substance according to the destination information read by the visible image optical reading means, optically reading information represented by a fluorescent ink deposit with the use of a fluorescent mark optical reading means, and sorting the merchandise according to the destination information read by the fluorescent mark optical reading means.

In order to accomplish the foregoing objects, the thirty-first invention provides a mark to be detected containing a fluorescent substance capable of emitting light of a wavelength different from that of an exciting light, which mark is characterized by the provision of a data area formed with a pattern corresponding to data to be recorded, and a lead-in area formed at a site that is scanned prior to irradiation with the exciting light upon the data area, said lead-in area continuing a sufficient length greater than the longest continuous portion of the pattern formed at the data area.

In order to accomplish the foregoing objects, the thirty-second invention provides a method for detecting the mark of the thirty-first invention, characterized in that the method comprises a light irradiating step of projecting light of a substantially constant intensity, an photoelectrically converting step of receiving the light emitted from a light emitting position and converting it into an electric signal, a comparison value setting step of automatically setting a comparison value from an electric signal corresponding to the lead-in area of the mark, and a mark determining step of comparing a detected value corresponding to the data area in the mark with the comparison value and determining, in the event that the detected value exceeds the comparison value, the position at which the mark is formed.

In order to accomplish the foregoing objects, the thirty-third invention provides a method of detecting a mark by irradiating the mark, containing the fluorescent substance, with an exciting light and receiving a fluorescent light emitted from the mark, characterized in that the method comprises a step of intermittently projecting the exciting light of a substantially constant intensity, a step of receiving light, emitted from an irradiating position of the exciting light, and converting it into an electric signal, an incident light intensity detecting step of outputting as a comparison value an electric signal corresponding to the intensity of incident light during an irradiating period, a fluorescent intensity detecting step of outputting, as a detected value, an electric signal indicative of the magnitude of a fluorescent component of the incident light, and a determining step of comparing the detected value with the comparison value and determining, in the event that the detected value exceeds the comparison value, the position at which the mark is formed.

In order to accomplish the foregoing objects, the thirty-fourth invention provides an optical reading apparatus for detecting a mark by irradiating the mark to be detected, containing the fluorescent substance capable of emitting light of a wavelength different from that of an exciting light, with the exciting light and receiving a fluorescent light emitted from the mark, characterized in that it comprises a light irradiating means for projecting the exciting light of a substantially constant intensity intermittently at a predetermined cycle, a photoelectric converting means for receiving the light emitted from a light emitting position and converting it into an electric signal, a waveform detecting means synchronized with an irradiating timing of the light irradiating means for making it possible to individually detect a minimum value shortly before start of the irradiation, a maximum value shortly before interruption of the irradiation and a detected value immediately after interruption of the irradiation, and a mark determining means for comparing the detected value with a comparison value obtained by dividing the difference between the maximum value and the minimum value and for determining, in the event that the detected value exceeds the comparison value, the position at which the mark is formed.

In order to accomplish the foregoing objects, the thirty-fifth invention provides an optical reading apparatus for detecting a mark by irradiating the mark to be detected, containing the fluorescent substance capable of emitting light of a wavelength different from that of an exciting light, with the exciting light and receiving a fluorescent light emitted from the mark, characterized in that it comprises a light irradiating means for projecting the exciting light of a substantially constant intensity intermittently at a predetermined cycle, a photoelectric converting means for receiving the light emitted from a light emitting position and converting it into an electric signal, a waveform shaping means for inverting and amplifying half of an output signal from the photoelectric converting means in synchronism with a timing displaced 90° relative to a period of irradiation by the light irradiating means, and a low-pass filtering means for selectively outputting a direct current component from the output signal of the waveform shaping means.

In order to accomplish the foregoing objects, the thirty-sixth invention provides an optical reading apparatus for detecting a mark by irradiating the mark to be detected, containing the fluorescent substance capable of emitting light of a wavelength different from that of an exciting light, with the exciting light and receiving a fluorescent light emitted from the mark, characterized in that it comprises a light irradiating means for projecting the exciting light of a substantially constant intensity intermittently at a predetermined cycle, a filtering means for selectively receiving a component of light emitted from a light emitting position, which component has a wavelength corresponding to a fluorescent light, a photoelectric converting means for converting the light, received through the filtering means, into an electric signal, a waveform shaping means for inverting and amplifying half of an output signal from the photoelectric converting means in synchronism with a timing displaced 90° from an irradiating period of the light irradiating means, a low-pass filtering means for selectively extracting a direct current component from an output from the waveform shaping means, and a comparing means for comparing a detected voltage outputted from the low-pass filtering means with a predetermined voltage and for outputting a detection signal in the event that the detected voltage exceeds the predetermined voltage.

In order to accomplish the foregoing objects, the thirty-seventh invention provides an optical reading apparatus which comprises a projecting unit for projecting an exciting light necessary to excite a fluorescent substance onto a carrier formed with a fluorescent mark containing the fluorescent substance, a light receiving unit for receiving a fluorescent light emitted from the fluorescent substance and light reflected from the carrier and converting them into an electric signal, an amplifying unit for amplifying the electric signal outputted from the light receiving unit, and a signal detecting unit for detecting information recorded by the fluorescent mark from an output signal from the amplifying unit, which apparatus is characterized in that the amplifying unit has an amplification factor which is variable according to the intensity of the reflected light incident on the light receiving unit and in that the output signal from the amplifying unit which has a peak value lower than a predetermined value is supplied to the signal detecting unit for analog-to-digital conversion thereof to provide a digital signal corresponding to a pattern in which the fluorescent mark is formed.

In order to accomplish the foregoing objects, the thirty-eighth invention provides an optical reading apparatus which comprises a projecting unit for projecting an exciting light necessary to excite a fluorescent substance onto a carrier formed with a fluorescent mark containing the fluorescent substance, a light receiving unit for receiving a fluorescent light emitted from the fluorescent substance and light reflected from the carrier and converting them into an electric signal, an amplifying unit for amplifying the electric signal outputted from the light receiving unit, and a signal detecting unit for detecting information recorded by the fluorescent mark from an output signal from the amplifying unit, which apparatus is characterized in that the amplifying unit has an amplification factor which is variable according to the intensity of the reflected light incident on the light receiving unit and the intensity of the fluorescent light and in that the output signal from the amplifying unit which has a peak value lower than a predetermined value is supplied to the signal detecting unit for analog-to-digital conversion thereof to provide a digital signal corresponding to a pattern in which the fluorescent mark is formed.

In order to accomplish the foregoing objects, the thirty-ninth invention provides an optical reading apparatus which comprises a projecting unit for projecting an exciting light necessary to excite a fluorescent substance onto a carrier formed with a fluorescent mark containing the fluorescent substance, a light receiving unit for receiving a fluorescent light emitted from the fluorescent substance and light reflected from the carrier and converting them into an electric signal, an amplifying unit for amplifying the electric signal outputted from the light receiving unit, and a signal detecting unit for detecting information recorded by the fluorescent mark from an output signal from the amplifying unit, which apparatus is characterized in that the output signal from the amplifying unit is supplied to the signal detecting unit so that the output signal from the amplifying means can be sliced in the signal detecting unit by two or more slice signals having two or more slice levels to provide two or more digital signals whereby a digital signal corresponding to the fluorescent mark can be obtained by logically summing the two or more digital signals together.

In order to accomplish the foregoing objects, the fortieth invention provides an optical reading apparatus which comprises a projecting unit for projecting an exciting light necessary to excite a fluorescent substance onto a carrier formed with a fluorescent mark containing the fluorescent substance, a light receiving unit for receiving a fluorescent light emitted from the fluorescent substance and light reflected from the carrier and converting them into an electric signal, an amplifying unit for amplifying the electric signal outputted from the light receiving unit, and a signal detecting unit for detecting information recorded by the fluorescent mark from an output signal from the amplifying unit, which apparatus is characterized in that an output signal outputted from the amplifying unit when an amplification factor thereof is set to a low value and an output signal outputted from the amplifying unit when the amplification factor thereof is set to a high value are supplied to the signal detecting unit so that the output signals from the amplifying means can be sliced in the signal detecting unit by a slice signal having a particular slice level to provide two or more digital signals whereby a digital signal corresponding to the fluorescent mark can be obtained by logically summing the two or more digital signals together.

According to the first, ninth and fourteenth inventions described above, since the fluorescent substance is in the form of ultra-microparticles having an average particle size smaller than the wavelength of the fluorescent light of a maximum intensity emitted from the florescent substance and, in other words, since the wavelength of the fluorescent light is greater than the particle size of the fluorescent particles, the fluorescent light emitted from the fluorescent particles arrives at a surface of the fluorescent ink deposit having passed through the fluorescent particles positioned thereabove. Accordingly, the fluorescent light can be effectively radiated, detection of the fluorescent light is ensured, and the reliability can be increased.

According to the second, tenth and fifteenth inventions described above, since the fluorescent substance is in the form of ultra-microparticles having an average particle size smaller than the wavelength of the exciting light of a maximum intensity emitted from the florescent substance and, in other words, since the wavelength of the exciting light is greater than the particle size of the fluorescent particles, the exciting light can effectively irradiate the fluorescent particles in a lower region even though the fluorescent particles in an upper region exist above the lower region. Therefore, the efficiency of activation (excitation efficiency) of the fluorescent substance is high and, consequently, detection of the fluorescent light is ensured accompanied by an increase in reliability.

According to the third invention, the fluorescent substance comprises, as shown by the general formula (1) or (2), a salt of oxyacid containing, as an optical active element, one or more elements selected from the group consisting of Nd, Yb and Er. Even this fluorescent substance is in the form of microparticles and, therefore, detection of the fluorescent light is ensured accompanied by an increase in reliability.

According to the fourth invention, the fluorescent substance comprises, as shown by the general formula (3), (4) or (5), Fe and Er as an optical active element and at least one element selected from the group consisting of Sc, Ga, Al, In, Y, Bi, Ce, Gd, Lu and La.

Even this fluorescent substance is a novel fluorescent substance having a light emission spectrum different from that of the prior art fluorescent substance and is particularly suited for use in a field in which security is required.

According to the fifth invention, the fluorescent substance comprises, as shown by the general formula (6), (7) or (8), Yb as an optical active element and at least one element selected from the group consisting of Sc, Ga, Al, In, Y, Bi, Ce, Gd, Lu and La.

Even this fluorescent substance is a novel fluorescent substance having a light emission spectrum different from that of the prior art fluorescent substance and is particularly suited for use in a field in which security is required. Also, this fluorescent substance is in the form of generally spheroidal fluorescent particles of substantially uniform size with no acicular particles and can therefore be uniformly dispersed in a composition.

According to the sixth and eleventh inventions, the fluorescent substance comprises at least one organic substance containing rare earth element, said organic substance being selected from the group consisting of Nb, Yb and Er and carried with an organic substance such as, for example, polymethine, anthraquinone, dithiol metal, phthalocyanine, indophenol or azo dyestuff of a kind having an absorption band within the infrared region of rays of light. Therefore, the rare earth element has a fluorescent output sufficient for a high speed reading and can emit light in response to a variety of wavelength of the exciting light. In other words, in view of the fact that the wavelength of the exciting light varies depending on the organic substance to be carried, the exciting wavelength (the wavelength of the exciting light required to excite the fluorescent substance) to be applied to the fluorescent substance can ba varied advantageously.

In other words, although the fluorescent substance containing one or more elements selected from the group consisting of Nb, Yb and Er absorbs and emits light peculiar to the selected element or elements, the rare earth metal generally has a relatively low light absorption efficiency as compared with an organic compound and, therefore, addition of an organic compound having an absorption band within the infrared region of light is effective to increase the light absorption efficiency to thereby enhance the intensity of light emitted by the rare earth metal.

Also, in view of the fact that the wavelength of the exciting light varies depending on the organic substance to be carried, the exciting wavelength to be applied to the fluorescent substance can ba advantageously varied.

According to the seventh, twelfth and thirteenth inventions, the fluorescent substance contains, as shown by the general formula (9) or (10), at least one of Nb and Yb as an optical active element and, other than this optical active element, at least one oxide of Mo or W and an alkaline earth metal.

The reason that this fluorescent substance has an excellent water resistance appears as follows. Namely, while the water solubility depends on the magnitude of energies necessary to break the bond between anions and cations contained in the material to form a hydrate, that is, the magnitude of a bonding force between the anions and the cations, the bonding force is related to the valence and the coordination number of the ions. Accordingly, as compared with a salt having the same anions, the divalent alkaline earth metal exhibits a higher bonding force than the monovalent alkaline metal so far as the cations are concerned. Also, if, for example, $MoO_4^{2-}$ is chosen for the anion, respective coordination numbers of Na and Ca are six and eight, and therefore, $CaMoO_4$ exhibits a higher bonding force than $Na_2MoO_4$.

Accordingly, for the same anions, the use of the alkaline earth metal for the cations is advantageous in respect of the water resistance and this tendency appears to be maintained even where the rare earth element is added.

The eighth invention is characterized in that the flux material containing the salt expressed by $T_2RO_4.nH_2O$ is added with at least one optical active element selected from the group consisting of Nd and Yb, at least one oxide of one of Mo and W and an alkaline earth metal and is then calcinated, followed by dissolution of the flux material with a solvent to remove it.

With respect to the particle size of the fluorescent substance so prepared by the calcination referred to above, comparison of the prior art powdery fluorescent substance having a matrix comprised of $Na_2MoO_4$ and mechanically pulverized after the calcination, the powdery fluorescent substance of the present invention having a matrix of $CaMoO_4$ and mechanically pulverized after the calcination and the fluorescent substance added with a water-soluble flux material during the calcination, but with the flux material having been removed by flushing subsequent to the calcination, have shown that, while the prior art substance was of a particle size of about 5 μm at minimum, the substance of the present invention was found to be microparticles in which primary particles of a particle size within the range of about 2 to 5 μm were secondarily aggregated, and the substance introduced with the flux material was found to be microparticles of a particle size not greater than 1 μm.

In the solid phase reaction induced by the calcination the particle size of the starting material is one of factors that determine the particle size of a reaction product (in this case, the fluorescent substance). The smaller the particle size of the raw material, the smaller the particle size of the reaction product. Accordingly, the material of a particle size as small as possible should be chosen for the raw material.

Another one of the factors that determine the particle size of the fluorescent substance is the surface area of contact among the raw materials that induce the solid phase reaction. The larger the contact surface area, the more often the solid phase reaction occurs, resulting in acceleration of the particle growth. By way of example, considering the reaction of only the matrix comprised of $CaMoO_4$ employed in the present invention, the solid phase reaction may be expressed by $[CaCO_3(s)+MoO_3(s) \rightarrow CaMoO_4(s)+CO_2(g)]$. (In this case, the calcinating temperature is 750° C. which is lower than the decomposition temperature, 900° C., of $CaCO_3$, but it is suspected that such a reaction, $[CaCO_3(s) \rightarrow CaO(s)+CO_3(g)]$, may occur as a result of somewhat decomposition.)

If for the flux material $Na_2MoO_4$ is employed which has a melting point at 687° C. which is lower than the calcination temperature of 750° C., the solid phase reaction takes place. $CaCO_3$ and $MoO_3$ are dispersed in the flux melt, accompanied by reduction in surface contact area among the raw materials. In view of this, the particle growth appears to be disturbed, resulting in reduction in particle size of the reaction product.

With respect to the light emission intensity, so long as the fluorescent substance added with and activated by, for example Nd and Yb is concerned, when emission outputs exhibited respectively by the conventional fluorescent substance containing $Na_2MoO_4$ as a matrix, the fluorescent substance of the present invention containing $CaMoO_4$ as a matrix and the fluorescent substance having a particle size not greater than 1 μm, as a result of excitation by the pulsating exciting light are compared, the fluorescent substance of the present invention has resulted in reduction of the light emission intensity down to about 80% of that exhibited by the conventional fluorescent substance and the fluorescent substance of the particle size not greater than 1 μm has resulted in reduction of the light emission intensity down to about 40% of that exhibited by the conventional fluorescent substance.

However, when the sensitivity of an Si photodetector is taken into consideration, these emission intensities would bring about no problem in practice. This is because this reduction in emission intensity discussed above is attributable to the particle size of the fluorescent substance being smaller than that of the conventional fluorescent substance and not attributable to the type of matrix material.

The emission intensity and the response are associated with the transition probability of the rare earth element. Specifically, the higher the transition probability, the higher emission intensity and the higher the response. The optical transition of Nd and Yd which are used in the practice of the present invention as an optical active element is a transition of f-electrons between energy levels and is known as a forbidden transition in terms of the parity of the wave function.

However, in crystals, levels having a parity reverse to the f-trajectory due to the crystal field are mixed up and the f-f transition is permitted to a certain extent. This tolerance is large if the symmetric property of the crystal field is low and, hence, the transition probability is high. By way of example, while $Na_2MO_4$ employed in the conventional fluorescent substance is of a cubic system, $CaMO_4$ employed in the practice of the present invention is of a pyramidal quadratic system and, therefore, the symmetric property of the crystal is low. Accordingly, in terms of material, the fluorescent substance of the present invention cannot be considered inferior to the conventional fluorescent substance in respect of the emission intensity and the response.

Also, the response does not depend on the particle size, and the fluorescent substance of the present invention which is considered having a high transition probability exhibits a somewhat higher response.

According to the sixteenth invention, since the content of the fluorescent particles in the fluorescent ink deposit formed by printing is greater than 1 wt %, but smaller than 30 wt %, the presence of the ink deposit is not noticeable in sight and, therefore, the ink deposit will not adversely affect the appearance of the fluorescent mark carrier. Accordingly, it is suited for the fluorescent mark carrier to have a security.

According to the seventeenth invention, since the fluorescent ink deposit formed by printing has a thickness not greater than 35 times the particle size of the fluorescent particles, the presence of the ink deposit is not noticeable in sight and, therefore, the ink deposit will not adversely affect the appearance of the fluorescent mark carrier. Accordingly, it is suited for the fluorescent mark carrier to have a security.

According to the fluorescent composition of the eighteenth invention, since the binder for dispersing and retaining the fluorescent microparticles has a light transmissivity with respect to each of the exciting and fluorescent light being not lower than 80%, entry of the exciting light into the fluorescent ink deposit and exit of the fluorescent light generated internally of the fluorescent ink deposit to the outside take place efficiently. Because of this, assured detection of the fluorescent light is possible, accompanied by increase in reliability.

According to the fluorescent mark carrier of the nineteenth invention, the fluorescent particles in the fluorescent mark carrier are deposited on a fiber aggregation having minute surface irregularities such as, for example, paper, and therefore the fluorescent ink deposit has a surface formed with corresponding minute surface irregularities. If the fluorescent ink deposit containing the fluorescent particles are formed on a smooth surface such as, for example, a synthetic film, the surface of the ink deposit will become smooth. If this smooth surface of the fluorescent ink deposit is irradiated with the exciting light, portion of the exciting light will undergo a regular reflection and will no longer activate the fluorescent substance. However, deposition of the fluorescent particles on the fiber aggregation such as accomplished in the present invention is effective to substantially eliminate such a regular reflection of the exciting light and, therefore, the efficiency of excitation of the fluorescent substance is high.

According to the fluorescent mark carrier of the twentieth invention, since the fluorescent ink deposit in the fluorescent mark carrier has a 20% or lower visible ray absorption characteristic, the fluorescent ink deposit is substantially colorless and transparent and, for this reason, it will not adversely affect the appearance of the fluorescent mark carrier and is suited for use where security is of great importance.

According to the optical reading apparatus of the twenty-first invention, the mirror has a portion thereof provided with a light transmitting region for allowing a substantially entire quantity of the exciting light from the light emitting element to pass therethrough. Therefore, as compared with the semi-transparent mirror employed in the conventional optical reading apparatus, the quantity of the exciting light used to irradiate the fluorescent substance can be increased, with activation of the fluorescent substance enhanced effectively.

Moreover, the quantity of the fluorescent light reflected by the mirror is relatively large as compared with that reflected by the semitransparent mirror. For this reason, detection of the fluorescent light is ensured and the reliability can be increased.

According to the optical reading apparatus of the twenty-second invention, since the pattern of the exciting light emitted from the light emitting element is elliptical with its major axis extending in a direction lengthwise of the bar code, the area of the illuminated surface increased as compared with the conventional round pattern of the exciting light (that is, assuming that the diameter of the round pattern is equal to the length of the minor axis of the elliptical pattern). For this reason, the intensity of the light emitted is high, making it possible to accomplish an assured detection of the fluorescent light accompanied by increase in reliability.

With the optical reading apparatus of the twenty-third invention, since the velocity v of transport of the fluorescent mark carrier is regulated by the relationship between the length d of the opening in the slit member and the rise time tu, only the information desired to be read (for example, a single bar code) can be assuredly read out with no time wasted. For this reason, the reliability in reading can be increased, making it possible to accomplish a high speed reading.

With the optical reading apparatus of the twenty-fourth invention, since the velocity v of transport of the fluorescent mark carrier is regulated by the relationship the interval between neighboring portions printed with the fluorescent substance and the fall time td, only the information desired to be read can be assuredly read out with no possibility of being adversely affected by the fluorescent afterglow from the neighboring bar and, therefore, the reliability can be increased.

In the optical reading apparatus according to the twenty-fifth invention, the provision is made of the slit member between the second convex lens and the light receiving element wherefore, even though the thickness of the fluorescent mark carrier caries to a certain extent, the fluorescent mark carrier can be satisfactorily transported without damaging the slit member.

According to the twenty-sixth invention, the semiconductor laser diode having an excellent light collecting ability and also an excellent light directivity is employed for the light emitting element and, for the drive circuit for driving the semiconductor laser diode, the circuit having an automatic power control function so that the exciting light is monitored to control output conditions of the exciting light being emitted from the laser diode. Therefore, both of the pulse interval and the pulse intensity of the exciting light are fixed to make it possible to provide the optical reading apparatus stabilized in operation.

According to the twenty-seventh invention, since the relationship among the velocity v of transport of the fluorescent mark carrier, the length d of the opening in the slit member and the rise time tu are uniquely defined, it is possible to provide a high speed reading system capable of reading out only the information desired to be read with no time wasted.

According to the twenty-ninth invention, since the relationship among the velocity v of transport of the fluorescent mark carrier, the interval L between neighboring portions printed with the fluorescent substance and the fall time td is uniquely defined, it is possible to provide a highly reliable reading system capable of reading only the information desired to be read with no possibility of being adversely affected by the fluorescent afterglow from the neighboring bar.

Since each of the twenty-ninth and thirty inventions is so constructed as hereinbefore described, a merchandise sorting can be automatically, efficiently and assuredly accomplished.

According to each of the thirty-first and thirty-second inventions, since the lead-in area of the fluorescent mark has a length sufficiently greater than the longest continuous portion of the pattern formed at the data area, the intensity of the fluorescent light emitted from that lead-in area is higher and more stabilized than the data area and is comparable to the intensity proper to particular detecting condition or environments.

Moreover, since that lead-in area is defined at a location adjacent a portion of the data area which is first scanned and is continued to the data area, that lead-in area works together with the data area so as to provide a substantially constant contrast over the entire region of the data area and the intensity of the fluorescent light emitted from the data area can vary uniformly over the entire region of the data area.

Therefore, by initially detecting the intensity of the fluorescent light at the lead-in area and then comparing the intensity of the fluorescent light emitted from the data area with a reference value represented by the intensity of the fluorescent light from the lead-in area, the contents of the mark formed at the data area can advantageously be determined accurately.

In the optical reading apparatus according to each of the thirty-third and thirty-fourth inventions, when the mark is irradiated by the light from the light irradiating means, not only does the mark reflect the incoming light, but also an irradiated portion of the mark emits the fluorescent light of a particular wavelength. The incident light containing the reflected component and the fluorescent component is passed through the optical filtering means to selectively extract the light of a wavelength equal to that of the fluorescent length and is subsequently converted into an electric signal by the photoelectric converting means so that the electric signal can be processed by the waveform detecting means.

In the waveform detecting means, the magnitude of the amplitude of the incident and the intensity of the fluorescent light are detected individually. Therefore, by preparing a comparison value which varies with change in intensity of the incident light and allowing the mark determining means in the subsequent stage to compare the detected value with the comparison value, the comparison value can be automatically set to an optimum value according to change in intensity of the incident light itself.

Moreover, by allowing a signal input determining means to determine at all times the intensity of the incident light and to initiate a determining operation only when the significant incident light is detected, only genuine data are used as a detected value and a comparison value and, therefore, the reliability can be increased advantageously.

In the optical reading apparatus according to each of the thirty-fifth and thirty-sixth invention, when the pulsating light from the light irradiating means is projected onto the mark at a predetermined timing, light from that portion of the mark on which the light impinges enters the optical filtering means. The light incident on the optical filtering means contains external light having a random distribution of wavelength, but having an intensity of a substantially constant level, reflected light having a distribution of wavelength that can be specified, but having an intensity that varies in a fashion represented by a rectangular wavelength, and fluorescent light having a particular wavelength different from that of the reflected light, but having a intensity that varies with irradiation of the light.

Therefore, the use of the optical filtering means is effective to selectively pass the light of a wavelength equal to that of the fluorescent light therethrough so that the other light components than the fluorescent light can be attenuated down to a value as small as possible, thereby making it possible for the photoelectric converting means to convert the intensity of the light into an electric signal of a magnitude proportional to such intensity of the light.

While the external light has a substantially constant intensity, the reflected light has a cyclically varying intensity of a substantially constant level. On the other hand, the fluorescent light has an intensity that varies according to the irradiating light at the same timing as the reflected light. In other words, the fluorescent light just emitted and the fluorescent afterglow attain a maximum intensity when the irradiating light is switched off, and a minimum intensity when the irradiating light is switched on.

Accordingly, if the waveform shaping means is so designed so as to invert and amplify the input signal, inputted during a period of irradiation, at a timing shifted 90° relative to the period of irradiation, the half period during which both of the emitted light and the fluorescent afterglow are relatively high can be obtained in the form of a change in positive voltage whereas the half period during which they are relatively low can be obtained in the form of a change in negative voltage.

In the meantime, while each of the external light and the reflected light gives rise to positive and negative voltages that are equal to each other, the electric signal indicative of the fluorescent light is so inverted that the difference between the both can be maximized. Accordingly, when the electric signal is passed through the low-pass filtering means in the subsequent stage, both of the external light and the reflected light are cancelled, but the fluorescent light if contained gives rise to the difference between the positive and negative signals which is extracted as a direct current voltage. Therefore, if it is determined that the difference between the direct current voltage with a preset value set in a comparator is significant, a mark signal indicative of the position of the mark is outputted.

In the optical reading apparatus according to any one of the thirty-seventh to fortieth inventions, the level and amplitude of the analog reproduction signal vary considerably depending on surface properties of the carrier on which the fluorescent mark is formed. On the other hand, the level and amplitude of this analog reproduction signal can be properly adjusted by varying the amplification factor of the amplifying unit. In view of this, if the amplification factor of the amplifying unit can be switched depending on the intensity of the reflected light incident upon a light receiving unit and the level of the analog reproduction signal is matched with a predetermined slice signal level set in the signal detecting unit, a desired binary signal can be obtained with a slice signal of a predetermined level regardless of the properties of the carrier and, therefore, information associated with the fluorescent marks on the carriers of a varying material can be precisely read out with the single reading apparatus.

Also, if the amplification factor of the amplifying unit is adjustable to one of different values depending on the intensity of the reflected light and that of the fluorescent light both incident upon the light receiving unit, it is possible to match the level of the analog reproduction signal with that of the slice signal as accurately as possible and, therefore, the reading of the fluorescent mark signal can be accomplished highly precisely.

On the other hand, where the analog reproduction signal detected from a series of fluorescent marks formed on one and the same carrier varies in level, no accurate reading of the fluorescent mark information is possible with the previously described first and second means. Accordingly, if the analog reproduction signal supplied to the signal detecting unit is sliced by two or more slide signals having two or more slice levels appropriate to the level variation, the binary signal of the analog reproduction signal for each level can be obtained. If a logical sum of the binary signals for those levels is calculated, the binary signal corresponding to the entire analog reproduction signal can be obtained. Thus, even though the analog reproduction signal detected of the series of the fluorescent marks formed on one and the same carrier accompanies a partial level variation, the fluorescent mark information can be read out accurately.

Also, in a similar situation, even if without the analog reproduction signal being sliced by the two or more slice signals, the amplification factor is adjusted according to each of the levels of the analog reproduction signals so that the analog reproduction signal can be sliced by a slice signal having a particular slice level, the binary signals of the analog reproduction signals for those levels can be obtained. Even in this case, if a logical sum of the binary signals for those levels is calculated, the binary signal corresponding to the entire analog reproduction signal can be obtained.

By way of example, with respect to the analog reproduction signal of a high level, this analog reproduction signal is sliced by a particular slice signal with the amplification factor lowered. At this time, no digitization takes place of the analog reproduction signal of a low level. On the other hand, with respect to the analog reproduction signal of the low level, this analog reproduction signal is sliced by the particular slice signal with the amplification factor increased. At this time, no digitization takes place of the analog reproduction signal of the high level. Accordingly, by taking the logical sum of these binary signals, the binary signal corresponding to the entire analog reproduction signal can be obtained.

BRIEF DESCRIPTION OF THE DRAWINGS

FIG. 9 is a chart showing charge stocks of various fluorescent substances in respective samples 1 to 7 and mixing ratios thereof;

FIG. 10 is a chart showing charge stocks of various fluorescent substances in respective samples 8 to 15 and mixing ratios thereof;

FIG. 11 is a chart showing calcination temperature, composition and particle size of the various fluorescent substances in the respective samples 1 to 7;

FIG. 12 is a chart showing calcination temperature, composition and particle size of the various fluorescent substances in the respective samples 8 to 15;

FIG. 16 is a chart showing charge stocks of various fluorescent substances in respective samples 16 to 20, which pertain to respective embodiments of the present invention, mixing ratios thereof and calcination temperatures;

FIGS. 52A through 52H are timing charts showing the relationship among various signals appearing in the optical reading apparatus of FIG. 50;

FIGS. 56A through 56F are timing charts showing the relationship among various signals appearing in the optical reading apparatus of FIG. 54;

FIG. 57 is a side sectional view, on an enlarged scale, of a mark carrier showing the mark, an adhesive layer and a protective sheet;

FIGS. 61A and 61B are diagrams showing waveforms of analog reproduction signals given by the optical reading apparatus of FIG. 58;

FIGS. 68A through 68E are diagrams showing waveforms of binary signals outputted from various units of the optical reading apparatus of FIG. 63;

BEST MODES FOR CARRYING OUT THE INVENTION

For the purpose of easy understanding of the present invention, the present invention will be described under the following headings:

1. Fluorescent Substance and Fluorescent Composition
2. Method of Printing Fluorescent Composition and Fluorescent Mark Carrier
3. Optical Reading Apparatus and Optical Reading System 1. [Fluorescent Substance and Fluorescent Composition]

Fluorescent Composition 1

The fluorescent substance of the present invention is an organic metallic compound containing, as an optical active element, at least neodymium (Nd), or preferably an organic metallic compound containing, as an optical active element, a mixture of Nd and ytterbium (Yb). An organic material of this organic metallic compound is at least one organic material selected from the group consisting of carboxylic acid, ketone, ether and amine.

More specifically, the organic metallic compound referred to above may be at least one organic metallic compound selected from the group consisting of neodymium cinnamate, a complex salt of cinnamic acid with neodymium and ytterbium, a complex salt of benzoic acid with neodymium and ytterbium, neodymium naphthoate and a complex salt of naphthoaic acid with neodymium and ytterbium. Of them, a complex salt of carboxylic acid comprising a cinnamic acid and Nd and Yb is preferred.

Figure 2:
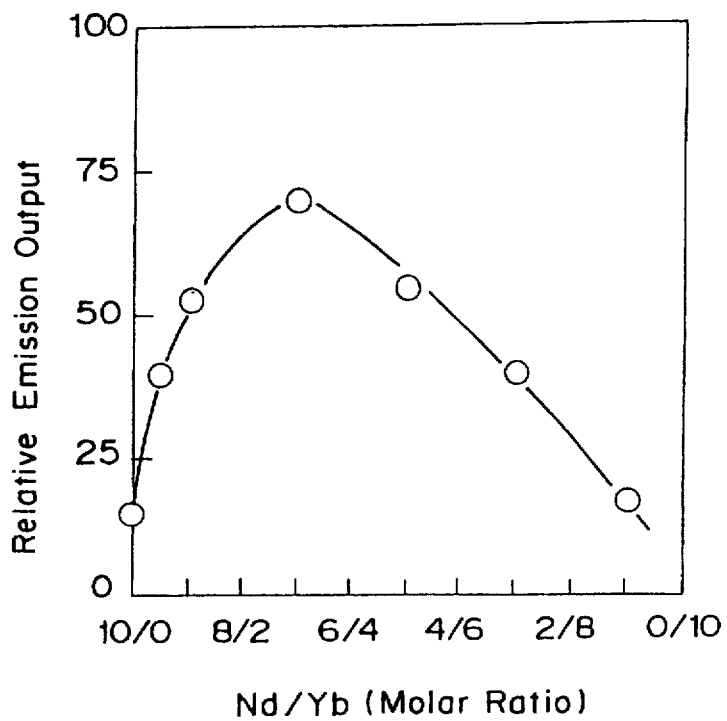
FIG. 2 is a characteristic graph showing the relationship between the molar ratio of Nd/Yb contained in the complex salt of cinnamic acid with neodymium and ytterbium (1/1) and the emission intensity.

The molar ratio of Nd relative to Yb (Nd:Yb) is preferably selected within the range of 9.5:5 to 3:7 and more preferably within the range of 9:1 to 5:5, by the reason which will become clear from the subsequent description made with reference to FIG. 2.

This fluorescent substance may be synthesized in any suitable manner, but the use of an ion-exchange reaction in an aqueous solution, such as published by M. D. Taylor, et al., in J. Inorg. Nucl. Chem., 30, 1530–1511 (1968), or an elimination reaction of isopropoxide in a non-polarity solvent such as published by P. N. Kapoor, et al., in Synth. React. Inorg. Met. -Org. Chem., Vol. 17, 507–523 (1987), is preferred for synthesization of the fluorescent substance.

Unlike an inorganic fluorescent substance, this organic fluorescent substance contains in its molecules an organic material such as carboxylic acid, β-diketone, cyclic ether or cyclic amine, and in particular, cinnamic acid which is one kind of the carboxylic acids is preferred because it has an excellent chemical stability and gives rise to a relatively high emission output.

This fluorescent substance has an average primary particle size not greater than about 80% of the wavelength (810 nm) of the infrared rays, that are used as exciting light, at the maximum intensity thereof and not greater than about 70% of the wavelength (980 nm) of the fluorescent light, emitted from such fluorescent light, at the maximum intensity thereof. Since this fluorescent substance does not form a block of primary particles such as observed in the inorganic fluorescent substance and will not damage crystals thereof, it can easily be pulverized and will become finer when dispersed in a binder. Therefore, when an inking medium for use with the ink jet printer is to be prepared using this organic fluorescent substance, the latter is satisfactorily stabilized having been dispersed in the binder with no substantial possibility of being precipitated and, therefore, the use of such inking medium will not result in a nozzle clogging or an insufficient jetting of droplets of the inking medium.

A specific methods of making the fluorescent substance will now be described.

1.24 g (8.37 mol) of cinnamic acid and 0.37 g (8.37 mol) of sodium hydroxide are added to 120 ml of ion-exchange water while being stirred, to provide an aqueous solution of sodium cinnamate. The pH value of this aqueous solution is adjusted to 10 by the use of an aqueous solution of 0.1N sodium hydroxide.

Separately therefrom, 0.54 g (1.39 mol)of neodymium chloride hexahydrate and 0.54 g (1.39 mol) of ytterbium chloride hexahydrate are dissolved completely in 50 ml of ion-exchange water to provide an aqueous solution which is subsequently added, while being stirred, to the aqueous solution of sodium hydroxide. This addition results in formation of sediment.

Thereafter, the Ph value of the reaction liquid is adjusted to 5 by the addition of 0.1 N hydrochloric acid and is stirred for two hours, followed by filtration of the sediment to obtain a filtrate. The filtrate is, after having been washed, dried at 120° C. for 5 hours to provide 1.62 g of a complex salt of cinnamic acid with neodymium and ytterbium (1/1). This quantity of the resultant fluorescent substance corresponds to the yield of 93.1%.

Figure 1:
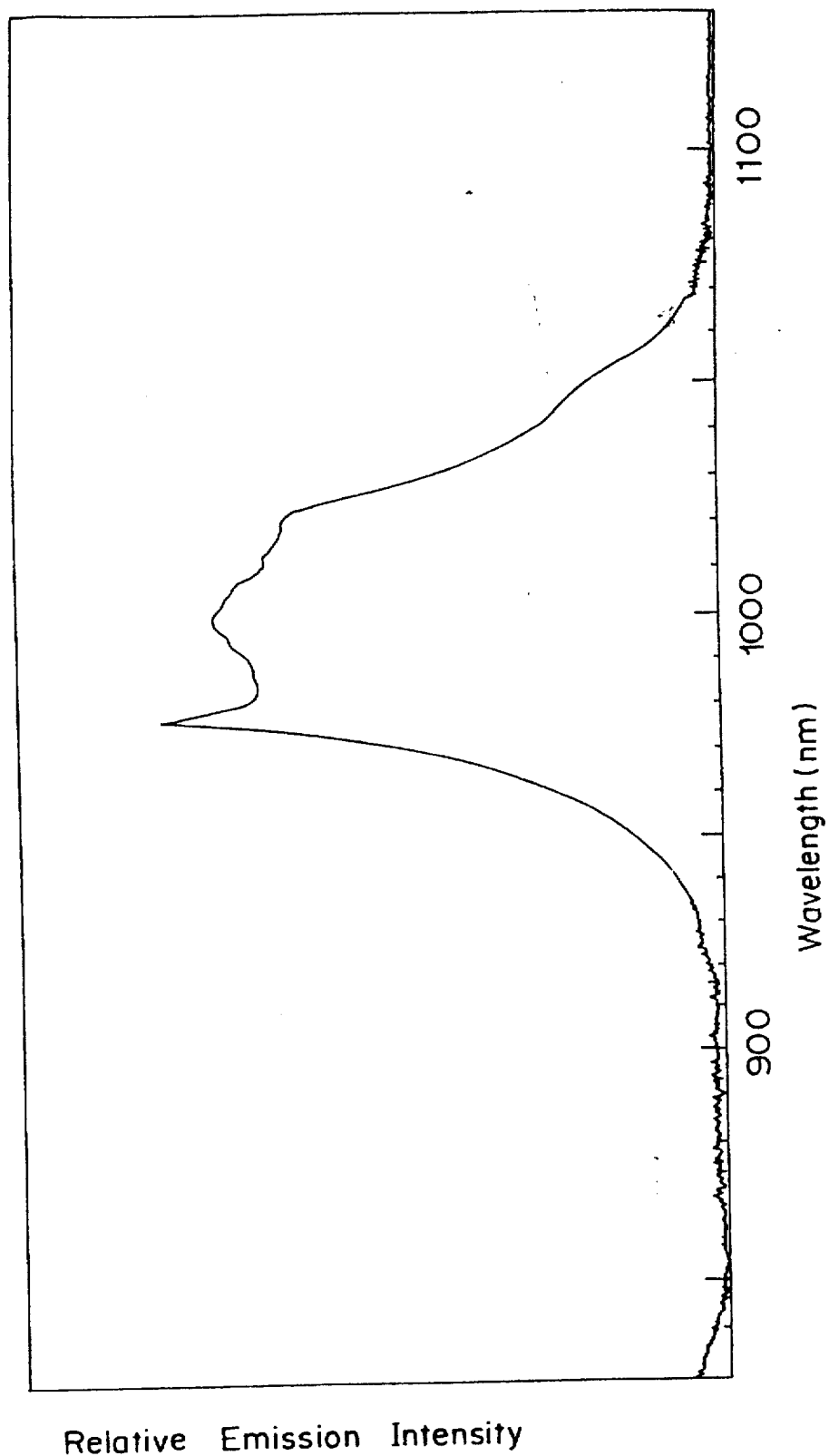
FIG. 1 is a diagram showing an emission spectrum exhibited by a complex salt of cinnamic acid with neodymium and ytterbium (1/1) according to an embodiment of the present invention.

FIG. 1 illustrates an emission spectrum exhibited by the complex salt of cinnamic acid with neodymium and ytterbium (1/1) when the latter is excited by exciting light emitted from a GaAlAs light emitting diode used as a source of excitation, showing the maximum peak wavelength appearing at about 980 nm.

FIG. 2 illustrates a characteristic graph showing the relationship between the molar ratio of Nd relative to Yb (Nd/Yb) and the emission intensity. As shown therein, a high emission output is exhibited when the Nd/Yb molar ratio is within the range of 9.5/5 to 3/7 and preferably within the range of 9/1 to 5/5.

The complex salt of cinnamic acid with neodymium and ytterbium (1/1) has an average particle size of 0.2 μm which corresponds to about 25% of the wavelength (0.81 μm) of the maximum intensity of the exciting light and about 20% of the wavelength (0.98 μm) of the maximum intensity of the fluorescent light emitted by the complex salt of cinnamic acid with neodymium and ytterbium (1/1) and which is thus extremely smaller than the wavelength of the maximum intensity of any one of the exciting light and the fluorescent light.

The above discussed method may be equally employed to prepare a complex salt of benzoic acid with neodymium and ytterbium and this can be accomplished if cinnamic acid used in the practice of the above discussed method is replaced with benzoic acid. Even the resultant fluorescent substance, that is, complex salt of benzoic acid with neodymium and ytterbium, has an average particle size which is extremely smaller than the wavelength of the maximum intensity of any one of the exciting light and the fluorescent light.

The fluorescent substance in the form of super microparticles of an organic metallic compound such as, for example, neodymium cinnamate, neodymium naphthoate, complex salt of naphthoeic acid with neodymium and ytterbium or neodymium benzoate may be equally employed.

Since the wavelength of the maximum intensity of the exciting light used to excite any of those fluorescent substances and the wavelength of the maximum intensity of the fluorescent light emitted therefrom exceed about 0.8 μm (800 nm), the use of the fluorescent substance having an average particle size not greater than 0.8 μm results in an effective entry of the exciting light and an effective emission of the fluorescent light.

Figure 3A:
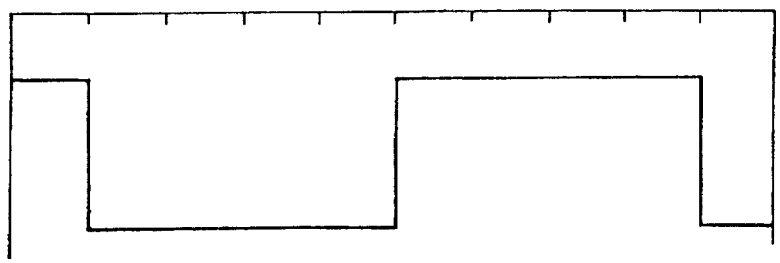
FIGS. 3A, 3B and 3C are characteristic graphs showing the irradiation timing of an exciting light and respective conditions of emission of florescent light from two types of fluorescent substances.

FIG. 3 illustrates characteristic graphs showing a condition of the exciting light being irradiated and a condition of the fluorescent light emitted from the fluorescent substance. FIG. 3(a) illustrates the condition of irradiation from the GaAlAs light emitting diode and the exciting light emitted therefrom is generally in the form of a train of pulses having a pulse repetition period of 2,000 μsec.

Figure 3B:
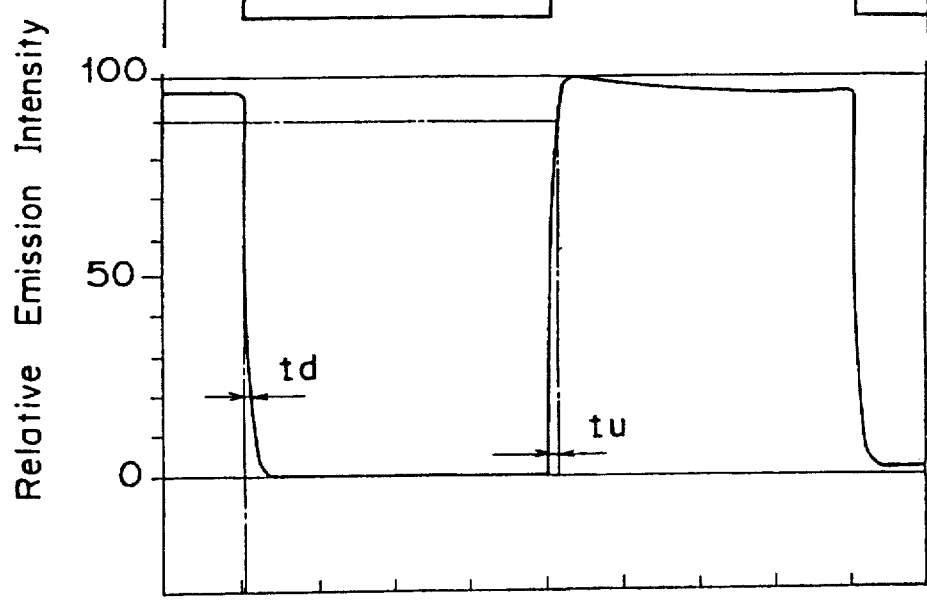

FIG. 3(b) illustrates the condition of emission of the fluorescent light from the complex salt of cinnamic acid with neodymium and ytterbium (1/1), prepared by the previously discussed method, showing that the rise time tu required for the intensity of the fluorescent light emitted thereby subsequent to the start of irradiation of the exciting light to attain 90% of the maximum intensity thereof is about 100 μsec. Also, the fall time td required for the intensity of the fluorescent afterglow subsequent to the interruption of irradiation of the exciting light to attenuate by a quantity corresponding to 80% of the maximum intensity of the fluorescent light is about 50 μsec. Thus, both of the rise time tu and the fall time td are smaller than 200 μsec, showing an extremely high response.

Figure 3C:
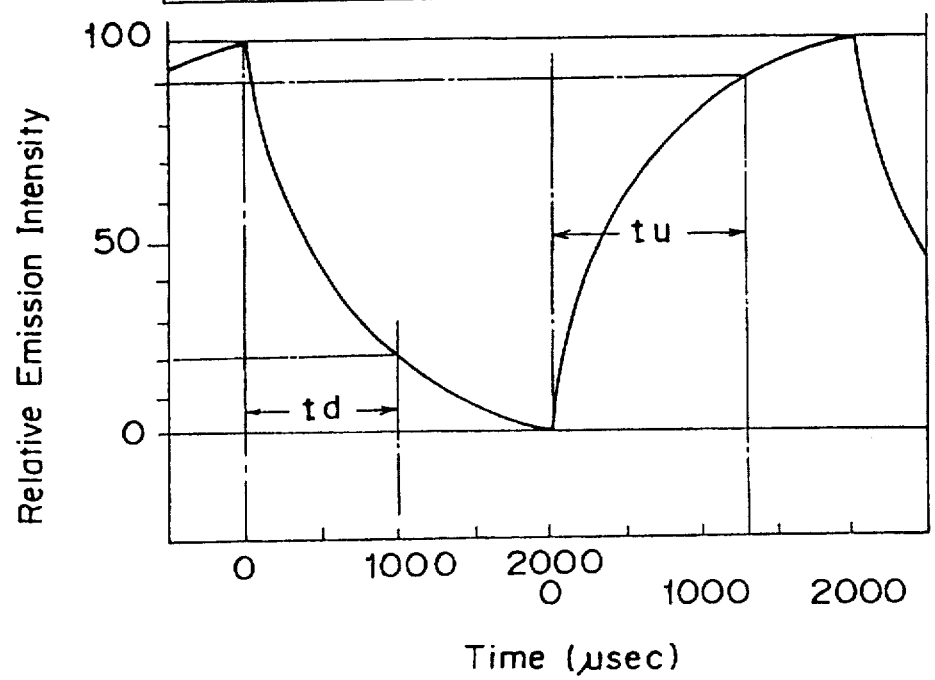

FIG. 3(c) illustrates the condition of emission of the fluorescent light from the fluorescent substance which is $LiNd_{0.5}Yb_{0.5}P_4O_{12}$, showing that the rise time td is about 1,300 μsec and the fall time td is about 1,000 μsec, both of them being considerably greater than 200 μsec. If the rise time tu of the fluorescent substance is smaller than 200 μsec as discussed above, the length of time required for the light receiving element to receive light subsequent to the start of irradiation of the exciting light is extremely small and, accordingly, a reading of a fluorescent mark formed by the use of the fluorescent substance can be accomplished at a high speed.

Figure 4:
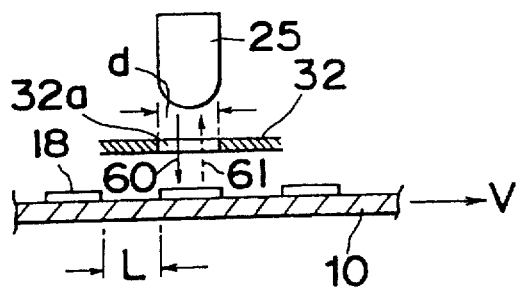
FIG. 4 is a schematic diagram showing the relationship among the slit length in a slit member, the velocity of transport of a fluorescent mark carrier and the intervals of fluorescent ink deposits on the carrier.

Also, when as shown in FIG. 4 information is to be read out by an optical reading apparatus 25 from a fluorescent mark in the form of a pattern of bar codes defined by fluorescent ink deposits 18 formed by printing a fluorescent inking medium while a fluorescent mark carrier 10 bearing such fluorescent mark is transported in one direction, the fluorescent substance contained in each fluorescent ink deposit 18 is activated by irradiating the fluorescent mark by the exciting light 60 emitted from the light emitting element incorporated in the optical reading apparatus 25 to cause the fluorescent substance to emit from the respective ink deposit 18 the fluorescent light 61 which is subsequently received by the light receiving element in the optical reading apparatus 25 for reading of the bar code information.

It is to be noted that reference numeral 32 represents a slit member disposed on an optical path through which, as will become clear from the subsequent description, the exciting light 60 is projected onto the fluorescent ink deposits 18 one at a time and the resultant fluorescent light 61 from the respective fluorescent ink deposit 18 travels towards the light receiving element in the optical reading apparatus 25. Assuming that the speed v of transport of the fluorescent mark carrier 10 is expressed by v, the length of a slit 32a defined in the slit member 32 as measured in a direction conforming to the direction of transport is expressed by d and the rise time of the fluorescent substance is expressed by tu, and if arrangement is made to establish the relationship of (tu≦d/v), information represented by each fluorescent ink deposit 18 on the fluorescent mark carrier being transported can assuredly be read only when such fluorescent ink deposit 18 is brought into alignment with the slit 32a of the slit member 32. If, however, the rise time tu of the fluorescent substance is greater than d/v, the respective ink deposit 18 will pass underneath the slit 32a without giving rise to a sufficient intensity of the fluorescent light and, accordingly, the light receiving element will provide an output so low as to result in a problem in reliability.

Also, referring still to FIG. 4, if arrangement is made to establish the relationship of (td≦L/v) wherein L represents the interval between the neighboring fluorescent ink deposits (for example, bars) 18 as measured in a direction conforming to the direction of transport of the fluorescent mark carrier 10 and td represents the fall time of the fluorescent substance, an accurate reading of the bar code information is possible. If the fluorescent substance having a relatively long fall time td, that is, the fluorescent substance capable of giving a fluorescent afterglow for a relatively long time, is employed, the fluorescent afterglow emanating from one of the fluorescent ink deposits 18 that precedes the fluorescent ink deposit 18 having moved past a position aligned with the slit 32a may also be read and, therefore, an accurate reading of the code information cannot be accomplished.

In contrast thereto, the use of the fluorescent substance having the fall time td that is extremely small as shown in FIG. 3(b) is employed, the problem such as discussed above can be eliminated, making it possible to accomplish an accurate reading of the code information and also to reduce the interval L between the neighboring ink deposits forming the code bars to thereby reduce the area in which the fluorescent mark is formed.

The use of an organic binder having a density $\rho 2$ which satisfies the relationship of $(\rho 1/\rho 2 \leq 1.8)$ wherein $\rho 1$ represents the density of the fluorescent substance is effective to eliminate such a problem that the amount sediment of the fluorescent microparticles in the inking medium is so small that, when the fluorescent ink deposit is formed, the fluorescent microparticles may be concealed having been covered by a film of binder to an extent as to prevent the fluorescent light from being quickly surfaced.

The content of the binder in the fluorescent ink deposit must be equal to or greater than 5 wt %. If the content of the binder is smaller than 5 wt %, the fluorescent particles may separate and, for this reason, printing of the bar code will become incomplete to such an extent as to pose a difficulty in properly retaining the information. In view of this, the content of the binder is required to be equal to or greater than 5 wt %.

For a water-soluble organic binder, acrylic resin or an acrylic resin having, in its side chain, an ester group or polyether may be employed. Other than these examples, polyvinyl alcohol, polyvinyl pyrrolidone, carboxymethylcellulose, starch, a formalin condensate of naphthalene sulfonate or polystyrene sulfonate may also be employed.

For a non-water-soluble organic binder, a phenol resin such as, for example, novolak-type phenol, resol-type phenol, rosin-modified phenol or alkyl-modified phenol, a water-added rosin or a rosin resin such as, for example, polyethylene glycol ester, polyfunctional alcohol ester or rosin glycerin ester may be employed.

For a solvent, one or a mixture of water, alcohol, ketone, ester, ether, a solvent of aromatic hydrocarbon and a solvent of fatty hydrocarbon may be employed.

An electrolyte used as a electroconductivity imparting agent may be $LiNO_3$, LiCl, KCl, NaCl or $KNO_3$.

For a stabilizer, one or a mixture of alkyl phthalate (for example, dioctyl phthalate or dibutyl phthalate), aryl phthalate, glycol (ethylene glycol, propylene glycol, polyethylene glycol or polypropylene glycol) and glycol ester may be employed.

A defoaming agent used may be a silicone type, a silica-silicone type, a metallic soap, an amide type, or a polyether type.

One or more dyes may also be employed. Examples of the dyes include Direct Black GW, Capamine Black ESA, Rodamine B, Rodamine 7G, methylene blue, Direct Fast Orange, Complantine Green G, Milling Yellow O and Katione Pink FG.

A specific composition of the inking medium for use with an ink jet printer will now be illustrated.

| | |
|---|---|
| Complex salt of cinnamic acid with neodymium and ytterbium (0.2 in average particle size) | 80 parts by weight |
| Phthalocyanine blue | 1 part by weight |
| Cation-type acrylic resin | 20 parts by weight |
| Polyethylene glycol | 1 part by weight |
| Dioctyl phthalate | 0.5 part by weight |
| KCl | 0.5 part by weight |
| Defoaming agent | 0.4 part by weight |
| Water | 100 parts by weight |
| Ethanol | 20 parts by weight |

The composition was mixed and dispersed in a sand mill for one hour to provide the fluorescent inking medium for use with the ink jet printer which was subsequently used in the ink jet printer to accomplish a printing of characters on a paper.

Observation on the printed characters has indicated that no ink run occurred and that the characters were printed precisely in a blue color.

To detect the printed characters optically, 100 identical reading tests were carried out at a reading speed of 4 m/sec by irradiating the printed characters by the exciting light having a maximum intensity in the vicinity of a wavelength of 970 nm to emit fluorescent light which was then received by a silicon photodiode detector. As a result, the information was assuredly read out each time the reading test was conducted.

It is to be noted that in the above described composition of the inking medium, the amount of any one of phthalocyanine blue, polyethylene glycol, dioctyl phthalate, water and ethanol added may be either increased or decreased if desired and that the use of one or more of them may be dispensed with if desired.

As listed in the above table of composition of the inking medium, if where water is employed for the solvent an easily volatilizeable organic liquid such as, for example, alcohol having a compatibility with water is employed in combination with water, the resultant fluorescent composition is quick to dry and is, therefore, effectively utilized when such fluorescent composition is to be printed on, for example, papers and, in particular, where a relatively large amount of the solvent is employed such as that used with the ink jet printer.

Figure 5:
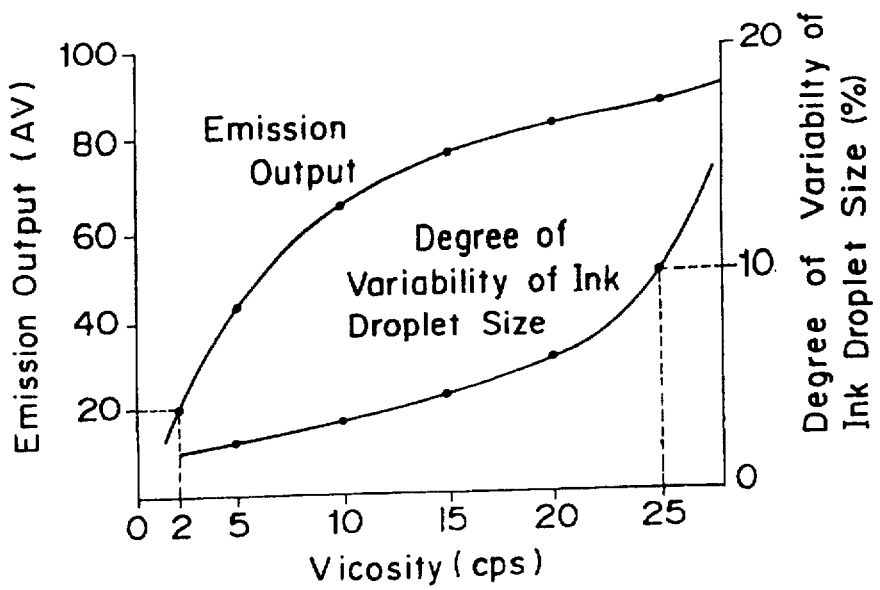
FIG. 5 is a graph showing the relationship among the viscosity of an inking medium of the present invention for use with an ink jet printer according to the present invention, a relative output and the degree of variability of the size of a droplet of the inking medium.

In the above described composition of the inking medium, using different inking mediums of a substantially identical composition, but in which the quantity of cation-type acrylic resin added was varied to provide a differing viscosity, the relationship among the viscosity of each inking medium, the degree of variability of the size of droplets of the respective inking medium and the relative emission output of the fluorescent ink deposit formed by the use of the respective inking medium was examined, a result of which is shown in FIG. 5.

As can readily be understood from FIG. 5, when the viscosity of the inking medium for use with the ink jet printer is within the range of 2 to 25 cps and preferably within the range of 10 to 20 cps, the degree of variability of the ink droplet size is smaller than 10% indicating that the ink droplets of a substantially uniform size could be obtained sufficient to result in an excellent printability and, also, a sufficient emission output could be obtained.

Figure 6:
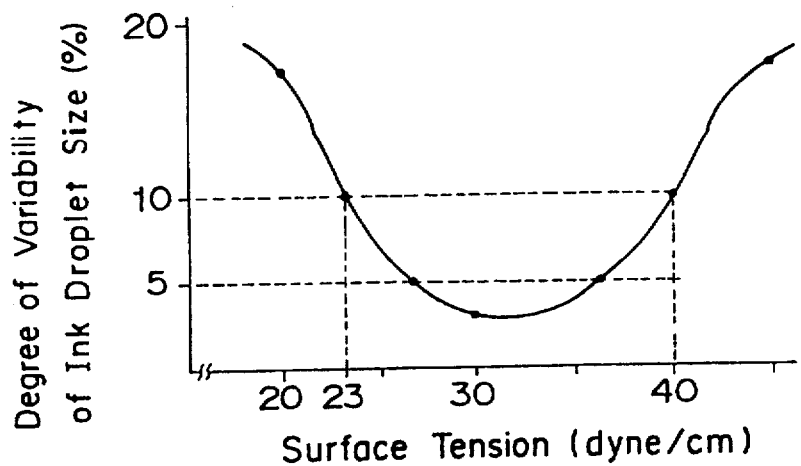
FIG. 6 is a graph showing the relationship among the surface tension of the inking medium of the present invention for use with the ink jet printer and the degree of variability of the size of the ink droplet.

In the above described composition of the inking medium, using different inking mediums of a substantially identical composition, but in which the quantity of ethanol added was varied to provide a differing surface tension, the relationship between the surface tension of each inking medium and the degree of variability of the size of droplets of the respective inking medium was examined, a result of which is shown in FIG. 6.

As can readily be understood from FIG. 6, when the surface tension of the inking medium for use with the ink jet printer is within the range of 23 to 4-dyne/cm and preferably within the range of 26 to 37 dyne/cm, the degree of variability of the size of the ink droplets is small and the ink droplets of a uniform size required by the ink jet printer could be obtained accompanied by an excellent printability.

Figure 7:
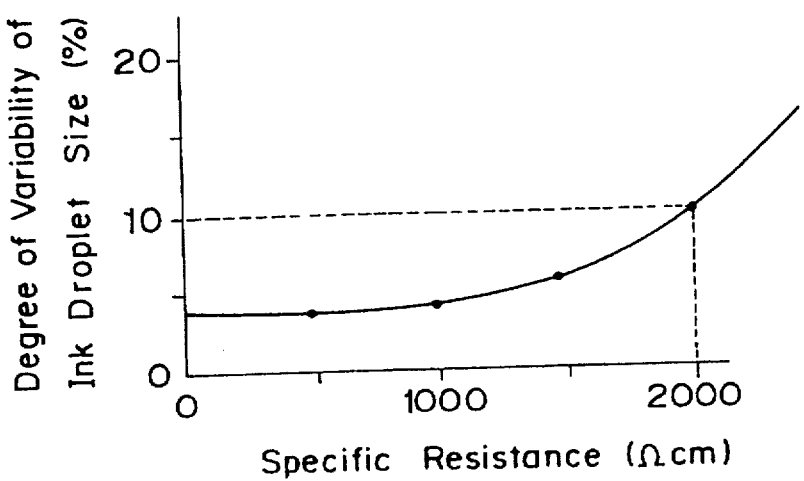
FIG. 7 is a graph showing the relationship between the specific resistance of the ink droplet and the degree of variability of the ink droplet.

In the above described composition of the inking medium, using different inking mediums of a substantially identical composition, but in which the quantity of the electrolyte (KCl) added was varied to provide a differing specific resistance, the relationship between the specific resistance of each inking medium and the degree of variability of the size of droplets of the respective inking medium was examined, a result of which is shown in FIG. 7.

As can readily be understood from FIG. 7, when the specific resistance of the inking medium for use with the ink jet printer is equal to or lower than 2,000 Ω·cm and preferably equal to or lower than 1,500 Ω·cm, the degree of variability of the size of the ink droplets is small and the ink droplets of a uniform size required by the ink jet printer could be obtained accompanied by an excellent printability. It is, however, to be noted that if the specific resistance of the inking medium for use with the ink jet printer exceeds 2,000 Ω·cm, and if the ink jet printer is particularly of a charged deflection printing system, control of deflection of the ink droplets will become difficult to accomplish, resulting in a reduction in print quality with flaws and/or skews appearing in the printed characters.

Figure 8:
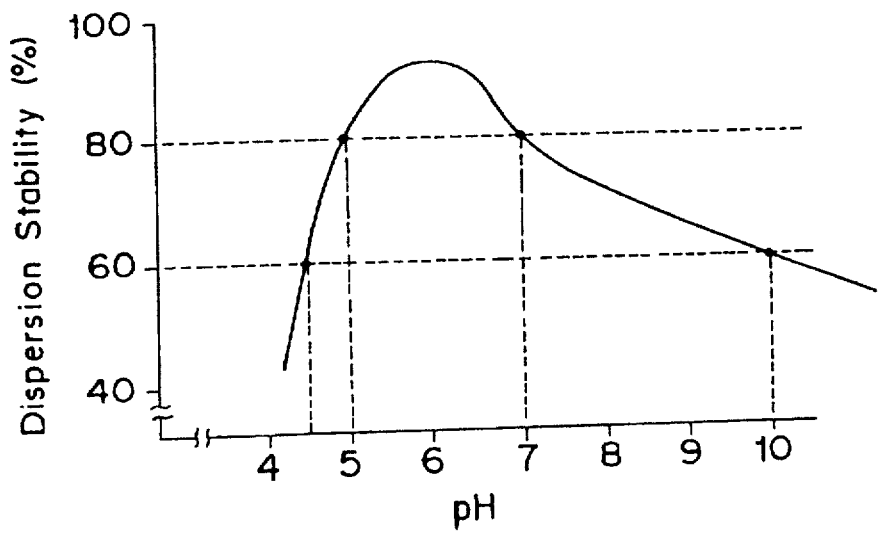
FIG. 8 is a graph showing the relationship between the pH value of the inking medium of the present invention for use with the ink jet printer and the dispersion stability.

In the above described composition of the inking medium, using different inking mediums of a substantially identical composition, but in which KOH was added in addition to KCL and the quantity of KOH added was varied to provide a differing pH value, the relationship between the pH value and the dispersion stability of the respective inking medium was examined, a result of which is shown in FIG. 8. It is to be noted that the dispersion stability is expressed in terms of the percentage of a supernatant liquid relative to the total amount of the respective inking medium, which supernatant liquid was obtained after the respective inking medium had been allowed to stand for one week.

As can readily be understood from FIG. 8, when the pH value of the inking medium is within the range of 4.5 to 10 and preferably within the range of 5 to 7, both the dispersibility and the dispersion stability of the inking medium are extremely satisfactory. It is, however, to be noted that if the pH value of the inking medium for use with the ink jet printer is smaller than 4.5 or greater than 10, the dyes used in the inking medium tend to coagulate.

Thus, when the inking medium of the present invention for use with an ink jet printer is prepared to a viscosity within the range of 2 to 25 cps, a surface tension within the range of 23 to 40 dyne/cm, a specific resistance not higher than 2,000 Ω·cm and a pH value within the range of 4.5 to 10, the inking medium excellent in dispersion stability, substantially free from ink run, excellent in printability and high in emission output can be obtained.

Fluorescent Composition 2

The fluorescent substance of the present invention comprises a salt of oxyacid containing one or more elements selected from the group consisting of Nd, Yb and Er. While specific examples of this salt of oxyacid include vanadate, phosphate, borate, molybdate and tungstate, the use of the phosphate compound is recommended because of its excellent chemical resistance.

More specifically, this fluorescent substance comprises phosphate having one of the following general chemical formulas:

$$Ln_xA_{1-x}PO_4 \qquad (1)$$

wherein Ln represents at least one element selected from the group consisting of Nd, Yb and Er, A represents at least one element selected from the group consisting of Y, La, Gd, Bi, Ce, Lu, In and Tb, and X represents a value within the range of 0.01 to 0.99.

$$DE_{1-x}Ln_xP_yO_z \qquad (2)$$

wherein D represents at least one element selected from the group consisting of Li, Na, K, Rb and Cs, E represents at least one element selected from the group consisting of Y, La, Gd, Bi, Ce, Lu, In and Tb, Ln represents at least one element selected from the group consisting of Nd, Yb and Er, X represents a value within the range of 0.01 to 0.99, Y represents a value within the range of 1 to 5, and Z represents a value within the range of 4 to 14. It is, however, to be noted that the element D in the general chemical formula (2) may not necessarily be employed.

Specific examples of charge stocks used to prepare the fluorescent substances are shown in FIGS. 9 and 10 wherein Samples 1 to 14 pertains to the present invention while Sample 15 pertains to a comparison, and the calcinating temperature at which each composition shown in FIGS. 9 and 10 was calcinated and the composition of each of the resultant infrared-excitable fluorescent substances are shown in FIGS. 11 and 12 together with their particle size.

The charge stocks for each of Samples 1 to 15 shown in FIGS. 9 and 10 were, after having been calcinated at the temperature specified in FIGS. 11 and 12 for each Sample, treated with a hot water and 1 mole of nitric acid to remove non-reacted materials to thereby provide the respective infrared-excitable fluorescent substance.

As FIGS. 11 and 12 make it clear, the fluorescent substances obtained according to the embodiment of the present invention have a particle size of not greater than 4 μm which is smaller than the particle size (6 μm) of the fluorescent substance according to the comparison. In particular, some of the fluorescent substances according to the embodiment of the present invention has a particle size not greater than 1 μm and which is smaller than the wavelength of the maximum intensity of the exciting light and that of the maximum intensity of the fluorescent light.

Observation of the fluorescent particles with the use of a scanning electron microscope has indicated that the shape and size of the fluorescent particles were substantially uniform, representing no acicular shape, but a shape similar to stones on a river-shore.

Figure 13:
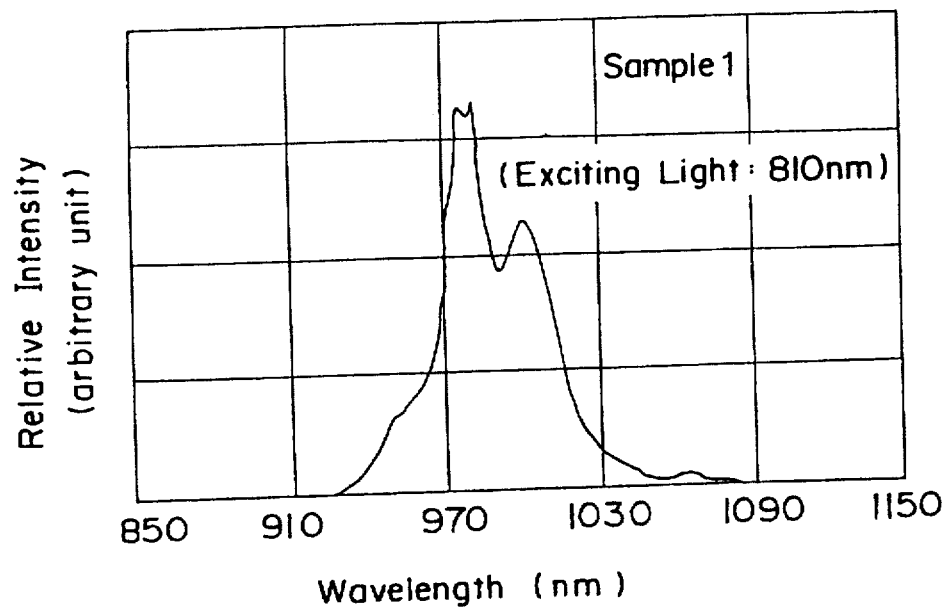
FIG. 13 is a diagram showing an emission spectrum of the fluorescent substance in the sample 1 according to an embodiment of the present invention.
Figure 14:
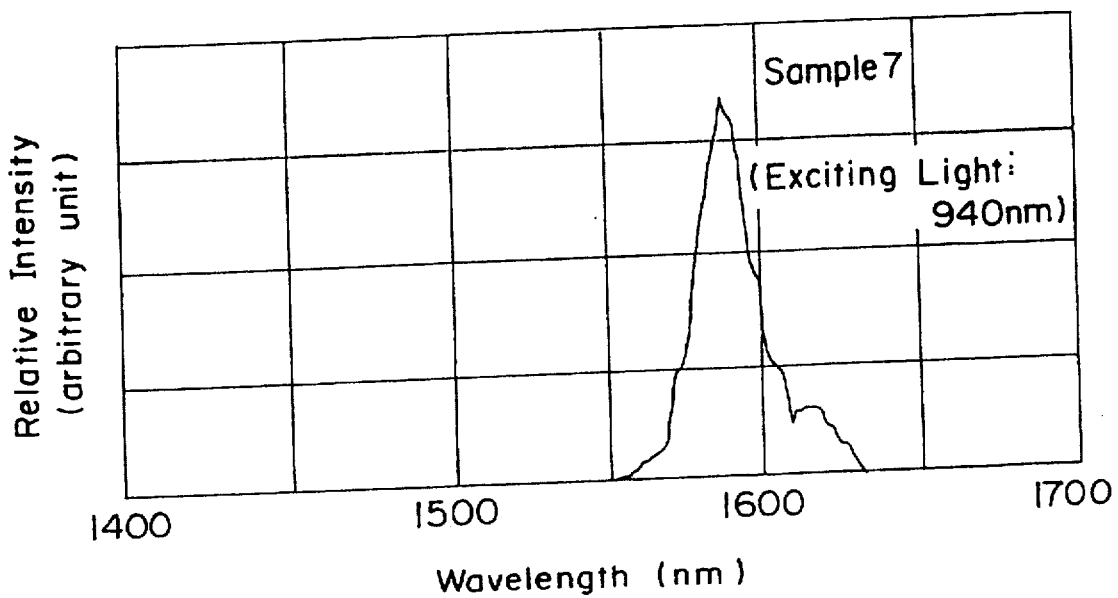
FIG. 14 is a diagram showing an emission spectrum of the fluorescent substance in the sample 7 according to an embodiment of the present invention.
Figure 15:
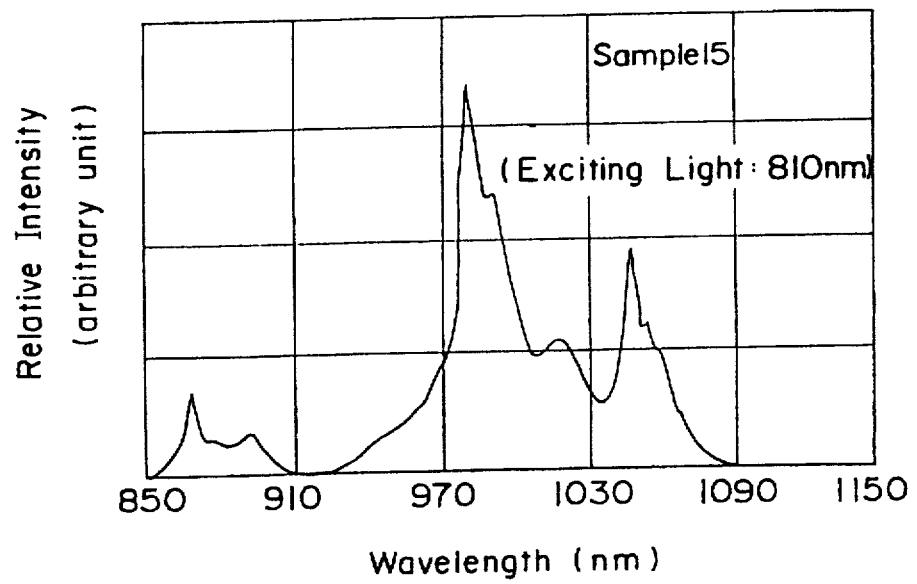
FIG. 15 is a diagram showing an emission spectrum of the fluorescent substance in the sample 17 which pertains to a comparison.

Emission spectra of Samples 1 and 7 according to the embodiment of the present invention and of Sample 15 according to the comparison are shown in FIGS. 13, 14 and 14, respectively. As shown in FIG. 13, Sample 1 having an average particle size of 0.6 μm has exhibited the wavelength of the fluorescent light which is 0.98 μm (980 nm) in response to the wavelength of 0.81 μm (810 nm) of the exciting light. Thus, the average particle size of Sample 1 is extremely smaller than the wavelength of both of the exciting light and the fluorescent light. Similarly, FIG. 14 makes it clear that the average particle size of Sample 7, which is 1.0 μm, is extremely smaller than the wavelength of both of the exciting light and the fluorescent light emitted thereby.

Other constituents of the fluorescent composition, such as, for example, binder and solvent, than that shown may be identical with those previously discussed in connection with the Fluorescent Composition 1, and therefore they are not reiterated for the sake of brevity.

Fluorescent Composition 3

The fluorescent substance containing Fe and Er, both as an optical active element, and at least one element selected from the group consisting of Sc, Ga, Al, In, Y, Bi, Ce, Gd, Lu and La is used.

More specifically, this fluorescent substance is an infrared-excitable fluorescent substance having one of the following general chemical formulas:

$$G_3J_5O_{12} \quad (3)$$

$$GJO_3 \quad (4)$$

$$G_4J_4O_{12} \quad (5)$$

wherein G represents Er and at least one element selected from the group consisting of Y, Bi, Ce, Gd, Lu and La and J represents Fe and at least one element selected from the group consisting of Sc, Ga, Al and In.

The respective fluorescent substance having one of the above general chemical formulas is in practice employed alone or in the form of a mixture.

Specific examples of the infrared-excitable fluorescent substance include those expressed by the following chemical formulas:

$$Er_{0.2}Y_{2.8}Fe_{1.5}Al_{3.5}O_{12} \quad \text{a.}$$

$$Er_{0.5}Y_{2.5}Fe_{1.5}Ga_{3.5}O_{12} \quad \text{b.}$$

$$Er_{0.2}Lu_{2.8}Fe_{2.5}Al_{3.5}O_{12} \quad \text{c.}$$

$$Er_{0.05}La_{0.95}Fe_{0.3}Al_{0.7}O_3 \quad \text{d.}$$

$$Er_{0.02}La_{0.98}Fe_{0.1}Ga_{0.9}O_3 \quad \text{e.}$$

A method of preparing these fluorescent substances will now be described.

After charge stocks of a quantity shown in terms of gram in FIG. 16 had been sufficiently mixed in a mortar, the charge stocks were calcinated at the respective temperature specified in FIG. 16 and then treated with a hot water and 2 moles of nitric acid to remove non-reacted materials to thereby provide the respective infrared-excitable fluorescent substances which are identified by Samples 16 to 20 in FIG. 16.

Figure 17:
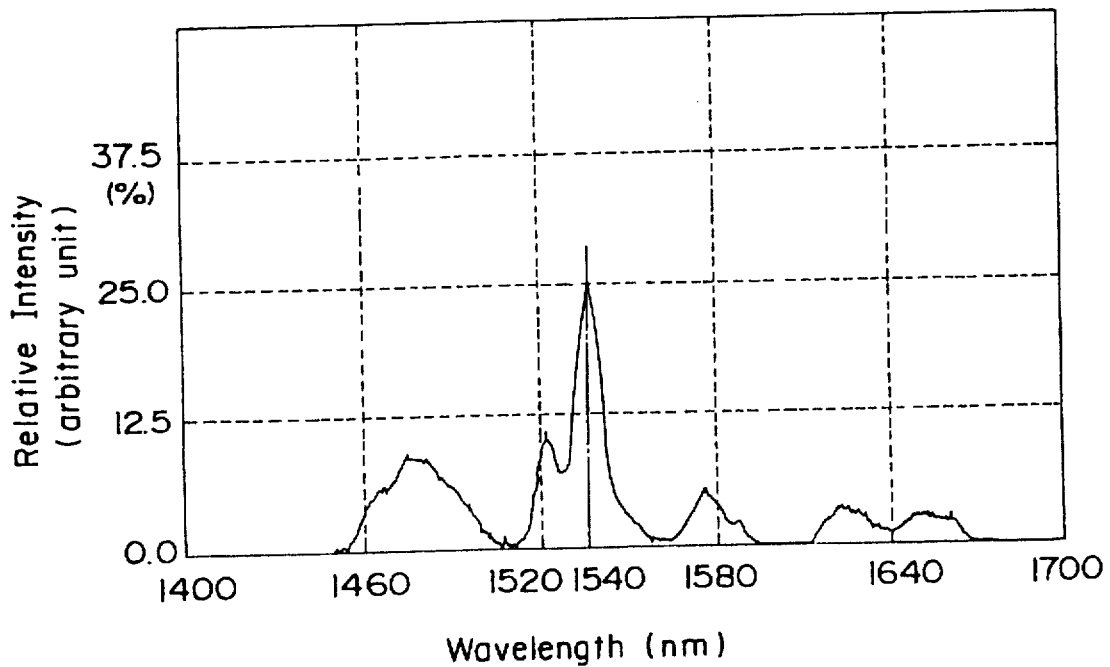
FIG. 17 is a diagram showing an emission spectrum exhibited by the fluorescent substance, $(ErY)_3(FeAl)_5O_{12}$, in the sample 16 according to the embodiment of the present invention.

An emission spectrum of Sample 16, that is, $(ErY)_3(FeAl)_5O_{12}$, is shown in FIG. 17. A spectral sensitivity characteristic of a Ge photodiode is shown in FIG. 18 and a spectral sensitivity characteristic of an InGaAs photodiode is shown in FIG. 19.

Figure 18:
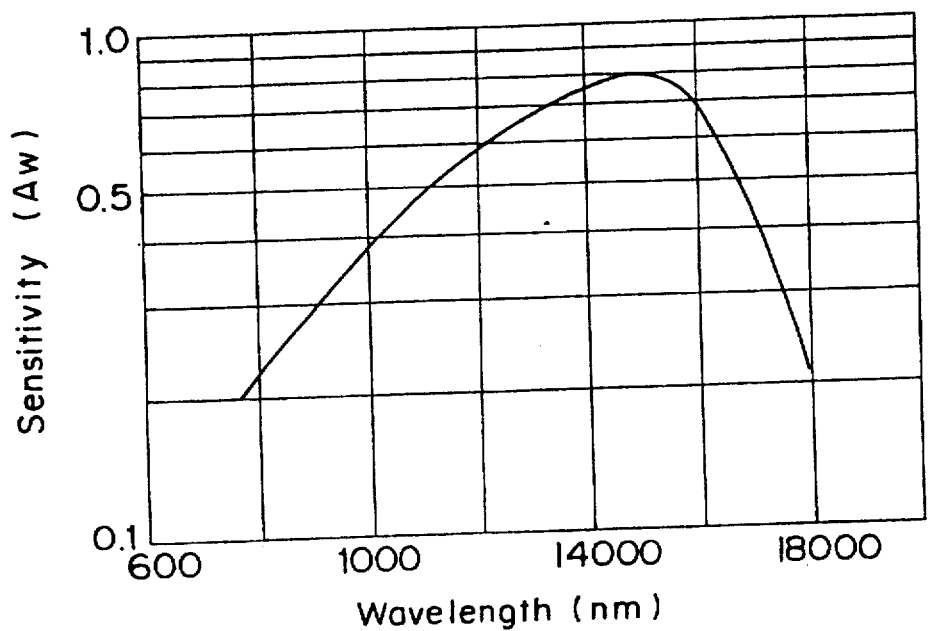
FIG. 18 is a graph showing a pattern of distribution of spectral sensitivity of a Ge photodiode.
Figure 19:
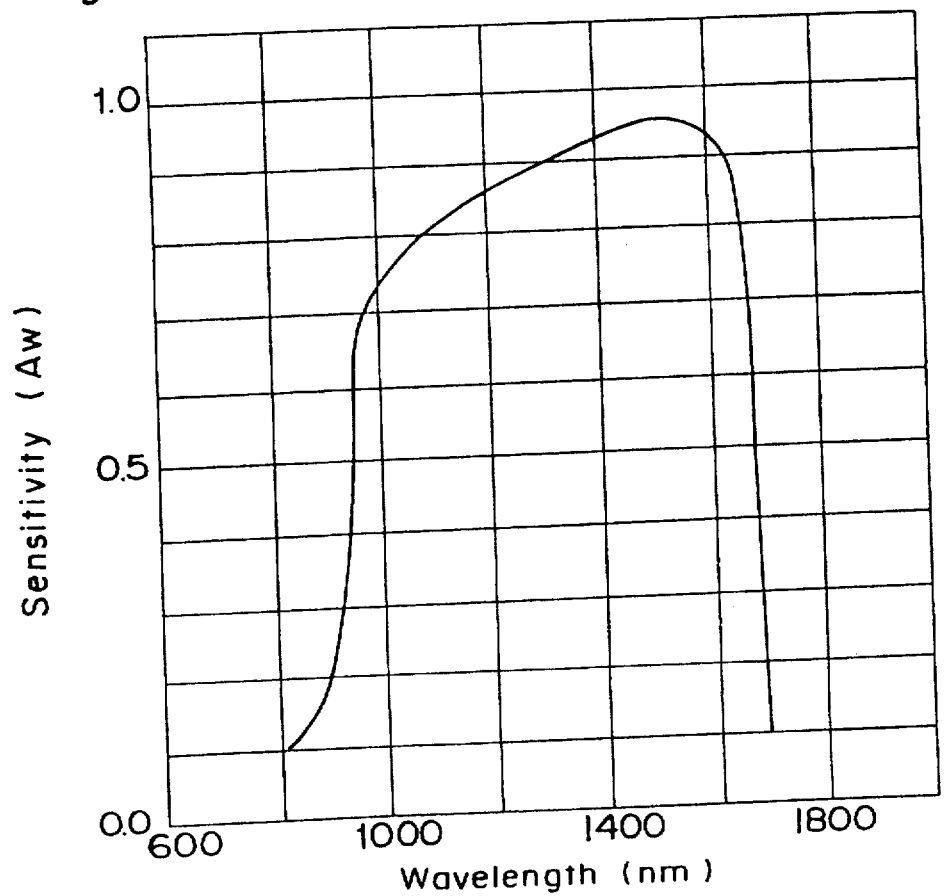
FIG. 19 is a graph showing a pattern of distribution of spectral sensitivity of an InGaAs photodiode.

Since while as shown in FIG. 17 the emission spectrum of the fluorescent substance containing Er exhibits a peak value at about 1,540 nm, the Ge photodiode and the InGaAs photodiode have a high sensitivity at a wavelength within the range of 1,400 to 1,600 as shown in FIGS. 18 and 19, respectively, these photodiode can be advantageously employed as a light receiving element for the purpose of the present invention and the use thereof is specifically advantageous in that a fine fluorescent mark such as a pattern of code bars can be accurately and assuredly read out even though a high reading speed is employed.

It is, however, to be noted that other than those photodiodes discussed above, any one of a PbS photodiode (sensitive to light of about 600 to 1,800 nm) and a PbSe photodiode (sensitive to light of 1,000 to 4,500 nm) may be equally employed.

The absorption and emission spectrum characteristics discussed above can be equally exhibited even with the other infrared-excitable fluorescent substances containing Fe or Er.

Fluorescent Composition 4

The fluorescent substance containing Yb as an optical active element, and at least one element selected from the group consisting of Sc, Ga, Al, In, Y, Bi, Ce, Gd, Lu and La is used.

More specifically, this fluorescent substance is an infrared-excitable fluorescent substance having one of the following general chemical formulas:

$$L_3M_5O_{12} \quad (6)$$

$$LMO_3 \quad (7)$$

$$L_2M_4O_{12} \quad (8)$$

wherein L represents Yb and at least one element selected from the group consisting of Y, Bi, Ce, Gd, Lu and La and M represents Fe and at least one element selected from the group consisting of Sc, Ga, Al and In.

The respective fluorescent substance having one of the above general chemical formulas is in practice employed alone or in the form of a mixture.

Specific examples of the infrared-excitable fluorescent substance include those expressed by the following chemical formulas:

| | |
|---|---|
| a. $Yb_{0.3}Y_{2.7}Al_5O_{12}$ | (Sample 21) |
| b. $Yb_{0.2}Gd_{2.5}Ga_{0.5}Al_{4.5}O_{12}$ | (Sample 22) |
| c. $Yb_{0.4}Y_{2.6}Ga_5O_{12}$ | (Sample 23) |
| d. $Yb_{0.1}La_{0.95}AlO_3$ | (Sample 24) |
| e. $Yb_{0.05}La_{0.95}Ga_{0.1}Al_{0.9}O_3$ | (Sample 25) |

Figures 20, 21:
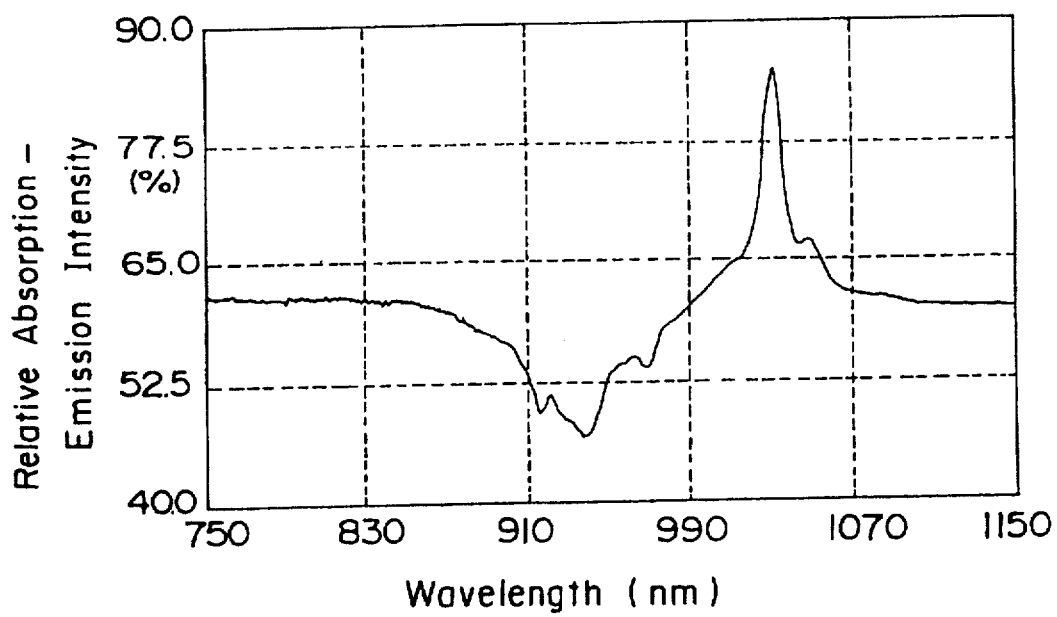
FIG. 20 is a chart showing charge stocks of various fluorescent substances in respective samples 21 to 25, which pertain to respective embodiments of the present invention, mixing ratios thereof and calcination temperatures.
FIG. 21 is a diagram showing an emission spectrum exhibited by the fluorescent substance, $Yb_{0.3}Y_{2.7}Al_5O_{12}$, in the sample 21 according to the embodiment of the present invention.

After charge stocks of a quantity shown in terms of gram in FIG. 20 had been sufficiently mixed in a mortar, the charge stocks were calcinated at the respective temperature specified and then treated with a hot water and 2 moles of nitric acid to remove non-reacted materials to thereby provide the respective infrared-excitable fluorescent substances which are identified by Samples 21 to 25 identified in FIG. 20.

An absorption spectrum of Sample 21, that is, $Yb_{0.3}Y_{2.7}Al_5O_{12}$, is shown in FIG. 21.

As this figure makes it clear, this fluorescent substance exhibits a peak absorption spectrum at a wavelength of about 910 to about 950 nm. Therefore, if irradiated by the exciting light of a wavelength within such range, such fluorescent substance emits a fluorescent light having a peak value of about 1,030 nm.

Figure 22:
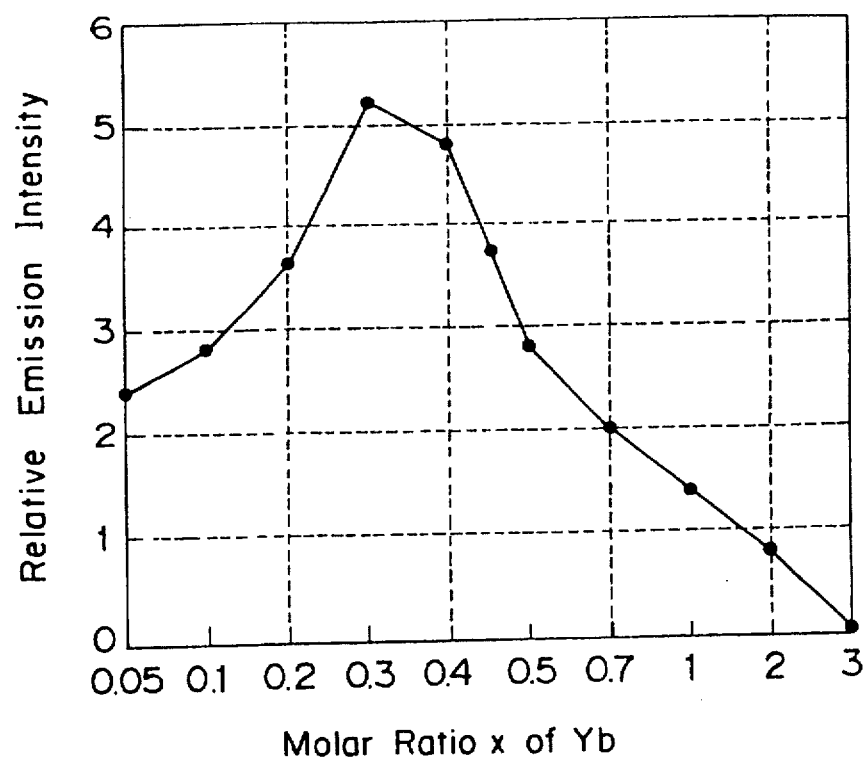
FIG. 22 is a graph showing a change in emission intensity with change in molar ratio X of Yb in the fluorescent substance, $Yb_xY_{1-x}Al_5O_{12}$, according to the embodiment of the present invention.

FIG. 22 illustrates a change in intensity of the fluorescent light emitted by the fluorescent substance, $Yb_xY_{1-x}Al_5O_{12}$, which took place when the molar ratio X of Yb contained in such fluorescent substance was varied.

As FIG. 22 makes it clear, when the molar ratio of Yb in the fluorescent substance, $Yb_xY_{1-x}Al_5O_{12}$, exceeds 0.7, the emission intensity of the fluorescent light lowers. Therefore, it is clear that if the molar ratio X of Yb is chosen to be within the range of 0.05 to 0.7, preferably within the range of 0.1 to 0.5 and more preferably within the range of 0.2 to 0.45, the emission intensity of the fluorescent light is high.

Observation of the particles of $Yb_xY_{1-x}Al_5O_{12}$ with the use of a scanning electron microscope has indicated that they have generally smooth surfaces with no substantial surface irregularity and of a generally uniform size, neither extremely big nor extremely small, and of a generally round shape similar to a shape of a fruit. The fluorescent particles of a particle size within the range of 1 to 3 μm occupy 60 wt % or more (or about 80 wt %) of the fluorescent particles relative to the total weight thereof, and an average shape ratio (the ratio of the minor axis relative to the major axis) of the fluorescent particles is not greater than 2.0, most of them being round in shape with no acicular particle sufficient to exhibit a satisfactory dispersibility in the binder used.

Fluorescent Composition 5

The fluorescent substance comprising a rare earth element containing organic material containing at least one rare earth element selected from the group consisting of Nd, Yb or Er and carrying an organic material capable of absorbing infrared rays of light of 700 to 1,000 nm is used.

The organic material referred to above may be one or more organic materials selected from the group consisting of polymethine, anthraquinone, dithiol metal, phthalocyanine, indophenol and azo dyes.

More specifically, the polymethine dyestuff referred to above includes, for example, "IR-125", "IR-140" (available from Kodak Laboratories Chemicals) or "IR-820B" (available from Nippon Kayaku Kabushiki Kaisha). The anthraquinone dyestuff referred to above includes, for example, "IR 750" (available from Nippon Kayaku Kabushiki Kaisha). The dithoile metal dyestuff referred to above includes, for example, "Tetrabutyl phosphonium-bis-(1,2-benzene chiolite) nicolayite (III)" available from Mitsui Toatsu Kabushiki Kaisha. The phthalocyanine dyestuff includes, for example, Zn-naphthalocyanine or the like. In addition of these dyestuff, indophenol and azo dyestuff may also be used. Of them the use of the products identified by "IR 125", "IR 140", "IR 750" or "IR 820B" are preferred because they exhibit an emission intensity which is high for unitary weight thereof.

The reason that when the organic material capable of absorbing the infrared rays of light is carried on the rare earth element, the emission intensity during a high speed reading can be increased to a value higher than that exhibited by the rare earth element alone appears to be as follows.

Namely, during a process in which energies absorbed by the organic material capable of absorbing the infrared rays of light are returned to a ground state, the energies are transferred to the organic material containing at least one rare earth element selected from the group consisting of Nd, Yb and Er to thereby sensitize the fluorescing action of the rare earth element.

The fluorescent substance that can carry the organic material having a sensitizing capability should contain at least one rare earth element selected from the group consisting of Nd, Yb and Er and would not pose any problem if it is added optionally with one or more other elements.

The organic material containing the rare earth element selected from the group consisting of Nd, Yb and Er may be of any type provided that it forms a complex or salt with the rare earth element. Examples of them include organic carboxylic acids such as benzoic acid, anise acid, toluic acid, cinnamic acid and lauric acid, β-diketones such as benzotrifluoroacetone and thenoyltrifluoroacetone and cyclic ethers such as 15-crown-5 and 18-crown-6.

Of them, most of the organic materials to be carried have an aromatic ring or a heterocycle and, if the organic material of the organic material containing tone or more rare earth elements selected from the group consisting of Nd, Yb and Er is aromatic carboxylic acid, interaction between such organic material and the rare earth element or elements selected from the group consisting of Nd, Yb and Er will be strengthened to increase the capability to carry.

Although a method of synthesizing the organic material containing the rare earth element may not be limited to a specific one, synthesis of the aromatic carboxylic acid containing at least one rare earth element selected from the group consisting of Nd, Yb and Er can be accomplished by the use of the ion-exchange reaction in the aqueous solution such as reported by M. D. Taylor, supra, or the elimination reaction of isopropoxide in a non-polarity solvent such as reported by P. N. Kapoor, supra.

The quantity of the organic material containing the rare earth element or elements selected from the group consisting of Nd, Yb and Er, that is contained in the organic material capable of absorbing the infrared rays of light may be of any desired value, but preferably within the range of 0.001 to 10 wt %. If the content of the organic material is smaller than the lowermost limit of 0.001 wt %, the absorption of the exciting light will be lowered to such an extent as to result in reduced emission of the fluorescent light from the organic material containing the rare earth element or elements. On the other hand, if the content of the organic material is greater than the uppermost limit of 10 wt %, the concentration of the organic material capable of absorbing the infrared rays of light will increase resulting in energy exchange between the organic materials and, consequently, the emission of the fluorescent light from the organic material containing the rare earth element or elements will be lowered.

Where the infrared-excitable fluorescent substance carrying this organic material is used as an inking medium, any type of commercially available binder may be employed, but the use of polyvinyl alcohol (PVA) or an acrylic resin is preferred for the binder because of the carrying capability of the organic material.

If desired, a solvent may be employed. Examples of the solvent that can be used include water, alcohol, ketone, ester, ether, aromatic hydrocarbon and fatty hydrocarbon or a mixture thereof.

Depending on the printing method in which the infrared-excitable fluorescent inking composition is used, one or more of a dispersant, a defoaming agent, a surface active agent, a humectant and a charge imparting agent may be employed. Also, if desired, any color conditioning dye and/or a fluorescent dye may be employed.

Hereinafter, the fluorescent substance of the present invention will be illustrated by way of examples.

EXAMPLE 1

1 part by weight of complex salt of cinnamic acid with neodymium and ytterbium was suspended in 20 parts by weight of water and was then, while being stirred, added dropwise with a solution prepared by dissolving 0.005 part by weight of anthraquinone dyestuff ("IR 750" available from Nippon Kayaku Kabushiki Kaisha. Absorption peak at 750 nm) into 1 part by weight of DMF. After one hour stirring, the mixture was filtered and dried to obtain the infrared-excitable fluorescent substance.

EXAMPLE 2

1 part by weight of complex salt of cinnamic acid with neodymium and ytterbium was suspended in 20 parts by weight of water and was then, while being stirred, added dropwise with a solution prepared by dissolving 0.003 part by weight of polymethine dyestuff ("IR-820B" available from Nippon Kayaku Kabushiki Kaisha. Absorption peak at 820 nm) into 1 part by weight of DMF. After one hour stirring, the mixture was filtered and dried to obtain the infrared-excitable fluorescent substance.

EXAMPLE 3

1 part by weight of ytterbium benzoate was suspended in 20 parts by weight of water and was then, while being stirred, added dropwise with a solution prepared by dissolving 0.003 part by weight of polymethine dyestuff ("IR-820B" available from Nippon Kayaku Kabushiki Kaisha. Absorption peak at 820 nm) into 1 part by weight of DMF. After one hour stirring, the mixture was filtered and dried to obtain the infrared-excitable fluorescent substance.

Comparison 1

The infrared-excitable fluorescent substance was prepared by pulverizing $LiNd_{0.5}Yb_{0.5}P_4O_{12}$ with the use of a ball mill.

Comparison 2

The infrared-excitable fluorescent substance was obtained in a manner similar to Example 1, except that the anthraquinone dye ("IR 750) used in Example 1 was not employed.

(High Speed Reading Test)

Each of the infrared-excitable fluorescent substances obtained under Examples 1 to 3 and Comparisons 1 and 2 was molded into a respective disc test-piece of 5 mm in diameter and 2 mm in thickness. A high speed reading test was carried out by scanning the testpiece at a speed of 8 m/sec, irradiating the testpiece by means of a commercially available GaAlAs light emitting diode and detecting the fluorescent light by means of a Si-PIN photodetector capable of detecting light of 970 nm. The exciting light emitted from the GaAlAs light emitting diode was of a wavelength varying depending on the exciting wavelength of the organic material (the wavelength of the exciting light required for the organic material to emit fluorescent light) so far as the respective fluorescent substances of Examples 1 to 3 are concerned. An optical filter ("IR-94" available from Fuji Photo Film Co., Ltd.) was placed in front of the photodetector. The result of the high speed reading test conducted on each of those fluorescent substances is shown in Table 1 below.

TABLE 1

| | Exciting Wavelength (nm) | Relative Intensity (%) |
|---|---|---|
| Example 1 | 760 | 700 |
| Example 2 | 800 | 650 |
| Example 3 | 760 | 800 |
| Comp. 1 | 800 | Failed |
| Comp. 2 | 800 | 100 |

Using the specific fluorescent substance and the specific binder, a fluorescent inking medium was prepared in the following manner.

EXAMPLE 4

| | |
|---|---|
| complex salt of cinnamic acid with neodymium and ytterbium | 1 parts by weight |
| Anthraquinone dyestuff (IR 750) | 0.005 part by weight |
| PVA | 4 parts by weight |
| Water/EtOH (8/2) | 20 parts by weight |

This composition was dispersed for 24 hours in a ball mill to provide the inking medium which was subsequently loaded in an ink jet printer to for a fluorescent mark.

Comparison 3

A fluorescent mark was formed in a manner similar to Example 4, except that the complex salt of cinnamic acid with neodymium and ytterbium used in Example 4 was not used.

Comparison 4

A fluorescent mark was formed in a manner similar to Example 4, except that the anthraquinone dyestuff (IR 750) used in Example 4 was not used. However, in Table 2 below, the fluorescent mark irradiated by the exciting wavelength of 760 nm and the fluorescent mark irradiated by the exciting wavelength of 800 nm are identified by (a) and (b), respectively.

EXAMPLE 5

| | |
|---|---|
| Ytterbium cinnamate | 1 parts by weight |
| Polymethine dyestuff (IR 820) | 0.003 part by weight |
| PVA | 4 parts by weight |
| Water/EtOH (8/2) | 20 parts by weight |

This composition was dispersed for 24 hours in a ball mill to provide the inking medium which was subsequently loaded in an ink jet printer to for a fluorescent mark.

Comparison 5

A fluorescent mark was formed in a manner similar to Example 5, except that the polymethine dyestuff (IR 820) used in Example 5 was not used.

Comparison 6

A fluorescent mark was formed in a manner similar to Example 5, except that the ytterbium cinnamate used in Example 5 was not used.

EXAMPLE 6

| | |
|---|---|
| Ytterbium benzoate | 1 parts by weight |
| Polymethine dyestuff (IR 820) | 0.005 part by weight |
| PVA | 4 parts by weight |
| Water/EtOH (8/2) | 20 parts by weight |

This composition was dispersed for 24 hours in a ball mill to provide the inking medium which was subsequently loaded in an ink jet printer to for a fluorescent mark.

Comparison 7

A fluorescent mark was formed in a manner similar to Example 6, except that the polymethine dyestuff (IR 820) used in Example 6 was not used.

Comparison 8

A fluorescent mark was formed in a manner similar to Example 6, except that the ytterbium benzoate used in Example 6 was not used.

(High Speed Reading Test)

Printed matter prepared by the use of each of the infrared-excitable fluorescent substances obtained under Examples 4 to 6 and Comparisons 3 to 7 was subjected to a high speed reading test. This high speed reading test was carried out by scanning the testpiece at a speed of 8 m/sec, irradiating the testpiece by means of a commercially available GaAlAs light emitting diode and detecting the fluorescent light by means of a Si-PIN photodetector capable of detecting light of 970 nm. The exciting light emitted from the GaAlAs light emitting diode was of a wavelength varying depending on the exciting wavelength of the organic material so far as the printed matters under Examples 4 to 6 and Comparisons 3, 6 and 8 are concerned. An optical filter ("IR-94" available from Fuji Photo Film Co., Ltd.) was placed in front of the photodetector. The result of the high speed reading test conducted on each of those printed matters is shown in Table 1 below.

TABLE 2

|           | Exciting Wavelength (nm) | Relative Intensity (%) |
|-----------|--------------------------|------------------------|
| Example 4 | 760                      | 100                    |
| Example 5 | 800                      | 100                    |
| Example 6 | 800                      | 120                    |
| Comp. 3   | 760                      | 30                     |
| Comp. 4 (a) | 760                    | Failed                 |
| Comp. 4 (a) | 800                    | 40                     |
| Comp. 5   | 800                      | 20                     |
| Comp. 6   | 800                      | 10                     |
| Comp. 7   | 800                      | 10                     |
| Comp. 8   | 800                      | 40                     |

As Tables 1 and 2 make it clear, the fluorescent substance obtained under each of Examples 1 to 3 results in a sufficient emission output during the high speed reading as compared with that under each of Comparisons 1 and 2. Also, the fluorescent substance obtained under each of Examples 1 to 3 can be excited to emit a fluorescent light in response to a varying exciting wavelength.

The inking medium obtained under each of Examples 4 to 6 is suited for use with the ink jet printer.

Fluorescent Composition 6

The water-resistance of the fluorescent substance was increased by employing, as a matrix material, a salt prepared from at least one of Nd and Yb as an optical active element, an oxide of at least one of Mo and W and an alkaline earth metal.

Preferably, the atomic ratio s of the optical active element relative to the oxide of at least one of Mo and W is greater than 0, but equal to or smaller than 2, and the atomic ratio t of the alkaline earth metal relative to such oxide is greater than 0, but equal to or smaller than 3.

More specifically, the fluorescent substance having an increased water resistance is a compound of the following general formula (9):

$$(Nd_{1-X}Yb_X)_Y Q_Z(RO_4) \quad (9)$$

wherein Q represents at least one element selected from the group consisting of Ca, Mg, Sr and Ba, R represents at least one element selected from the group consisting of Mo and W, X represents a value within the range of 0 to 1, Y represents a value greater than 0, but smaller than 1, and Z represents a value greater than 0, but smaller than 1.

Alternatively, the fluorescent substance is a compound of the following general formula (10):

$$(Nd_{1-X}Yb_X)_{2Y} Q_{8-3Y}(RO_4)_8 \quad (10)$$

wherein Q represents at least one element selected from the group consisting of Ca, Mg, Sr and Ba, R represents at least one element selected from the group consisting of Mo and W, X represents a value within the range of 0 to 1 and Y represents a value greater than 0, but equal to or smaller than 8/3.

It is to be noted that X and Y are preferred to be $0.02 \leq X \leq 0.6$ and $1/3 \leq Y \leq 5/3$, respectively. If X is smaller than 0.02, the concentration of Yb which is the emission center responsible for the emission will be lowered, and on the other hand, if X is greater than 0.6, the concentration of Nd which is a sensitizer for absorbing the exciting light will be lowered, both resulting in possible reduction in emission intensity. Also, if Y is smaller than 1/3, the concentration of Nd and Yb serving as an optical active element will be lowered, and on the other hand, if Y is greater than 5/3, the concentration of Nd and Yb will be increased to such an extent as to result in a concentration quenching, which in turn results in possible reduction in emission intensity.

Although examples of the alkaline earth metal include Ca, Mg, Sr and Ba, the use of Ca is particularly preferred. The content of the alkaline earth metal is preferred to be equal to or lower than 10 atomic percent. Also, for R in the formulas, Mo is preferred.

When this fluorescent substance is to be prepared, at least one optical active element of Nd or Yb, at least one oxide of Mo or W and the alkaline earth metal should be mixed together and then added to a flux material containing a salt expressed by $T_2RO_4 \cdot nH_2O$ (wherein T represents at least one element selected from the group consisting of Li, Na and K, R represents at least one element selected from the group consisting of Mo and W, and n represents numerical value equal to or greater than 0), followed by calcination. After the calcination, the fluorescent particles can be rendered extremely fine by dissolving the calcinated product with the use of a solvent to remove the flux material.

In the composition of the flux material, the use of Na and Mo for T and R is particularly preferred. The mixing molar ratio of the flux material relative to the fluorescent material is preferably equal to or greater than 1, but not greater than 10. If this molar ratio is smaller than 1, the flux material will not exhibit a satisfactory effect and the particles of the infrared-excitable fluorescent substance can hardly be divided into microparticles. On the other hand, if the molar ratio exceeds 10, the preparation would require an increased amount of material cost and the use of a bulky crucible, resulting in increased cost of manufacture.

The fluorescent substance so prepared is in the form of super microparticles of an average particle size not greater than 1 μm and is suited for use in the practice of a printing technique such as an ink jet printer and an ink ribbon.

This fluorescent substance is characterized in that the length of time required for the resultant fluorescent afterglow, subsequent to interruption of irradiation of the exciting light, to attain 10% of the emission output is within 500 μsec, and is therefor suited for use in a fluorescent detecting system in which the fluorescent light emitted by the irradiation of the exciting light of a pulsating period of 1 msec is identified or the fluorescent light emitted is identified at a run speed of not lower than 0.5 m/sec.

This fluorescent substance has an excellent water resistance as its water solubility exhibited when it is immersed in water for 20 hours is not higher than 2 wt %.

When an inking medium prepared by dispersing this fluorescent substance in a transparent binder for dispersing and retaining the fluorescent particles is coated on a length of tape, a thermally transferable ink ribbon can be obtained. Alternatively, such inking medium can be used with an ink jet printer. Since this fluorescent substance has an excellent water-resistance, it can be used as a paint.

The binder referred to above may be wax, a copolymer of polyvinyl chloride and vinyl acetate, a copolymer of ethylene and vinyl acetate, polyester resin, polyurethane resin or polycarbonate resin. If desired, a suitable plasticizer and/or a surface active agent may be added suitably.

According to the result of experiments conducted by the inventors in which, where anions of the matrix material are, for example, $MoO_4^{2-}$, comparison in water solubility was made between the conventional fluorescent substance in which the rare earth element is added to the matrix material, $Na_2MoO_4$, having cations in the form of $Na^+$ (an alkaline metal) and the fluorescent substance of the present invention in which the rare earth metal is added to the matrix material, $CaMoO_4$, having cations in the form of $Ca^{2+}$ (an alkaline metal), the fluorescent substance of the present invention did not dissolve even though immersed in water for 500 hours whereas the conventional fluorescent substance exhibited that about 10 wt % thereof dissolved when immersed in water for only 20 hours. Thus, the fluorescent substance of the present invention has a superior water resistance.

Specific examples will now be described.

(1) Preparation of Powdery Material 10 kinds of fluorescent substances were prepared in a manner as set forth under the following examples and comparisons and were tested to determine the shape of fluorescent particles, the average particle size thereof, the emission wavelength (the wavelength of the fluorescent light emitted in response to the exciting light), the length of time the afterglow persisted until the intensity of the fluorescent light attained 10% of the maximum intensity thereof, and the yield (expressed in terms of percent) based on the weight of the fluorescent substance which was measured after 100 parts by weight of the fluorescent substance was immersed in water for 500 hours and then dried. Results of comparison are shown in Table 3.

EXAMPLE 7

0.9 mole of $Nd_2O_3$, 1 mole of $Yb_2O_3$, 5 moles of $CaCO_3$ and 8 moles of $MoO_3$ were sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the powdery mixture was cooled and pulverized in a mortar to provide the fluorescent substance which is $Nd_{1.8}Yb_{0.2}Ca_5(MoO_4)_8$.

EXAMPLE 8

0.9 mole of $Nd_2O_3$, 0.1 mole of $Yb_2O_3$, 21 moles of $CaCO_3$ and 24 moles of $MoO_3$ were sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the powdery mixture was cooled and pulverized in a mortar to provide the fluorescent substance which is $Nd_{1.8}Yb_{0.2}Ca_{21}(MoO_4)_{24}$.

EXAMPLE 9

4.5 moles of $Nd_2O_3$, 0.5 mole of $Yb_2O_3$, 9 moles of $CaCO_3$ and 24 moles of $MoO_3$ were sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the powdery mixture was cooled and pulverized in a mortar to provide the fluorescent substance which is $Nd_9YbCa_9(MoO_4)_{24}$.

EXAMPLE 10

4.5 moles of $Nd_2O_3$, 0.5 mole of $Yb_2O_3$, 9 moles of $CaCO_3$ and 24 moles of $WO_3$ were sufficiently mixed and pulverized to give a powdery mixture which was subsequently filled in a crucible. This crucible containing the powdery mixture was heated in an electric furnace to 1,000° C. at a rate of about 250° C./hr to calcinate the powdery mixture at 1,000° C. for 2 hours. After the calcination, the powdery mixture was cooled and pulverized in a mortar to provide the fluorescent substance which is $Nd_9YbCa_9(WO_4)_{24}$.

EXAMPLE 11

1 mole of $Nd_2O_3$, 21 moles of $CaCO_3$ and 24 moles of $MoO_3$ were sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the powdery mixture was cooled and pulverized in a mortar to provide the fluorescent substance which is $Nd_2Ca_{21}(MoO_4)_{24}$.

EXAMPLE 12

0.9 mole of $Nd_2O_3$, 0.1 mole of $Yb_2O_3$, 5 moles of $CaCO_3$ and 8 moles of $MoO_3$ were mixed, in a molar mixing ratio of 1:8, with a powdery flux material which is $Na_2MoO_4 \cdot 2H_2O$. The mixture was sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the calcinated powdery mixture was cooled and ultrasonically flushed in pure water for 1 hour to remove the flux material, followed by drying at 120° C. for 2 hours to thereby provide the fluorescent substance which is $Nd_{1.8}Yb_{0.2}Ca_5(MoO_4)_8$.

Figure 23:
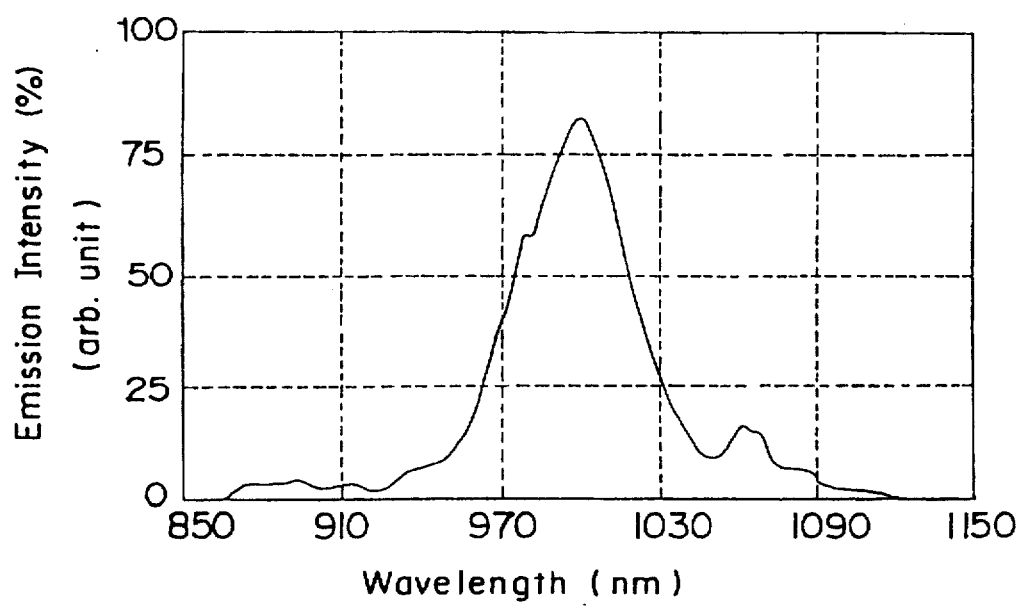
FIG. 23 is a diagram showing an emission spectrum of the fluorescent substance according to Example 12.
Figure 24:
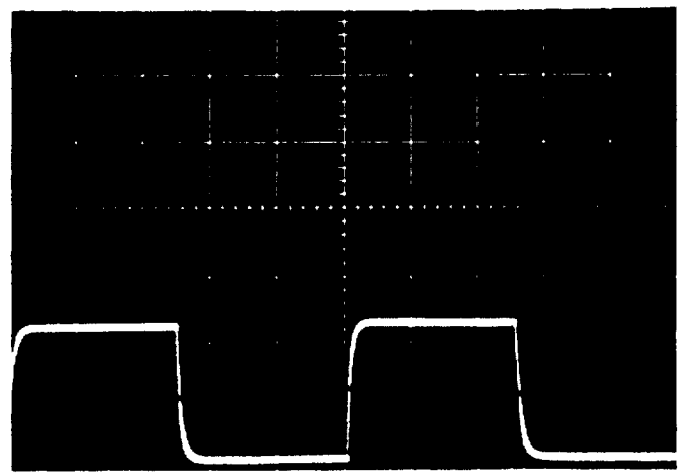
FIG. 24 is a photographic reproduction of a waveform of a response of the fluorescent substance in Example 12 to a pulsating exciting light.
Figure 25:
FIG. 25 is a microphotograph showing a particle structure of the fluorescent substance in Example 12.

An emission spectrum of this fluorescent substance is shown in FIG. 23, the waveform of a response of this fluorescent substance to the pulse-like exciting light is shown in FIG. 24, and a microscopic observation of the particle structure of this fluorescent substance is shown in FIG. 25.

EXAMPLE 13

0.9 mole of $Nd_2O_3$, 0.1 mole of $Yb_2O_3$, 5 moles of $CaCO_3$ and 8 moles of $MoO_3$ were mixed, in a molar mixing ratio of 1:6, with a powdery flux material which is $Na_2WO_4 \cdot 2H_2O$. The mixture was sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the calcinated powdery mixture was cooled and ultrasonically flushed in pure water for 1 hour to remove the flux material, followed by drying at 120° C. for 2 hours to thereby provide the fluorescent substance which is $Nd_{1.8}Yb_{0.2}Ca_5(MoO_4)_8$.

EXAMPLE 14

0.9 mole of $Nd_2O_3$, 0.1 mole of $Yb_2O_3$, 5 moles of $CaCO_3$ and 8 moles of $MoO_3$ were mixed, in a molar mixing ratio of 1:6, with a powdery flux material which is $K_2WO_4$. The mixture was sufficiently mixed and pulverized to give a powdery mixture which was subsequently filled in a crucible. This crucible containing the powdery mixture was heated in an electric furnace to 750° C. at a rate of about 180° C./hr to calcinate the powdery mixture at 750° C. for 2 hours. After the calcination, the calcinated powdery mixture was cooled and ultrasonically flushed in pure water for 1 hour to remove the flux material, followed by drying at 120° C. for 2 hours to thereby provide the fluorescent substance which is $Nd_{1.8}Yb_{0.2}Ca_5(MoO_4)_8$.

Comparison 9

0.9 mole of $Nd_2O_3$, 0.1 mole of $Yb_2O_3$, 5 moles of $N_2aCO_3$ and 8 moles of $MoO_3$ were mixed and sufficiently mixed and pulverized to give a powdery mixture which was subsequently filled in a crucible. This crucible containing the powdery mixture was heated in an electric furnace to 650° C. at a rate of about 160° C./hr to calcinate the powdery mixture at 650° C. for 2 hours. After the calcination, the calcinated powdery mixture was cooled and pulverized in a mortar to provide the fluorescent substance which is $Nd_{0.9}Yb_{0.1}Na_5(MoO_4)_4$.

Comparison 10

0.2 mole of $Nd_2O_3$, 0.2 mole of $Yb_2O_3$, 0.6 mole of $Y_2O_3$ and 12 moles of $LiH_2PO_4$ were mixed and sufficiently mixed and pulverized to give a powdery mixture which was subsequently filled in a crucible. This crucible containing the powdery mixture was heated in an electric furnace for 2 hours at 700° C. After the calcination, the calcinated powdery mixture was pickled in the presence of 1N of $HNO_3$ and subsequently washed with pure water to provide, after drying, the fluorescent substance which is $Nd_xYb_yY_{1-x-y}PO_4$.

response and is therefore suited for excitation by the pulse-like exciting light having even a short pulse duration and also for a high speed reading by means of a high speed scanner. Moreover, the fluorescent substance of the present invention has a high durability and, in particular, Examples 12 to 14 are effective to provide the fluorescent particles of a particle size not greater than 1 μm that is suited for various printing purposes.

Figure 26:
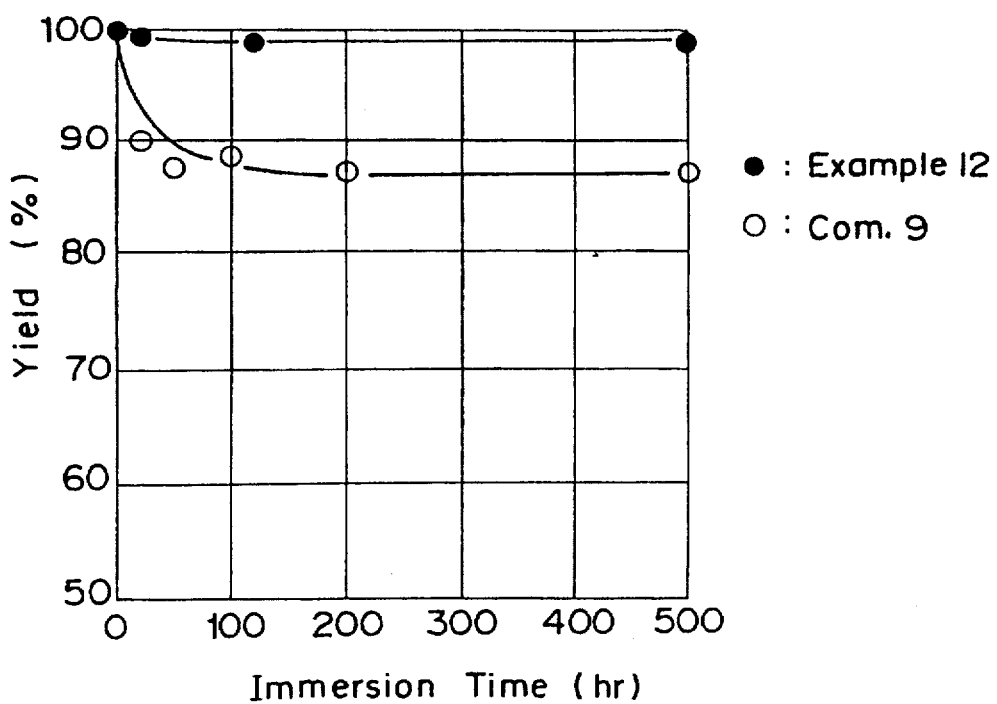
FIG. 26 is a graph showing a change in recovery with passage of time which is exhibited when the fluorescent substances in Examples 12 and 9 were immersed in a pure water.

Change of the yield of the fluorescent substance under each of Example 12 and Comparison 9, obtained when the latter was immersed in pure water, with passage of time is shown in FIG. 26. The yield shown therein is expressed in terms of percent by weight of the amount of the fluorescent substance recovered after having been dried relative to 100 parts by weight of the fluorescent substance immersed in water for a predetermined length of time.

As can readily be understood from FIG. 26, it has been found that while according to Comparison 9, 10 or more % by weight of the fluorescent substance has eluted, the fluorescent substance under Example 12 has not been eluted substantially, exhibiting a superior water-resistance.

A fluorescent inking medium was prepared by dispersing 75 parts by weight of the fluorescent substance according to Example 12 into a transparent binder which is a mixture of 15 parts by weight of wax, 5 parts by weight of polyester and 5 parts by weight of polyurethane. The fluorescent inking medium so obtained was applied to a length of polyethylene terephthalate tape, 50 μm in thickness and 1 cm in width, to provide a thermal transfer ink ribbon having a dry deposit, 5 μm in thickness, of the inking medium over the length thereof.

Using the resultant ink ribbon a bar code indicative of a ten-digit number was printed on a carrier which was subsequently transported at a speed of 0.9 m/sec in a fluorescent afterglow recognizing system while irradiated by a pulsating infrared beam of 810 nm in wavelength having a period of 0.8 msec to excite the bar code. Information represented by the ten-digit number printed in the form of the bar code on the carrier could be accurately read out.

2. [Method of Printing Fluorescent Composition and Fluorescent Mark Carrier]

For printing the various fluorescent compositions of the present invention discussed hereinbefore, an ink jet recording system is suited for a high speed printing. The following ink jot recording systems are known and any of them can be employed in the practice of the present invention:

TABLE 3

|  | Particle Shape of Fluorescent Substance | Ave. Part. Size (μm) | Emission Wavelength (nm) | Persisting Time (μsec) | Yield (%) |
| --- | --- | --- | --- | --- | --- |
| Example 7 | Powdery, aggregate | 3 | 980 | 370 | 98 |
| Example 8 | Powdery, aggregate | 2 | 980 | 500 | 99 |
| Example 9 | Powdery, aggregate | 1 | 980 | 240 | 97 |
| Example 10 | Powdery, aggregate | 4 | 980 | 340 | 97 |
| Example 11 | Powdery, aggregate | 3 | 890 & 1,060 | 140 | 99 |
| Example 12 | Non-aggregated granules | 0.7 | 980 | 310 | 99 |
| Example 13 | Non-aggregated granules | 0.8 | 980 | 360 | 99 |
| Example 14 | Non-aggregated granules | 0.7 | 980 | 360 | 98 |
| Comp. 9 | Non-aggregated, polygonal | 10 | 980 | 650 | 86 |
| Comp. 10 | Non-aggregated, polygonal | 1 | 980 | 1,500 | 98 |

As Table 3 makes it clear, while the conventional fluorescent substances has exhibited a low response and is therefore not suited for excitation by the pulse-like exciting light having a short pulse duration and also for a high speed reading by means of a high speed scanner, the fluorescent substance of the present invention has exhibited a high a) An electric field control system in which an electrostatic force of attraction is used to expel the inking medium through a nozzle.

b) A drop-on-demand system (a pressure pulse system) in which a piezoelectric element is used to produce a pulsating pressure by which the inking medium is expelled through a nozzle.

c) A bubble jet system in which the inking medium is heated to produce bubbles by which the inking medium is expelled through a nozzle upon burst of the bubbles.

Figure 27:
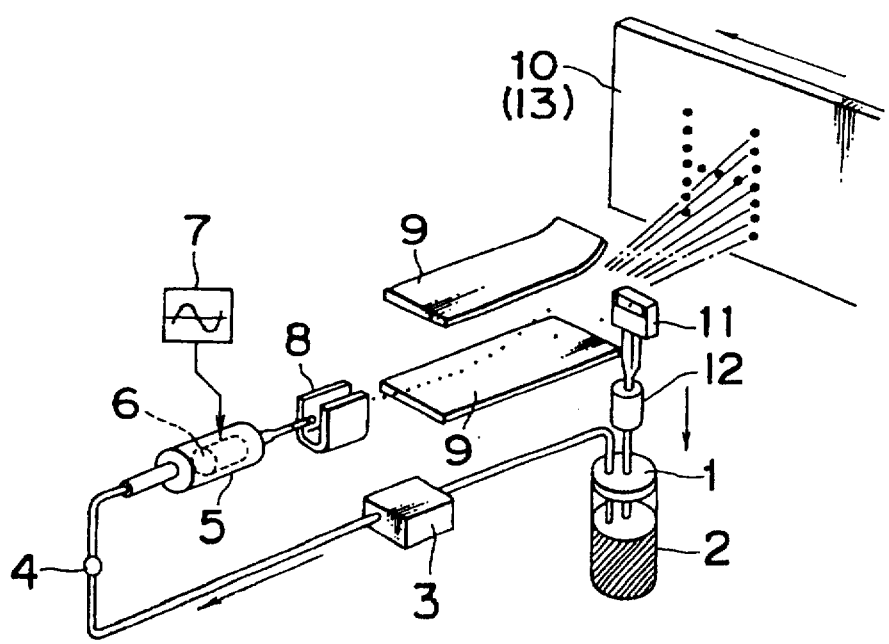
FIG. 27 is a schematic perspective view showing the principle of an electric field control system used in the practice of an ink jet recording process.

FIG. 27 depicts the electric field control system for the purpose of illustration of the principle of ink jet recording. According to this electric field control system, an indicia such as a mark or character to be printed is divided into a dot matrix of pixels so that droplets of the inking medium can be charged a voltage proportional to the position information represented by each pixel, the ink droplets being subsequently expelled towards a recording medium while having been deflected in an electric field through which they travelled.

The principle of the electric field control system will now be described with reference to FIG. 27. The system includes an ink reservoir 1 accommodating a quantity of inking medium 2. The inking medium 2 within the reservoir 1 is pressurized by a supply pump 3 and is subsequently expelled through a nozzle 5 with its pressure adjusted by a pressure adjusting valve 4 to a predetermined value. The nozzle 5 has an electrostriction element 6 built therein, which element 6 is oscillated by a source of oscillation 7 at a predetermined frequency. Ink droplets are, as they pass through the nozzle 5, shaped to generally round ink droplets of a predetermined size in synchronism with the frequency of oscillation of the electrostriction element 6.

A voltage proportional to an information signal to be recorded is applied to a charge electrode disponed at a location where the inking medium is transformed into the ink droplets, so that the amount of electric charge built upon the individual ink droplets can be controlled in synchronism with formation of the ink droplets.

As the ink droplets successively travel through a gap between deflection electrodes 9 to which a predetermined voltage is applied, the ink droplets are deflected a distance determined by the amount of electric charge carried thereby before they are successively deposited onto a recording medium, that is, a mark carrier 10. In this way, a pattern of dots descriptive of a fluorescent marking of a size determined by the magnitude of deflection of the ink droplets and the relative velocity of travel of the ink droplets between the nozzle 5 and the carrier 10 is formed on a surface of the mark carrier 10 to thereby complete a fluorescent mark carrier 10. On the other hand, some of the ink droplets which are not used for printing are, without being deflected, collected by a gutter 11 and are then recovered into the ink reservoir 1 by means of a recovery pump 12.

The carrier on which the fluorescent composition is deposited to complete the fluorescent mark carrier may be a security, a sales slip, an invoice, a card, a book, a surface of merchandise or any other member on which ink droplets can deposit.

As a result of examination conducted on the content of the fluorescent particles in the fluorescent ink deposit (i.e., the amount of the fluorescent particles relative to the total weight of the fluorescent ink deposit, it has been found that unless the content of the fluorescent particles is smaller than 1 wt % relative to the weight of the fluorescent ink deposit on the carrier, no intended emission intensity can be obtained. Although increase of the content of the fluorescent particles result in a gradual increase of the emission intensity, the fluorescent particles would aggregate or overlap densely with the emission density no longer increasing if the content of the fluorescent particles exceeds 50 wt %. Specifically, if the content of the fluorescent particles exceeds 30 wt %, the fluorescent ink deposit on the carrier would become noticeable in sight and, particularly where the fluorescent particles made up of the inorganic compound of a relatively large particle size, the printability exhibited by the ink jet printer or a screen printing technique would be lowered.

Accordingly, when the content of the fluorescent particles in the fluorescent deposit is controlled to greater than 1 wt %, but smaller than 30 wt %, a desired emission density can be maintained without allowing the fluorescent ink deposit to be noticeable in sight and, therefore, the appearance of the fluorescent mark carrier will not be adversely affected, accompanied by a satisfactory printability. This content is particularly advantageous in the case where the fluorescent particles used have an average particle size not greater than 4 µm and preferably not greater than 2 µm discussed hereinbefore.

As a result of studies conducted on the relationship between the thickness of the fluorescent ink deposit and the average particle size of the fluorescent particles used, it has been found that, if the thickness of the fluorescent ink deposit is controlled to a value smaller than 35 times, or preferably 25 times, the average size of the fluorescent particles, the presence of the fluorescent ink deposit forming a fluorescent mark on the carrier would neither substantially be felt to the touch nor become noticeable in sight and, for this reason, the appearance of the fluorescent mark carrier would not be adversely affected. Accordingly, in the practice of the present invention, it is preferred that if the average particle size of the fluorescent particles is 4 µm or 2 µm, the thickness of the fluorescent ink deposit should be not greater than 140 µm or 70 µm, respectively.

As a result of studies conducted on the light transmission exhibited by the binder used to disperse and retain the fluorescent particles, it has been found that if the transmittance of the exciting and fluorescent light is higher than 80%, and preferably 90%, penetration of the exciting light into the fluorescent ink deposit and emission of the fluorescent light outwardly from the fluorescent ink deposit take place efficiently, exhibiting a relatively high emission output sufficient to accomplish an assured detection of the fluorescent mark.

The inventors have conducted a series of studies on the surface condition of the fluorescent ink deposit. Comparison has been made between the emission output exhibited when a paint containing the fluorescent particles of the present invention was applied to a film of synthetic resin to form the fluorescent ink deposit and that when the same paint was applied to a paper to form the fluorescent ink deposit and, as a result of the comparison, it has been found that the paper having the fluorescent ink deposit thereon exhibited a relatively high emission output.

While visual inspection of the surface condition of the fluorescent ink deposit formed on the film of synthetic resin has indicated that the surface of the fluorescent ink deposit was smooth, the fluorescent ink deposit formed on the paper has shown that the surface thereof contained minute surface irregularities. Because of the presence of the minute surface irregularities, the exciting light impinging upon the fluorescent ink deposit does not undergo a specular reflection and appeared to have participated in activation of the fluorescent substance and, therefore, a relatively high emission output would have been obtained. In particular, where the average particle size of the fluorescent particles is smaller than the fiber diameter of fibrous material forming the paper (for example, If the average particle size is about 0.2 µm), the efficiency of excitation of the fluorescent substance is high because the fluorescent particles deposit at a varying angle on surfaces of fibers intertwined randomly and irregularly.

Where the fluorescent ink deposit is to be formed on an item to be delivered such as a postal matter or a parcel, or a card such as a pre-paid card or a commutation card as will be described later, it is recommended that the resultant fluorescent deposit will not be noticeable in sight. In order for the fluorescent ink deposit to be unnoticeable in sight, one method to accomplish this i to restrict the thickness of the fluorescent ink deposit, but restriction of the absorption of visible rays of light is also effective to accomplish this.

The principal component of the fluorescent ink deposit is a mixture of the binder and the fluorescent particles and, therefore, if the binder and the fluorescent particles both having a low absorptivity with respect to the visible rays of light are used so that the absorptivity of the fluorescent ink deposit eventually formed with respect to the visible rays of light may be restricted to a value lower than 20% and preferably lower than 10%, it has been found that the fluorescent ink deposit can be made substantially colorless and nearly transparent and, therefore, the appearance of the fluorescent mark carrier would not be adversely affected.

With the fluorescent mark carrier according to an embodiment of the present invention, the fluorescent ink deposits formed thereon will not be copied onto a transfer paper or will be copied onto a transfer paper in a manner not noticeable in sight when an attempt is made to make a copy of it and, therefore, there is no possibility that the transfer paper would be stained by images of the fluorescent ink deposits on the fluorescent mark carrier.

Figure 28:
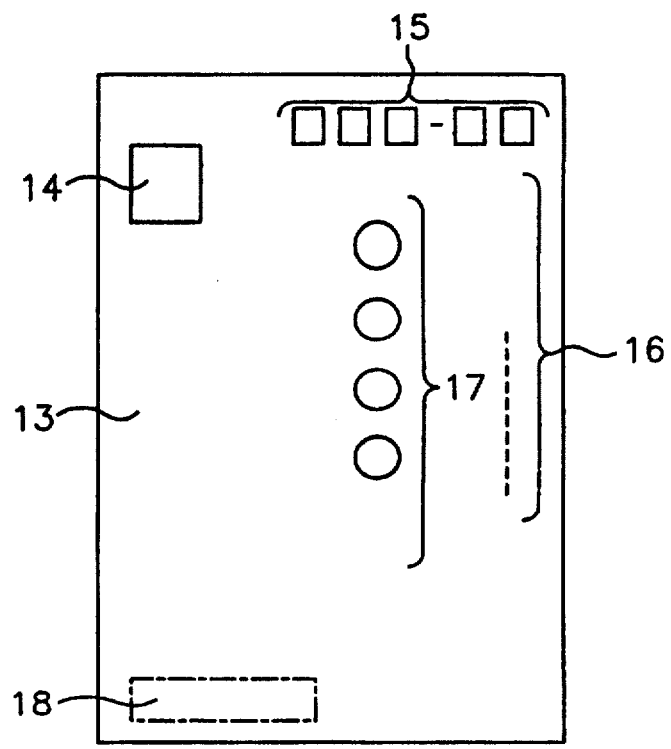
FIG. 28 is a plan view of a postal envelope formed with a fluorescent mark according to an embodiment of the present invention.

A specific example, in which the fluorescent mark containing the fluorescent composition is formed on a postal envelope or a postal card is shown in FIG. 28.

As shown in FIG. 28, a postal matter 13 such as, for example, a postal envelope, a postal card or a postal tag attached to a parcel has a front surface on which not only is a postal stamp 14 attached, but also a zip code 15, an address 16 and an addressee 17 are written down. In addition to those items present on the front surface of the postal matter 13, bar code information associated with the address is printed on a predetermined area by the ink jet recording system to form the fluorescent ink deposits 18. Since the bar code information is represented by the fluorescent mark not visible under visible rays of light, the appearance of the postal matter 13 will not be adversely affected.

Figure 29:
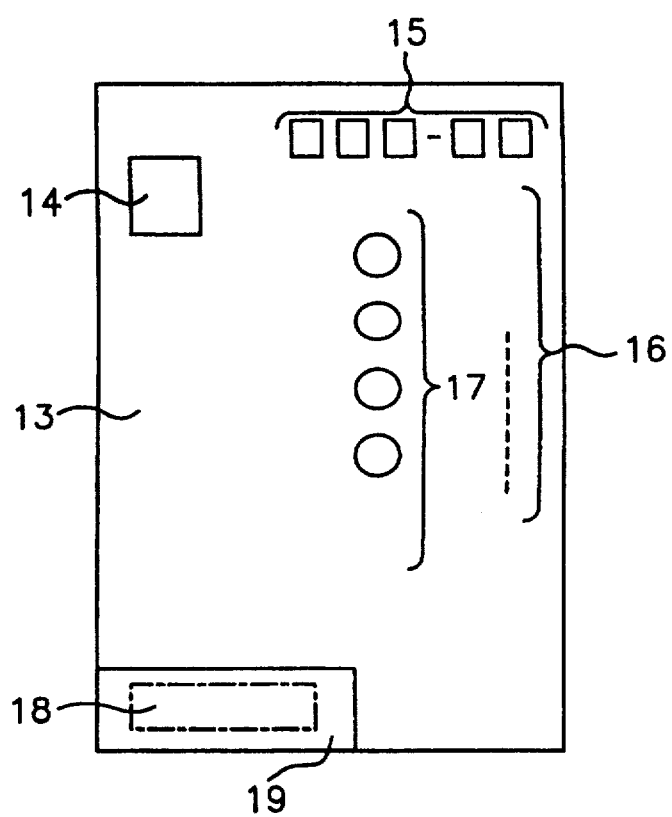
FIG. 29 is a plan view showing another example of the postal envelope formed with the fluorescent mark according to the embodiment of the present invention.

Another example of the postal matter 13 is shown in FIG. 29. In this example, the bar code associated with the address is printed on a label 19 in the form of the fluorescent mark, which label 19 is, when the addresser intends to post the postal matter 13, affixed to a predetermined area of the postal matter 13 before the latter is submitted to a post office. It is to be noted that if the area to which the label 19 is to be affixed varies from one postal matter to another, information reading would be hampered and, therefore, the postal matter 13 has a blank box printed at that area so that the position where the label 19 is to be affixed can be specified.

While reference has been made to the postal matter, a similar description equally applies to any other matter desired to be delivered such as, for example, a parcel to be delivered by a courier or an in-house mail.

Also, while the information such as the address, the addressee and so on has been shown as printed with the use of the fluorescent composition, other information such as the address of the sender, the addresser's name may also be printed.

Figure 30:
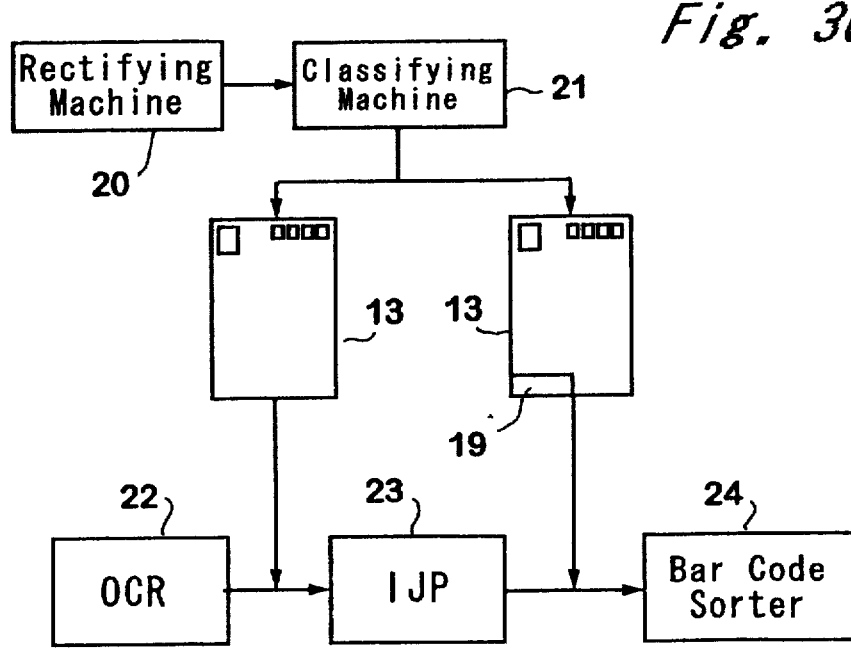
FIG. 30 is a flowchart showing the manner in which a bar code information is applied to postal matter and the bar code so applied is read out.

FIG. 30 illustrates a flowchart explanatory of the process of imparting and reading the bar code information to and from the postal matter 13.

Postal matters 13 collected at a post office ore first put into a rectifying machine so that the postal matters 13 can be rectified so as to orient in a predetermined direction. Since some of the postal matters 13 have a label 19 affixed thereto and the others do not have, the postal matters 13 are classified by a classifying machine into two groups, one including the postal matters 13 having no label and the other including the postal matters 13 with labels 19 affixed thereto. This classification can be accomplished by irradiating the predetermined area of each postal matter 13 where the label 19 ought to be affixed. Should a fluorescent light from the predetermined area of some of the postal matters 13 be detected, it is clear that such some of the postal matters 13 have a label 19 affixed thereto, or otherwise the postal matters 13 would be deemed having no label 19.

The postal matters 13 having no label 19 affixed thereto are transferred to an optical character recognizing machine (OCR) 22 where the zip code 15 and the address 16 are optically read out. Based on the information read out by the OCR 22, the bar code information associated with the address is printed by an ink jet printer (IJP) 23 on the predetermined area of each of the postal matters 13.

Both of the postal matters 13 having no label 19 affixed thereto, but the bar code information printed thereon and the postal matters 13 having the labels 19 affixed thereto are subsequently transferred onto a bar code sorting machine 24 by which the bar code information is optically read out so that the postal matters 13 can be subsequently sorted according to the bar code information.

The bar code sorting machine 24 referred to above may generally comprise an optical reading apparatus for optically reading the bar code information and a sorting apparatus for sorting the postal matters 13 according to the bar code information read out by the optical reading apparatus.

Numerous preferred embodiments of the optical reading apparatus according to the present invention will now be described individually.

Optical Reading Aboaratus: Embodiment 1

Figure 31:
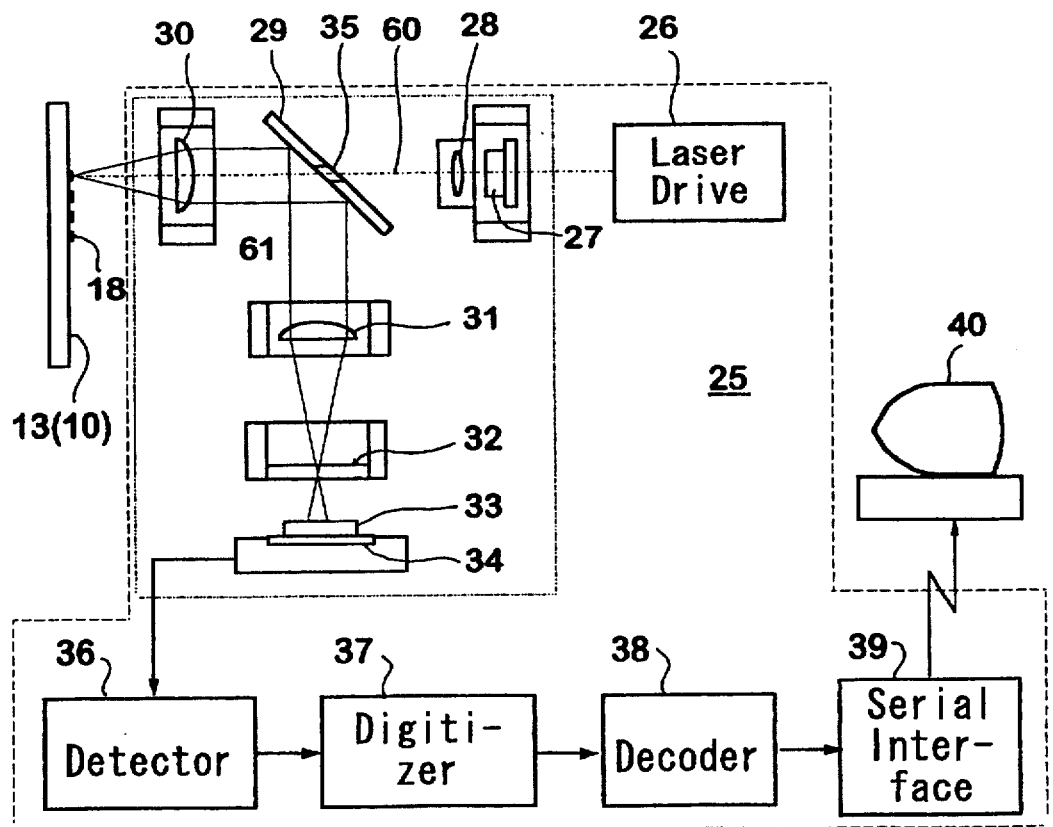
FIG. 31 is a schematic diagram showing a first embodiment of an optical reading apparatus of the present invention.

FIG. 31 illustrates a schematic structure of the optical reading apparatus 25. This optical reading apparatus 25 broadly includes the reader optics and a reading circuit.

The reader optics is comprised of a semiconductor laser drive circuit 26, a semiconductor laser 27, a lens 28, a specular reflecting mirror 29, plano-convex lenses 30 and 31, a slit member 32, a filter 33 and a photodiode 34.

Figure 32:
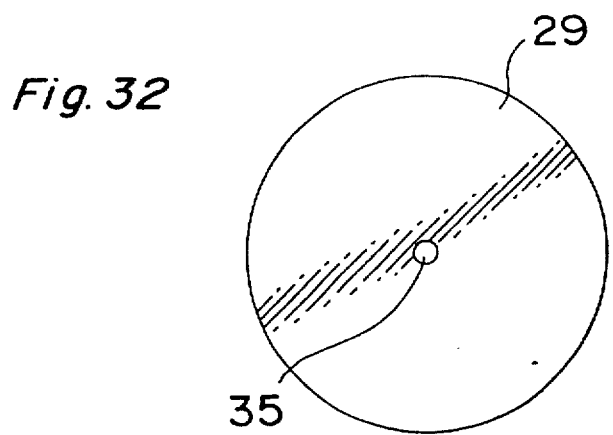
FIG. 32 is a plan view of a mirror used in the optical reading apparatus shown in FIG. 31.

Rays of exciting light 60 emitted from the semiconductor laser 27 is converged by the lens 28 into a pencil of exciting light of about 1 mm in diameter. This pencil of exciting light subsequently passes through an aperture 35 of about 2 mm in diameter defined in a central portion of the specular reflecting mirror 29, as best shown in FIG. 32, before it is projected on to the postal matter 13, which is an example of the fluorescent mark carrier 10, through the lens 30 in a direction perpendicular to the plane of the postal matter 13.

If the exciting light 60 is projected towards the mirror 29 without being converged, part of the exciting light 60 will be cut out by a peripheral lip region of the mirror 29 around the aperture 35 and, for this reason, the quantity of the exciting light (exciting energies) actually reaching the postal matter 13 is substantially reduced to such an extent as to reduce the emission output and, therefore, it is necessary to restrict the diameter of a bundle of the exciting light 60 to a value smaller than the diameter of the aperture 35. In the illustrated embodiment, in consideration of any possible error which would occur in installing the various component parts, the exciting light 60 is converged into the pencil of exciting light of 1 mm in diameter for the diameter of 2 mm of the aperture 35.

The postal matter 13 is transported in a direction shown by the arrow at a speed of, for example, 4 m/sec and, during the transportation of the postal matter 13, the fluorescent ink deposits 18 in the form of bars are irradiated by the exciting light to emit a fluorescent light which then pass through the first plano-convex lens 30. The fluorescent light passing through the plano-convex lens 30 is subsequently reflected by the mirror 29 so as to pass through the second plano-convex lens 31. The fluorescent light passing through the second plano-convex lens 31 is converged thereby and further passes through the slit member 32 and the filter 33 before it is sensed by the photodiode 34.

The reader circuit referred to above includes a detecting circuit 36 having an amplifier and a filter circuit, a digitizer circuit 37, a decoder circuit 38, a serial interface 39 and a personal computer 40 for processing data.

While it may be contemplated to use a semitransparent mirror in place of the perforated mirror 29, the use of the semitransparent mirror may have a problem in that only substantially half of the fluorescent light emitted will be reflected towards the photodiode 34 and, therefore, the photodiode 34 will issue an output which is of a value generally half that ought to be when the entire quantity of the fluorescent light is received. In the practice of the present invention, in order to increase the amount of light reflected and to make the bar code information on the postal matter 13 to be read out accurately and assuredly at a high speed, the use has been made of a highly reflective mirror 20 having the minute aperture 35 defined therein and also having a reflectance of higher than 50%. The perforated mirror 29 may be in the form of a specular mirror formed by vapor-depositing aluminum on a surface of a glass plate.

The postal matters 13 may have a varying thickness and may often fluctuate in a direction parallel to the optical axis of a transport system. For this reason, the light having passed through the mirror 29 is allowed to impinge upon each postal matter 13 at a substantially right angle to the plane of each postal matter 13. By so doing, even though the thickness of the postal matter 13 varies and/or fluctuation occurs in a direction parallel to the optical axis of the transport system, the bar code information can be assuredly read out without being adversely affected thereby.

Figure 33:
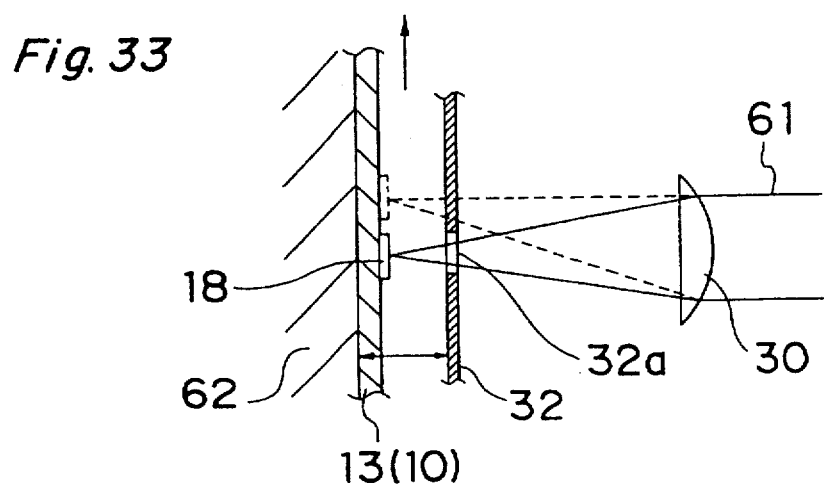
FIG. 33 is a fragmentary side sectional view of a portion of the optical reading apparatus, showing a function of a slit member.

FIG. 33 illustrates a diagram used to explain the function of the slit member 32 and how it solves the problem. In the example shown in FIG. 33, the slit member 32 is shown to be disposed in front of the first piano-convex lens 30 and the fluorescent light 61 emitted from the fluorescent ink deposit 18 on the postal matter 13 (i.e., the fluorescent mark carrier 10) passes through the slit 32a defined in the slit member 32 and is then guided onto the first plano-convex lens 30.

The slit member 32 is so designed and so positioned that, while as shown by the solid line in FIG. 33 the fluorescent light 61 emitted from the fluorescent ink deposit 18 when the latter is aligned with the slit 32a is received having passed through the slit 32a, the fluorescent light 61 emitted from the fluorescent ink deposit 18 which has been moved past the position aligned with the slit 32a as a result of the continued transport of the postal matter 13 (i.e., the fluorescent mark carrier 10), as shown by the phantom line, can be cut off by the slit member 32. Since in this way only the fluorescent light 61 emitted from the fluorescent ink deposit 18 then aligned with the slit 32a is selected, the slit member 32 is disposed so adjacent to a transport means 62 for the postal matters 13 (i.e., the fluorescent mark carriers 10) as possible.

It may occur that when the postal matter 13 having a substantial thickness is transported to a reading station, transport of the postal matter 13 may be halted with the front of the postal matter 13 abutted against the slit member 32 and/or the slit member 32 may be damaged in contact therewith.

For this reason, as shown in FIG. 31, the slit member 32 is eliminated out of the path of transport of the postal matters 13 and is placed between the second plano-convex lens 31 and the light receiving element 34. By so doing, a relatively large space can be secured between the transport means 62 and the first plano-convex lens 30 sufficient to allow the postal matter 13 of a substantial thickness to pass while the slit member 31 serves its intrinsic function.

Figure 34:
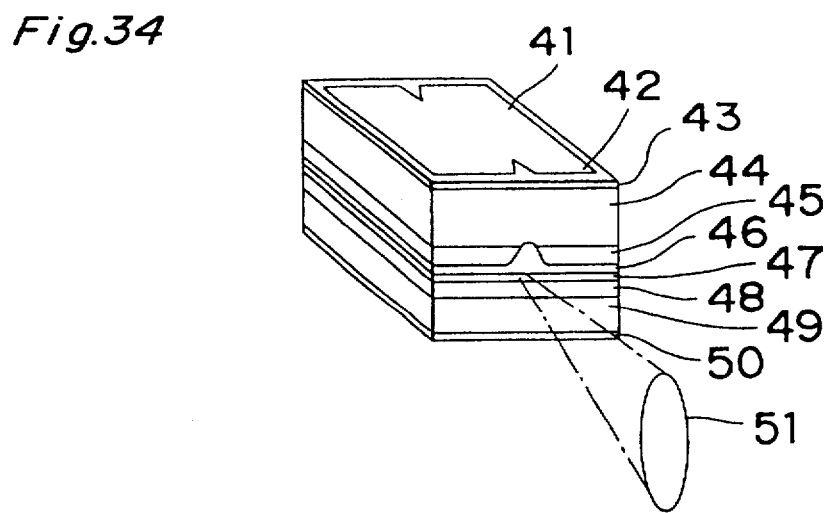
FIG. 34 is a schematic perspective view showing a pattern of a laser beam outputted from a semiconductor chip used in this embodiment of the present invention.
Figure 35:
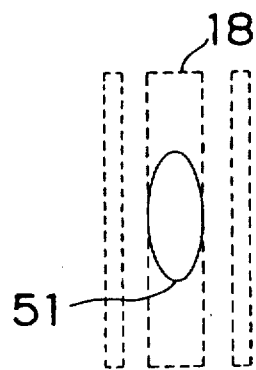
FIG. 35 is a diagram used to explain the relationship between the pattern of the laser beam and a pattern of bar codes printed.

FIGS. 34 and 35 are schematic diagrams used to explain the relationship between the pattern of laser irradiation emitted from the semiconductor laser and the pattern of bar codes. As best shown in FIG. 34, the semiconductor chip 41 is of a laminated structure including an Al electrode 42, a p-type electrode 43, a p-type GaAs substrate 44, a current trapping layer 45 made of n-type GaAs, a clad layer 46 made of n-type $Ga_{1-x}Al_xAs$, an active layer 47 made of p-type $Ga_{1-y}Al_yAs$, a clad layer 48 made of n-type $Ga_{1-x}Al_xAs$, a cap layer 49 made of n-type GaAs and an n-type electrode 50.

The semiconductor chip 41 emits a laser beam in a generally oval pattern 51 as shown in FIG. 34. While according to the prior art the generally oval pattern 51 of the laser beam is shaped into a round pattern for use in detection of the bar code, the present invention is such that, as shown in FIG. 35, the fluorescent ink deposit 18 forming each code bar printed on the fluorescent mark carrier is caused to assume a position with its lengthwise direction aligned with the major axis of the generally oval pattern of the laser beam at the time the fluorescent mark is irradiated. By so doing, the area of surface of the fluorescent ink deposit 18 onto which the laser beam is projected increased as compared with that exhibited by the use of the round pattern of the laser beam and, consequently, a relatively high output can be obtained to suit for a high speed reading.

Figure 36:
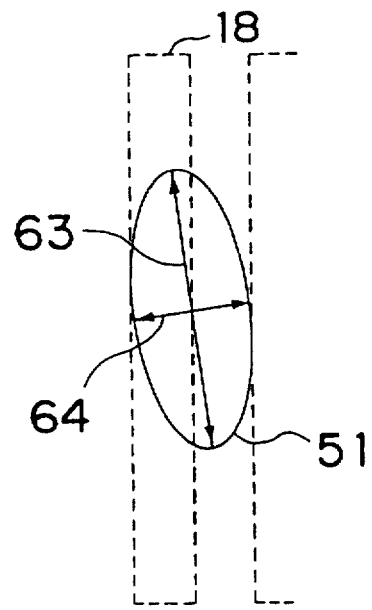
FIG. 36 is a diagram used to explain the relationship between the pattern of the laser beam and the pattern of inclined bar codes.

The postal matters 13 are successively transported past the reading station beneath the optical reading apparatus by the transport means 62 which may be in the form of an endless belt conveyor equipped with a guide. However, even though the guide is employed, the postal matter 13 being transported may tilt an angle of about 20 degrees at maximum. FIG. 36 illustrates a condition in which, when the postal matter 13 being transported tilts (an angle of tilt being about 7 degrees), the fluorescent ink deposit 16 of a generally elongated shape confronts the irradiation pattern 51. If the irradiation pattern 51 has a minor axis 64 which is too large, the irradiation pattern 51 may encompass the neighboring fluorescent ink deposits 18 which would eventually bring about an undesirable result. As a result of studies conducted by the inventors, if the ratio (major axis/minor axis) of the minor axis 64 relative to the major axis 63 of the oval irradiation pattern 51 exceeds 15, information would be read out from the neighboring fluorescent ink deposits 18 in the event of tilt as hereinabove described and, therefore, it has been found that the ratio of the minor axis 64 relative to the major axis 63 of the irradiation pattern 51 should be restricted to a value smaller than 15.

Optical Reading Apparatus: Embodiment 2

Figure 37:
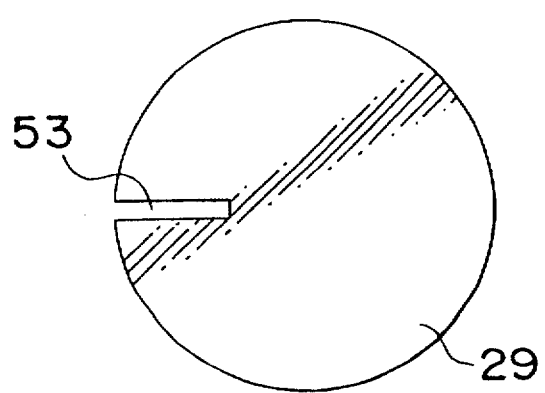
FIG. 37 is a plan view of a reflecting mirror used in a second embodiment of the optical reading apparatus.
Figure 38:
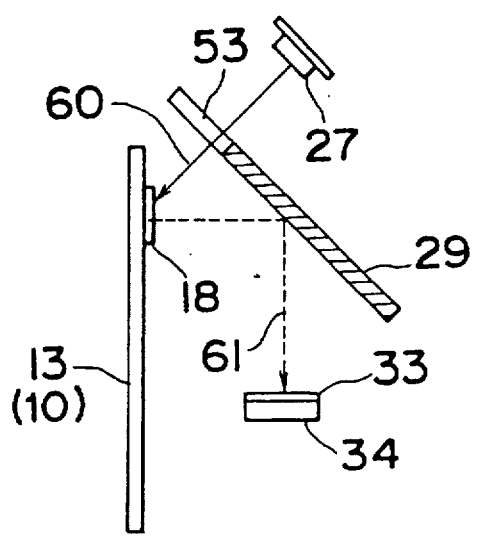
FIG. 38 is a fragmentary side sectional view of a portion of the optical reading apparatus utilizing the reflecting mirror showing FIG. 37.

FIGS. 37 and 38 are diagrams illustrating a mirror and a second preferred embodiment of the optical reading apparatus utilizing such mirror, respectively.

As best shown in FIG. 37, a highly reflecting, generally disc-shaped mirror 29 having a reflectivity of 50% or more has its peripheral portion formed with a slit 52 so as to extend radially thereof. As shown in FIG. 38, this disc-shaped mirror 29 is so positioned as to permit the exciting light 60 from the semiconductor laser 27 to pass therethrough to irradiate the fluorescent ink deposit 18 on the postal matter 13 and, in this arrangement, the slit 53 in the disc-shaped mirror 29 is so oriented as to permit the irradiating pattern projected onto the postal matter to have its major axis aligned with the lengthwise direction of the bar code defined by the fluorescent ink deposit 18. By so positioning, as is the case with the oval irradiating pattern discussed hereinbefore, the bar code can be irradiated by the exciting light over the substantially entire length thereof, permitting a relatively large output to be obtained.

Optical Reading Apparatus: Embodiment 3

Figure 39:
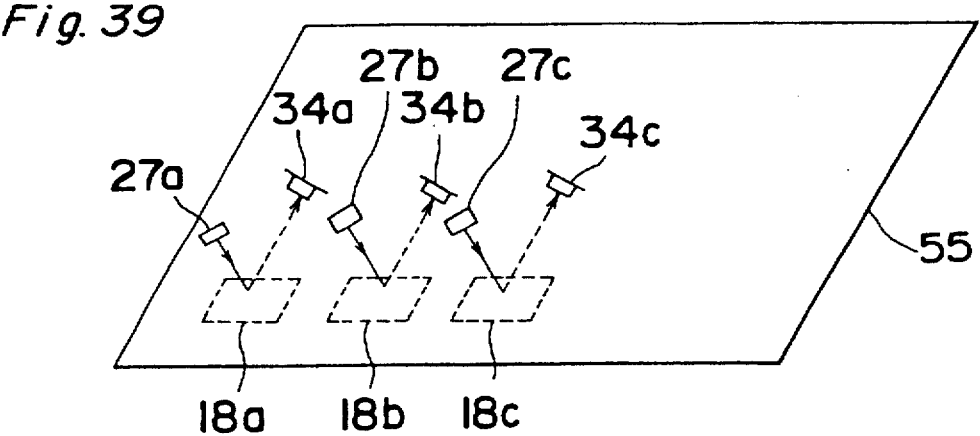
FIG. 39 is a schematic diagram used to explain how an Example 3 of the optical reading apparatus is used.
Figure 40:
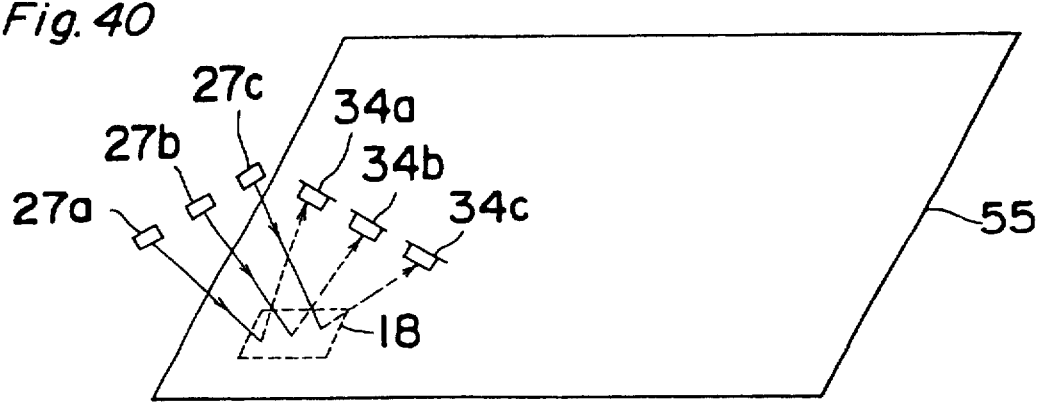
FIG. 40 is a schematic diagram used to explain how the Example 3 of the optical reading apparatus is used.

FIGS. 39 and 40 are diagrams illustrating different examples of use of the infrared-excitable fluorescent substance. As shown in FIG. 39, three fluorescent ink deposits 18a, 18b and 18c are formed at respectively predetermined positions on a security 55. Each of these fluorescent ink deposits 18a to 1c contains a different fluorescent substances having its own peculiar emission spectrum.

For each of the fluorescent ink deposits 18a to 18b, a semiconductor laser 27a, 27b or 27c capable of emitting an exciting light of a different wave-length and a light receiving photodiode 34a, 34b or 34c for sensing fluorescent light emitted from the associated fluorescent ink deposit 18a, 18b or 18c are paired and arranged.

The respective fluorescent substances contained in the fluorescent ink deposits 18a to 18c may be suitably chosen from a group of the fluorescent substances of the present invention. For example, the fluorescent substance in the fluorescent ink deposit 18a may be $Nd_{0.1}Yb_{0.8}POc_4$ having the emission spectrum as shown in FIG. 13, the fluorescent substance in the fluorescent ink deposit 18b may be $Yb_{0.1}Y_{0.9}PO_4$ having the emission spectrum as shown in FIG. 14 and the fluorescent substance in the fluorescent ink deposit 18c may be $Er_{0.2}Y_{2.8}Fe_{1.5}Al_{3.5}O_{12}$ having the emission spectrum as shown in FIG. 17.

Accordingly, where the different fluorescent substances discussed above are employed for the fluorescent ink deposits 18a to 18c, the photodiodes 34a to 34c receives different fluorescent light emitted therefrom so that authenticity of the security 55 can be determined. Should even one of the photodiodes 34a to 34c fails to receive the associated fluorescent light, the security 55 may be determined forged.

While in the example shown in FIG. 39 the use has been made of the fluorescent substances having the different emission spectra, it is possible to form the single fluorescent ink deposit 18 using a mixture of the fluorescent substances having the different emission spectra as shown in the example of FIG. 40.

Where the single fluorescent ink deposit 18 is formed using the mixture of the different fluorescent substances, the exciting light of the different wavelengths emitted from the semiconductor lasers 27a, 27b and 27c is projected onto the single fluorescent ink deposit 18 to cause the latter to emit the fluorescent light of different wavelengths which is sensed by the associated photodiodes 34a, 34b and 34c. In any one of the examples shown in FIGS. 39 and 40, an optical filter operable to pass the fluorescent light of the wavelength of interest desired to be sensed by the associated photodiode, but to cut off the fluorescent light not desired to be sensed by such associated photodiode is fitted to a light receiving window of the respective photodiode 34a, 34b and 34c.

Optical Reading Apparatus: Embodiment 4

The emission intensity exhibited by the fluorescent substance having the relatively long fall time td has been shown in FIG. 3(c). This kind of the fluorescent substance having the relatively long fall time td is particularly suitably employed for detection of information by the utilization of a fluorescent afterglow.

FIG. 41 illustrates a timing chart showing the timing of emission of the light emitting element when the information is desired to be detected by the utilization of the fluorescent afterglow and also showing an output condition of the light receiving element.

Figure 41A:
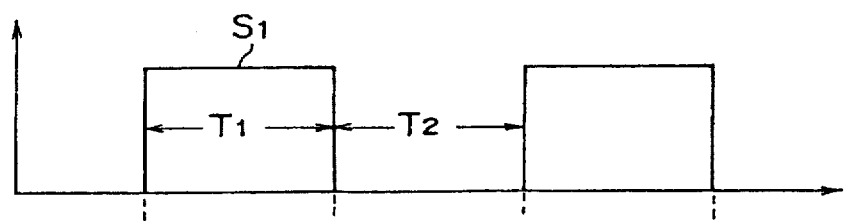
FIGS. 41A, 41B and 41C are timing charts showing the relationship between the timing of emission of a light emitting element and conditions of output from a light receiving element in the practice of a detecting method utilizing fluorescent afterglow.

As shown in FIG. 41(a), the light emitting element cyclically blinks having an ON period Ti and an OFF period T2 which are substantially equal in duration with each other, so that the fluorescent ink deposit can be intermittently irradiated by the pulsating exciting light. Reference character S1 used therein represents a single pulse of exciting light emitted by the light emitting element.

Figure 41B:
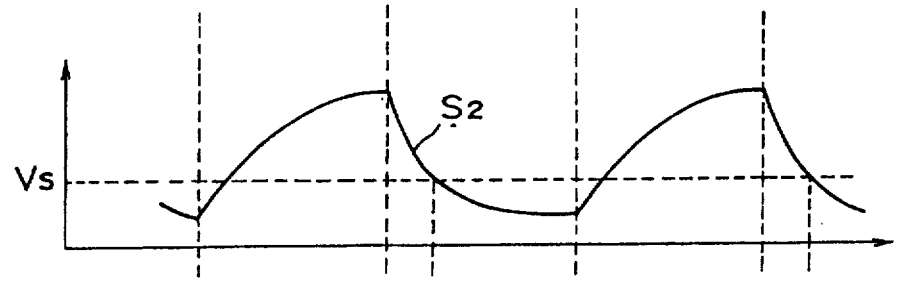
Figure 41C:
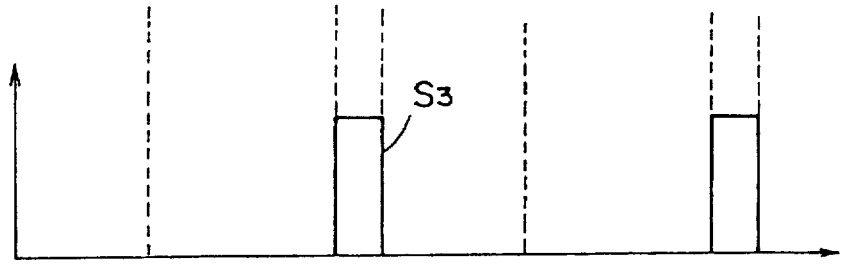

When the fluorescent ink deposit is excited by the pulsating exciting light from the light emitting element, the fluorescent substance contained therein emits the fluorescent light of such a waveform as shown in FIG. 41(b) showing an increase of the output level of the fluorescent light from the fluorescent ink deposit that continues up until the irradiation is interrupted. Even after the irradiation has been interrupted, the light receiving element senses a fluorescent afterglow emitted from the fluorescent ink deposit. Since the duration of the fluorescent afterglow decreases with passage of time, a reference value Vs is set up so that comparison of the intensity of the fluorescent afterglow with this reference value Vs can provide a rectangular signal S3, as shown in FIG. 41(c), subsequent to interruption of the irradiation from the light emitting element. Accordingly, by repeatedly energizing and deenergizing the light emitting element at short intervals, the code information represented by the pattern of the bar codes can be optically read out.

The detection by the utilization of the afterglow of the fluorescent light is particularly effective to provide a compact and inexpensive optical reading apparatus since not only is the light emitting element deenergized during the information reading, but also the fluorescent light can be advantageously detected with no need to use any expensive optical filter.

Figure 42:
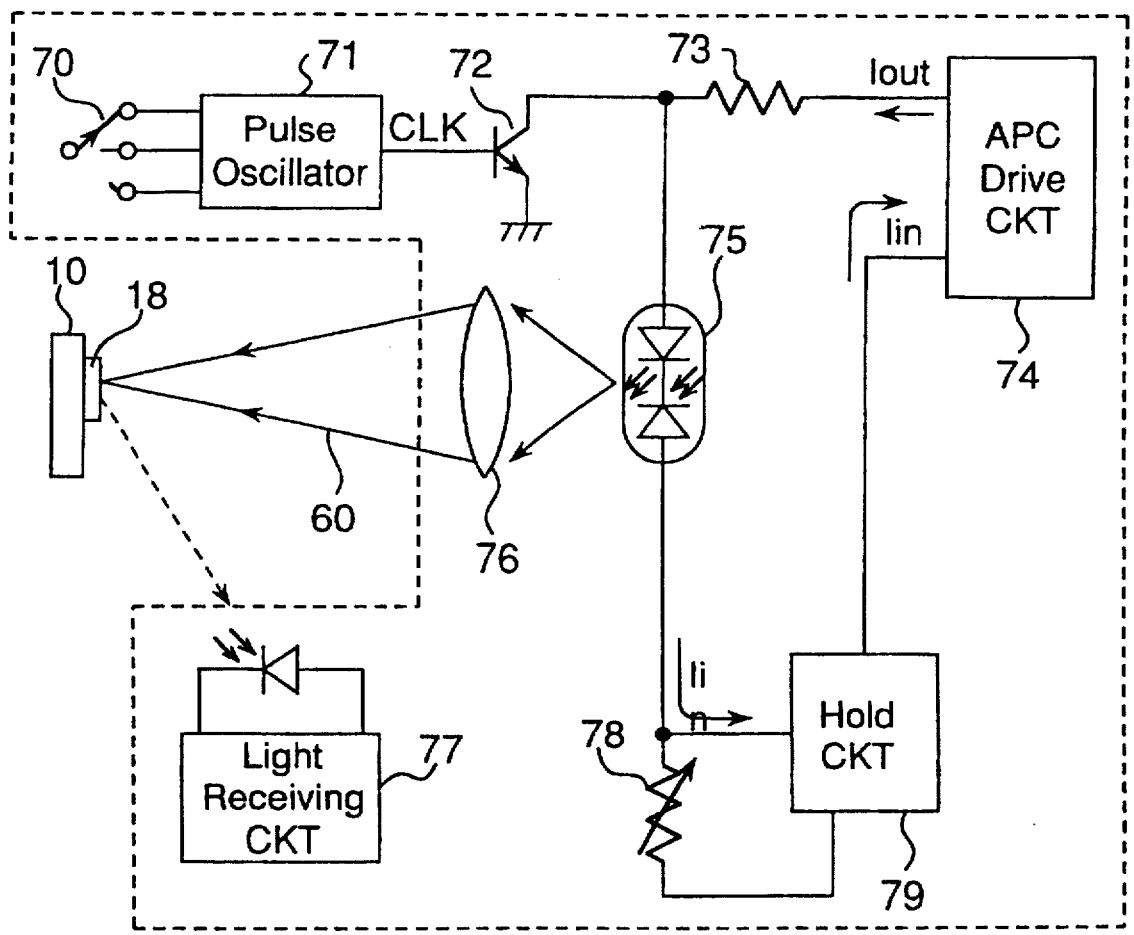
FIG. 42 is a schematic block diagram showing an Example 4 of the optical reading apparatus.
Figure 43:
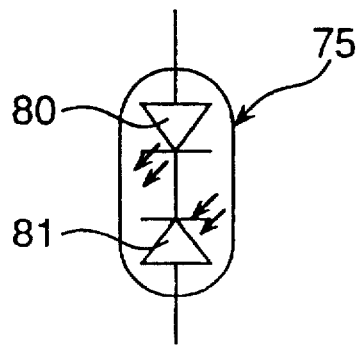
FIG. 43 is a diagram showing a structure of a semiconductor laser diode used in the optical reading apparatus.

FIGS. 42 and 43 are diagrams used to explain the optical reading apparatus operable with the afterglow of the fluorescent light discussed above. Referring now to FIG. 42, the optical reading apparatus comprises an irradiating pulse frequency selector switch 70, a pulse oscillator circuit 71, a transistor 72, a laser drive current limiting resistor 73, a drive circuit 74 having an automatic power control (APC) capability, a semiconductor laser diode 75, a condensing lens 76, a light receiving circuit 77, a laser output adjusting potentiometer 78 and a hold circuit 79.

The operation of the optical reading apparatus of FIG. 42 will now be described. Assuming that the irradiating pulse frequency selector switch 70 is held in position to select an adequate irradiation pulse frequency, the pulse oscillator circuit 71 formulates a train of pulses of a frequency determined by the position of the selector switch 70 and output them as a clock (CLK) signal.

This clock signal is utilized to switch the transistor 72 on/off to control the supply of a laser drive current Iout, outputted from the APC drive circuit 74, to the semiconductor laser diode 75. The laser drive current Iout is limited by the laser drive current limiting resistor 73 to a value necessary to avoid any possible breakage of the transistor 72 and the semiconductor laser diode 75.

The pulsating exciting light 60 emitted from the semiconductor laser diode 75 is projected onto the fluorescent ink deposit 18 on the fluorescent mark carrier 10 through the condensing lens 76, and the resultant fluorescent light (fluorescent afterglow) 61 emitted from the fluorescent ink deposit 18 during the OFF period of the semiconductor laser diode 75 is detected by the light receiving circuit 77.

In order to obtain the pulsating exciting light at predetermined intervals from the semiconductor laser diode 75, monitor light of the semiconductor laser diode 75 is detected by the APC drive circuit 74 to effect a feedback control on the laser drive current Iout.

Detection of the monitor light is accomplished by supplying a monitor current fin from the semiconductor laser diode 75 to the hold circuit 79 which operates to detect the peak value or sample the monitor current 18 during the ON period of the semiconductor laser diode 75 and then holds such status during the OFF period of the semiconductor laser diode 75, so that the exciting light from the semiconductor laser diode 75 can be controlled to accomplish a smooth excitation of the fluorescent substance by irradiation from the semiconductor laser diode 75. It is to be noted that the output from the semiconductor laser diode 75 necessary to excite the fluorescent substance is pre-adjusted by the laser output adjusting potentiometer 78.

FIG. 43 illustrates the structure of the semiconductor laser diode 75 referred to above. As shown therein, the semiconductor laser diode 75 comprises a semiconductor laser 80 for emitting the exciting light, and a monitor photodiode 81 for receiving the exciting light from the semiconductor laser 80 to provide the monitor light referred to above.

If a light emitting diode (LED) is used for a source of the exciting light and a transistor is used to provide a pulsating exciting light by means of an switching operation of such transistor, it would be difficult to secure a sufficient emission intensity during the detection even though the exciting light is throttled by a condensing light, resulting in limitation of the optical path length for information reading.

In contrast thereto, with the reading apparatus shown in FIGS. 42 and 43, the use has been made of the semiconductor laser diode excellent in light converging capability and directionality and, therefore, even though the optical path length of the reading apparatus increases, a sufficient emission intensity can be secured during the detection.

Also, the use of the drive circuit having the APC function for the semiconductor laser diode is effective to substantially eliminate or reduce the temperature dependent change of the exciting light, making it possible to increase the reliability in information reading.

Moreover, the circuit arrangement in which the monitor current is held during the ON period of the semiconductor laser diode and the semiconductor laser diode drive circuit is controlled on a feedback scheme based on the value of the monitor current permits the APC function to be exercised regardless of change in pulse frequency and duty ratio to facilitate the smooth excitation of the fluorescent substance, making it possible to increase the reliability.

Optical Reading Apparatus: Embodiment 5

A fifth preferred embodiment of the optical reading apparatus of the present invention will now be described.

Figure 44:
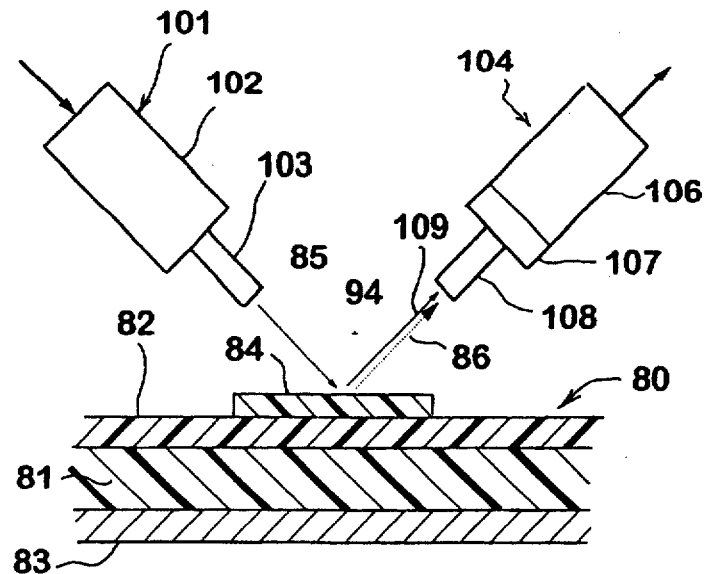
FIG. 44 is a schematic diagram showing a basic structure of an Example 5 of the optical reading apparatus.

A generally oblong card 80 such as, for example, a monetary card comprises, as shown in FIG. 44, a rectangular base plate 81 in the form of, for example, a generally oblong white-color film of polyester, an overcoat 82 of any desired design formed by printing on an upper surface of the base 80 and having a controlled light reflectivity, and an undercoat 83 formed on an undersurface of the base 81 on one side of the base 81 opposite to the overcoat 82. The undercoat 83 is a rewritable magnetic layer formed by painting a magnetic paint on the undersurface of the base 81. The overcoat 82 has an outer surface printed with a patterned fluorescent mark 84 containing the fluorescent substance, with security information substantially permanently recorded in the card 80.

The mark 84 is a fluorescent mark of a kind invisible under visible rays of light and capable of emitting a fluorescent light 86 of a wavelength different from the center wavelength of the infrared exciting light 86 when irradiated by such exciting light 86 and are comprised of a plurality of elongated parallel fluorescent bars laid so as to extend perpendicular to the lengthwise sense of the card 80. With the fluorescent mark 84 formed on the card 80, security information including, for example, a code descriptive of the issuer of the card and/or an ID code of the card bearer is recorded in the card 80.

Figure 45A:
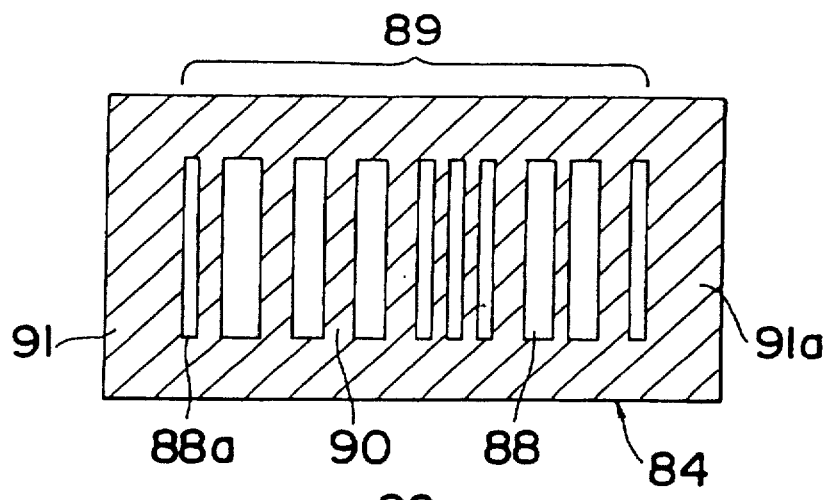
FIGS. 45A, 45B, 45C and 45D are explanatory diagrams showing respective conditions in which marks are formed.
Figure 45B:
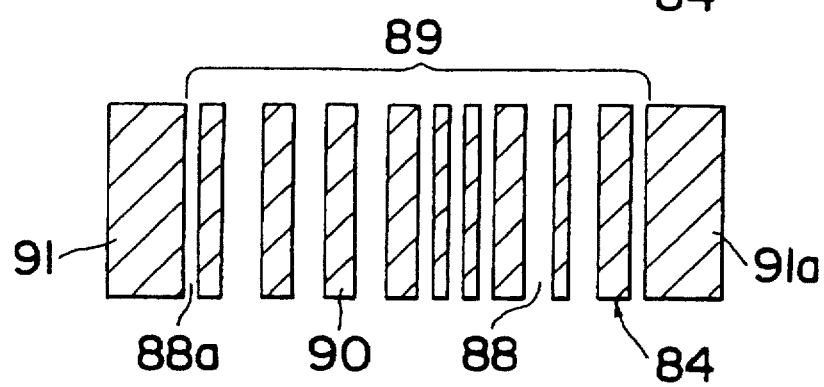
Figure 45C:
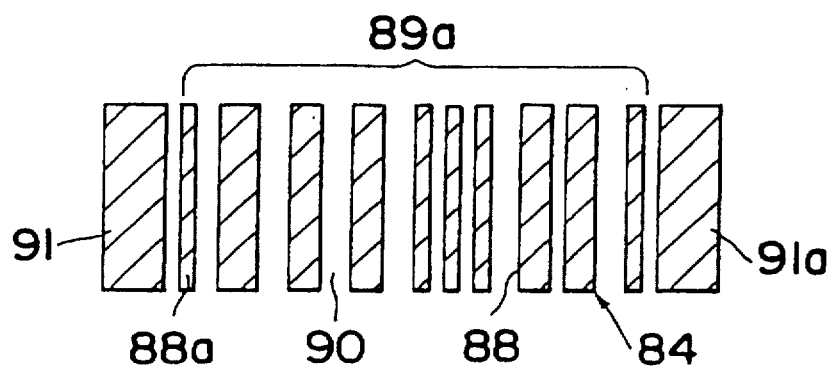
Figure 45D:
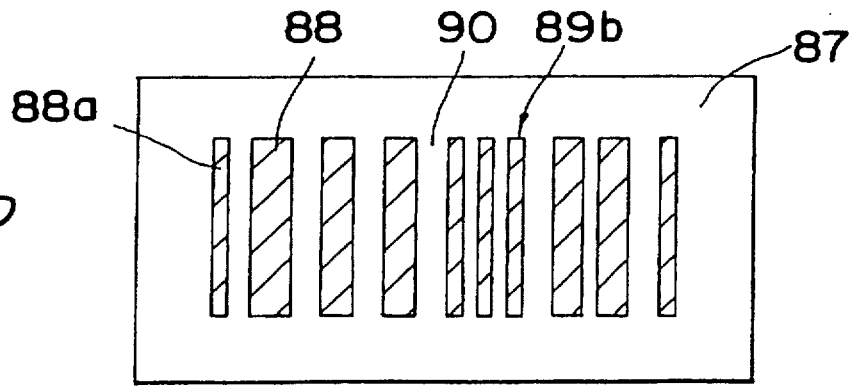

While as shown in FIG. 45(d) the generally well-known standard bar code comprises an oblong label 87 having a data area 89b on which a plurality of parallel code bars 88 are printed so as to be visible against the background of the label 87, the bar code formed as the fluorescent mark 84 in the practice of the present invention is substantially reverse to the standard bar code. More specifically, the bar code forming the fluorescent mark 84 is in the form of an oblong label having one surface deposited with the fluorescent substances in a pattern reverse to that of the standard bar code shown in FIG. 45(d) and, therefore, having a data area 89 in which respective portions corresponding in position to the code bars 88 are left blank so as to leave fluorescent stripes 90 each between the neighboring bars 88 with opposite fluorescent leaders 91 and 91a defined on respective end portion of the label.

With this design, regardless or the direction in which the data area 89 is scanned, the position of the data area 89 can be easily detected since the leader 91 of a width greater than any one of the bars 88 and fluorescent stripes 90 both forming the data area 89 is first scanned a substantial length of time. Also, the contrast of the data area 89 over the entire area thereof is made substantially uniform so as to avoid any possible erroneous detection of the thickness of the first one of the bars, i.e., the bar 88a.

The fluorescent substance used to form the fluorescent mark 84 may be any fluorescent substance or a compound containing as an optical active element one or a mixture of rare earth elements such as, for example, neodymium (Nd), ytterbium (Yb), europium (Eu), thulium (Tm), praseodymium (Pr) and dysprosium (Dy) with the optical active element being a compound containing in its matrix such oxides of tungstate, molybdate or phosphate. However, so far as the fluorescent light 86 capable of emitting an afterglow can be emitted when the exciting light of any arbitrarily chosen wavelength is irradiated, the material may be suitably changed.

In the embodiment under discussion, a fluorescent paint containing the fluorescent substance such as $Li(Nd_{0.9}Yb_{0.1})P_4O_{12}$ is printed to form the fluorescent mark 84. The fluorescent mark 84 so formed has such a property that when near infrared rays of light of about 800 nm in wavelength are irradiated as the exciting light, the infrared fluorescent light 86 having a peak value in the vicinity of 1,000 nm can be emitted and that the persistency of the fluorescent light 86 until the intensity thereof decreases down to 10% of the maximum intensity subsequent to interruption of the irradiation lasts for about 400 to 600 μsec.

Figure 46:
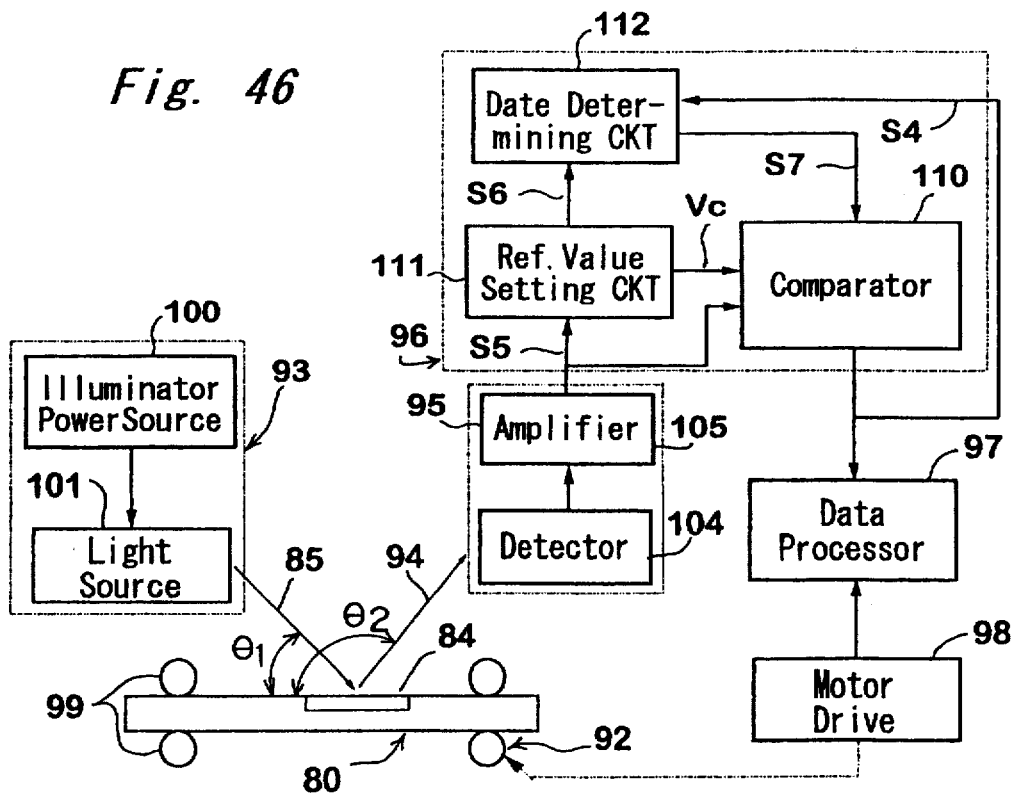
FIG. 46 is a block diagram showing an entire structure of the optical reading apparatus.

The optical reading apparatus according to this embodiment comprises, as shown in FIG. 46, a card transport 92, an illuminating unit 93 for irradiating the card 80 carried by the card transport 92, a photoelectric converter unit 95 for converting a light signal 94, emitted from an irradiated position, into an electric signal, a fluorescent mark detecting unit 96 for detecting from the converted electric signal a mark signal S4 corresponding to the position at which the mark 84 is formed, and a data processing unit 97 for determining contents of the data on the card 80 from the detected mark signal S4.

The card transport 92 includes spaced pairs of rollers 99 adapted to be driven by a motor drive circuit 98 for transporting the card 80, while the latter is sandwiched in between the rollers 99 of the pairs, at a speed of, for example, about 200 to 400 mm per second with the fluorescent mark 84 on the card consequently moved beneath the illuminating unit 93 and the photoelectric converter unit 95. Data associated with the operating timing of the motor drive circuit 98 are fed back to the data processing unit 97 to acknowledge the timing at which a requisite data processing may take place to determine the contents of the mark 84.

The illuminating unit 93 includes a illuminator drive power source 100 for outputting a predetermined direct current voltage in synchronism with the timing of detection of the mark 84 and a light source 101 which is energized by the direct current voltage supplied from the power source 100 to emit rays of light 85.

The light source 101 comprises a light emitting element 102 such as a light emitting diode capable of emitting near infrared rays of light having an emission center wavelength in the vicinity of 800 nm, and a light guide 103 made of a glass fiber and fitted to a light exit of the light emitting element 102 as shown in FIG. 44. This light source 101 is so positioned that a free end of the light guide 103 is spaced a minute distance of about 2 mm or smaller from the surface of the card 80 and the light guide 103 itself is tilted a predetermined angle θ1 within the range of 40 to 60° in a plane perpendicular to the direction of movement of the mark 84 relative to the horizontal direction.

The photoelectric converter unit 95 for converting the light 94 from the irradiated position on the card 80 into the electric signal includes a detector 104 for converting the incident light into an electric current, and an alternating current amplifier 105 for converting the current into a voltage and then amplifying the converted voltage.

The detector 104 includes a light receiving element 106 such as a photocell or a photodiode having a light receiving sensitivity to the infrared region of light, an optical filter 107 fitted to a light receiving face of the light receiving element 106 for selectively passing only the wavelength of the fluorescent light 86 emitted from the mark 84, and a light guide 108 similar to the light guide 103 used on the light source 101 and secured thereto through the optical filter 107.

Figure 47A:
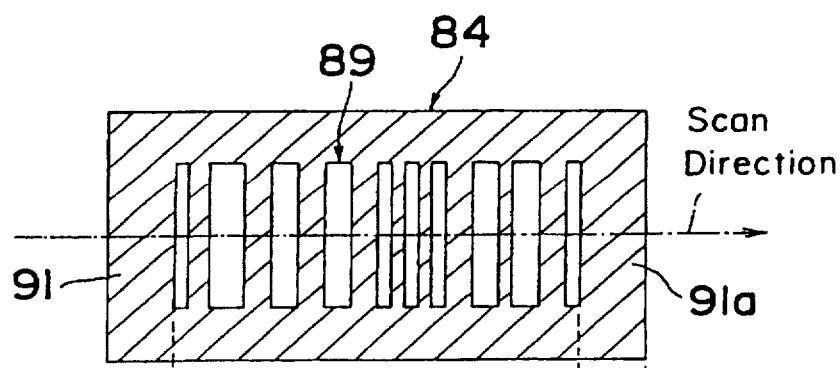
FIGS. 47A, 47B and 47C are diagrams showing how the mark is detected.
Figure 47B:
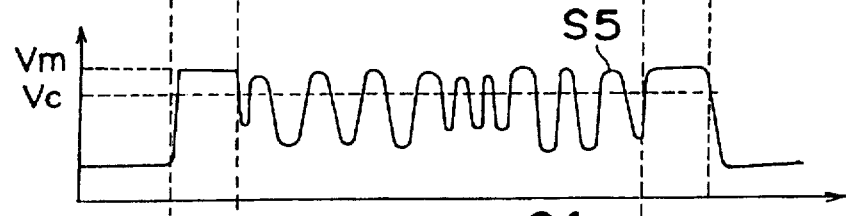

The light guide 108 of the detector 104 has its free end positioned in the vicinity of the free end of the light guide 103 and is inclined at an angle θ2 within the range of, for example, about 105 to 115° in a plane perpendicular to the direction of movement of the mark 84 relative to the horizontal direction. By so positioning the light guide 108, rays of light 94 including a reflected light component 109 reflected from the position at which the mark 84 is irradiated by the exciting light 85 and a fluorescent light component 86 are received by the detector 104 through the light guide 108 as incident light. The incident light 94 is converted by the light receiving element 106 into the voltage proportional to the intensity of the incident light as shown in FIG. 47(b), which voltage is then amplified by the alternating current amplifier 105 to a predetermined voltage. The alternating current amplifier 105 then outputs the signal S5 indicative of the amplified voltage to the mark detecting unit 96 by which a signal corresponding to the position of the mark can be detected.

Figure 47C:
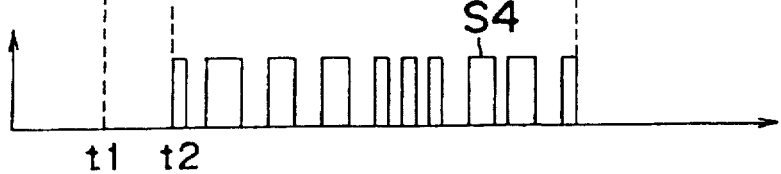

The mark detecting unit 96 comprises a comparator 110 for outputting a mark signal S4 of a waveform as shown in FIG. 47(c) and corresponding to the position at which the mark is formed, a reference value setting circuit 111 for setting a reference value Vc used by the comparator 110, and a data area determining circuit 112 for determining the data area 89 in the mark 84. The reference value setting circuit 111 is operable to detect a portion of the electric signal S5 fed from the photoelectric converter unit 95 which corresponds to the leader 91 of the mark 84 to determine the reference value Vc proportional to the level of the leader 91, which reference value Vc is subsequently inputted to the comparator 110. Simultaneously therewith, the reference value setting circuit 11 supplies a predetermined signal S6 to the data area determining circuit 112 to acknowledge the latter that detection of the data area 89 has been initiated.

The data area determining circuit 112 is used to acknowledge the comparator 110 of the timing at which the input signal S5 is compared with the reference value Vc and operates to initiate detection of the start of scan of the data area 89 in response to a start signal S6 fed from the reference value setting circuit 111 and also to detect the end of the data area 89 in response to the signal S4 outputted from the comparator 110, thereby providing an output signal S7 with the comparator 110. The comparator 110 provides an output signal S4 of a substantially rectangular waveform as shown in FIG. 47(c) when the level of the signal S5 fed from the photoelectric converter unit 95 decreases down to a value lower than the reference value Vc, which output signal S4 is then supplied to the data processor 97 by which the pulse width and interval of the signal S4 are measured to analyze the contents of the data area 89 of the mark 84.

Figure 48:
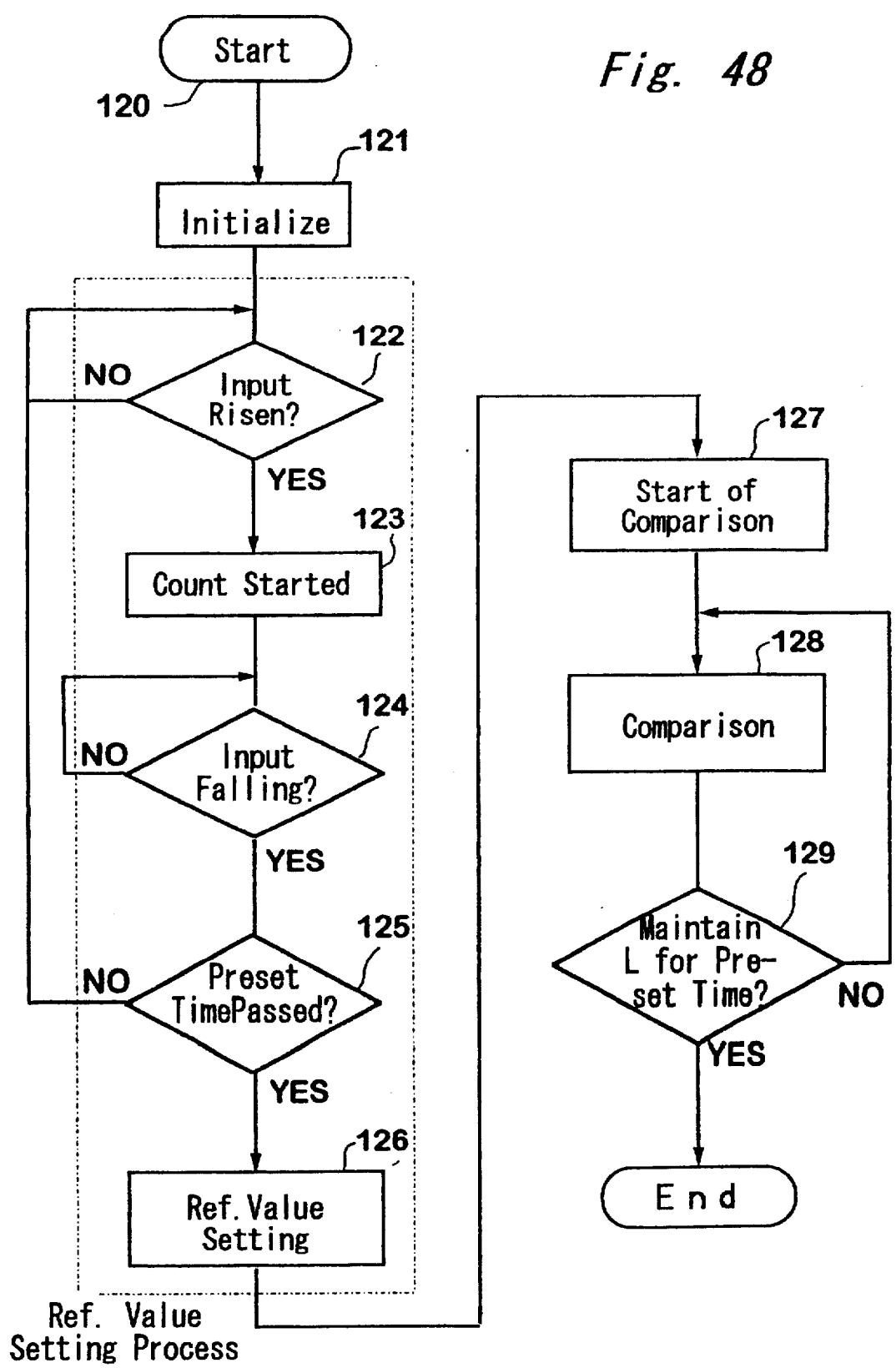
FIG. 48 is a flowchart showing the sequence of operation of a mark detecting unit.

The operation of the mark detecting unit 96 will now be described with reference to the flowchart of FIG. 48. Assuming that the mark detecting unit 96 is brought into operation at step 120, initialization takes place at step 121, followed by a reference value setting block.

In the reference value setting block, the timing at which the signal level abruptly rises is constantly monitored at step 122 by differentiating the input signal S5 fed from the photoelectric converter unit 95. If the raise of the signal level is detected at a timing t1 shown in FIG. 47, the program flow goes to step 123 at which a timer is started and at the subsequent step 124 a wait is made until the fall of the input signal is detected.

Once the fall of the signal level is recognized, the count of the timer indicative of the length of time passed is examined at step 125. Should the decision at step 125 indicate that the length of time passes is shorter than a predetermined value, the input signal is deemed as an unnecessary signal such as, for example, a noise signal and the program flow goes back to step 122. However, if the decision at step 125 indicates that the predetermined length of time has passed at the time the signal level detected at a timing t2 falls, the voltage corresponding to the average voltage Vm of the signal level during a period between the rise and fall thereof which is divided by a predetermined rate is compared with the reference value Vc at step 126 and is then inputted to the comparator 110. Simultaneously therewith, and at step 127, a signal S7 is supplied through the data area determining circuit 112 to the comparator 110 to cause the latter to initiate a comparing operation.

During the comparison taking place at step 128, the comparator 110 outputs a high-level signal during a period in which the level of the input signal S5 falls below the reference value Vc and a low-level signal during a period in which it rises above the reference value Vc, to thereby output the mark signal S4 of the generally rectangular waveform in correspondence to positions where no fluorescent deposit is formed.

Then, at step 129, a length of time during which the mark signal S4 is in the low level state is detected. If the length of time during which the mark signal S4 is in the low level state exceeds a predetermined time, the comparator 110 is acknowledged that the data area 89 of the mark 84 has passed the reading station and the leader 91a is aligned with the reading station, with the comparing step consequently terminated.

It is to be noted that, in place of the use of the fluorescent mark which corresponds to the reversal of the prior art code mark shown in FIG. 45(a), the fluorescent mark in which the reversed data area 89 may be sandwiched between leaders 91 and 91a as shown in FIG. 45(b) or front and rear portions of the data area 89a which are not reversed may be sandwiched by leaders 91 and 91a as shown in FIG. 45(c). If the direction of scan of the fluorescent mark 84 is fixed in one direction, the use of only the leader 91 is sufficient and in such case the leader 91 should be positioned at a location from which the scanning starts. Also, the leader 91 may not be always of a rectangular shape, but may be of any desired shape provided that a distinction can readily be accomplished between it and the data area 89.

While the mark detecting unit 96 has been described as operable to successively process the signal S5 fed from the photoelectric converter unit 95, the mark detecting unit 96 may be designed to sample and store a change in a series of input waveforms and then to detect the position at which the mark 94 is formed by the utilization of such data by means of the above described procedure or a similar procedure.

Moreover, instead of the detection of the fluorescent light 86 by continuously irradiating by the exciting light 85, the method of detecting the fluorescent light 86 can also be used to detect the position at which the mark 84 is formed by intermittently irradiating by the exciting light 85 and then by detecting the afterglow of the fluorescent light 86. Yet, in place of the mark 84 being moved while the optical reading apparatus is fixed in position, arrangement may be made that the illuminating unit 93 and the photoelectric converter unit 95 may be integrated together to provide a portable probe and in such case the optical reading apparatus may be made movable manually or automatically while the mark 84 is fixed in position. In addition, arrangement may also be made that, while the exciting light 85 is scanned at a predetermined angle, light emerging from the scanning position is detected by the detector 104. These variants may equally apply to the remaining embodiments of the optical reading apparatus of the present invention.

Optical Reading Apparatus: Embodiment 6

A sixth preferred embodiment of the optical reading apparatus will now be described. The card 80 and the mark 84 used in connection with this embodiment of the optical reading apparatus are similar to those used in connection with the previously described fifth embodiment and, therefore, the details thereof are not herein reiterated.

Figure 49:
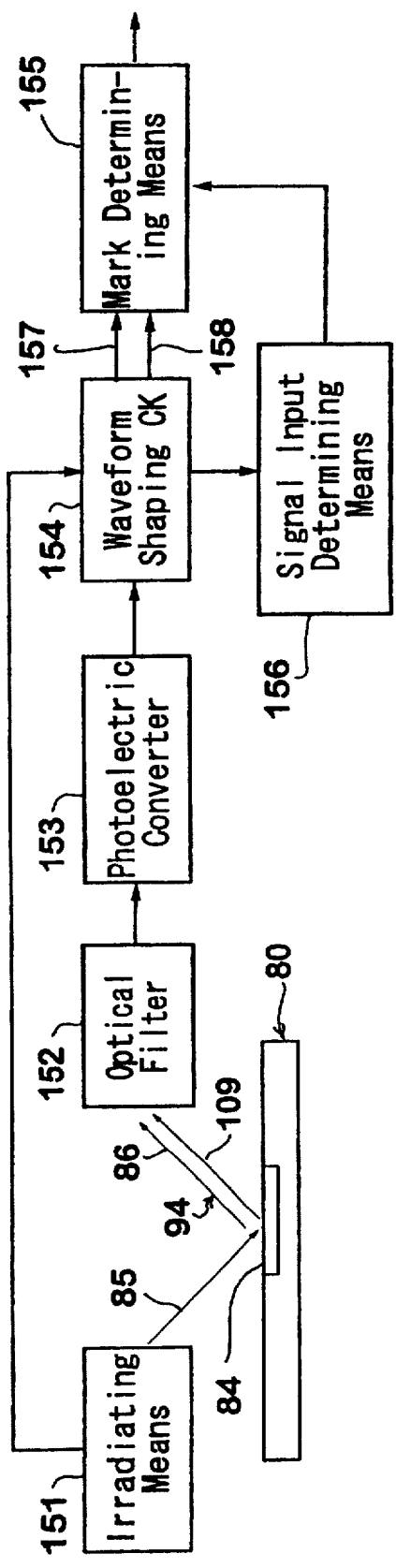
FIG. 49 is a schematic block diagram showing a basic structure of an Example 6 of the optical reading apparatus.

The optical reading apparatus according to this embodiment comprises, as shown schematically shown in FIG. 49, an irradiating means 151 for intermittently irradiating the mark 84 by the exciting light 85 of a predetermined intensity at a predetermined cycle, a photoelectric converting means 153 for receiving the incident light 94 emerging from the position where the exciting light 85 is projected and converting the incident light 94 into an electric signal, a waveform detecting means 154 operable in synchronism with the timing of irradiation by the exciting light 85 from the irradiating means 151 to separately detect a minimum value shortly before the start of irradiation, a maximum value shortly before interruption of the irradiation and a detected value 157 immediately after interruption of the irradiation, and a mark determining means 155 for comparing the detected value 157 with a reference value 158 obtained by dividing the difference between the maximum and minimum values to determine the position at which the mark 84 is formed in the event that the detected value 157 exceeds the reference value 158.

The photoelectric converting means 153 has an input side coupled with an optical filtering means 152 for selectively passing only a light component of a wavelength included in the incident light 94, but matching with that of the fluorescent light 86, and the waveform detecting means 154 includes a signal input determining means 156 operable to sample a value of the input waveform at a predetermined timing, retain such value for the subsequent sampling timing to come and determine whether or not the maximum value outputted from the detecting means 154 is significant. Only during a period in which the signal input determining means 156 determines that the maximum value is significant, the mark determining means 155 undergoes a comparing operation.

Figure 50:
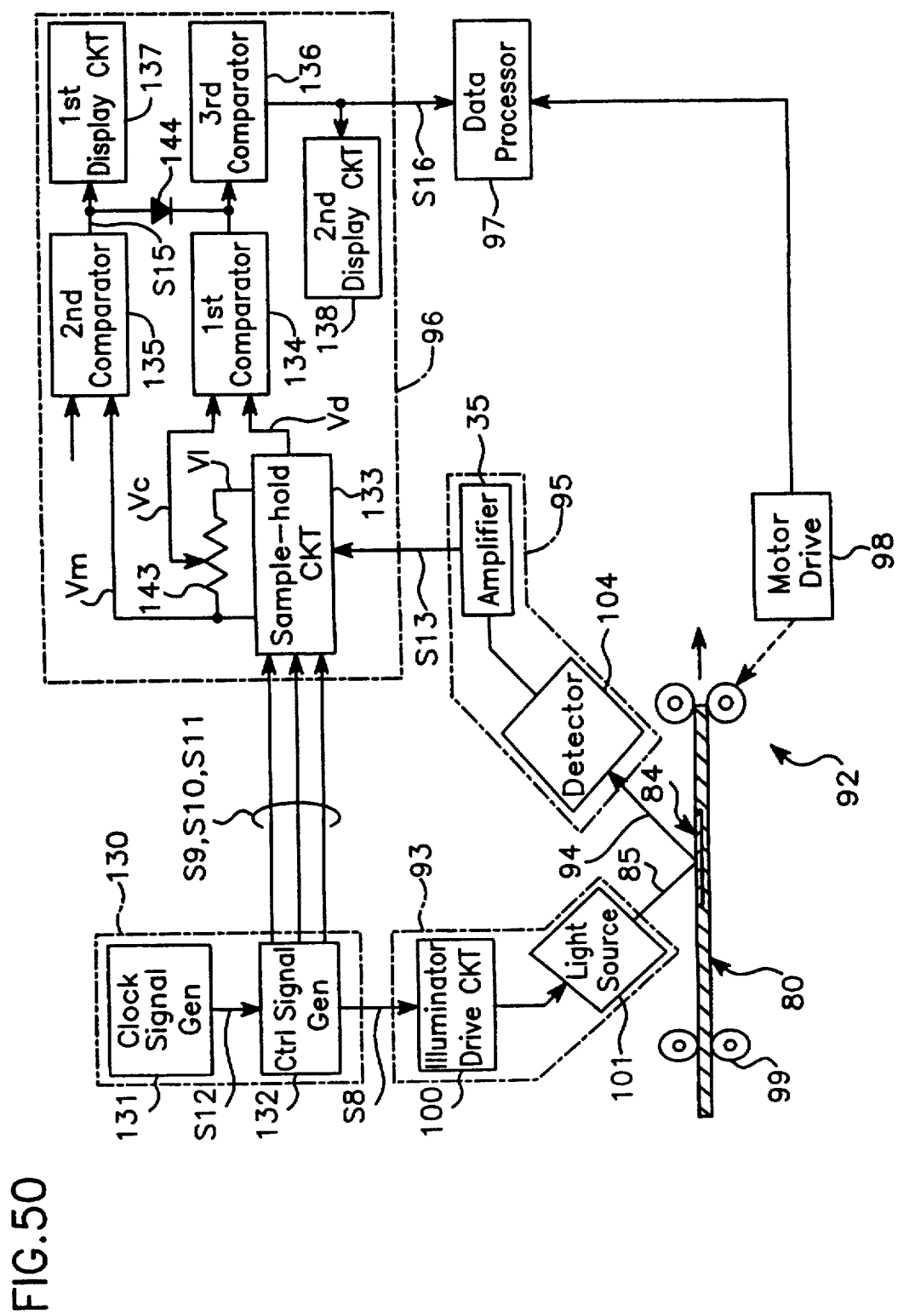
FIG. 50 is a block diagram showing an entire structure of the optical reading apparatus shown in FIG. 49.

More specifically, the optical reading apparatus according to this embodiment comprises, as shown in FIG. 50 showing the details thereof, a card transport 92, an illuminating unit 93, a photoelectric converter 94, a fluorescent mark detecting unit 96, a data processor 97 and a signal generating unit 130 for generating various control signals.

The signal generating unit 130 is operable to generate at least a drive signal S8 used in the illuminating unit 93 and three timing signals S9, S10 and S11 used in the mark detecting unit 96 and, for this purpose, includes a clock signal generator 131 for generating a clock signal S12 and a control signal generator 132 for generating the various control signals based on the clock signal S12.

The clock signal generator 131 continuously generates the clock signal S12 in the form of a train of pulses at a predetermined interval of, for example, about 100 μmsec as shown in FIG. 52(a). The control signal generator 132 formulates the drive signal S8 of a generally rectangular waveform having its level varying at an interval of about 500 μsec as shown in FIG. 52(b) by varying the levels of the signal each time five pulses of the clock signal S12 are inputted thereto. Also, the control signal generator 132 outputs a pulse signal in synchronism with, for example, the fourth, sixth and ninth pulses of the clock signal S12 subsequent to the rise of the drive signal S8, to thereby form the timing signals S9 to S11 in synchronism with the drive signal S8 as shown in FIG. 52(c) to FIG. 52(e), respectively.

The mark detecting unit 96 includes a sample-hold circuit 133 for measuring a change of the signal S13 from the photoelectric converter unit 95 as shown in FIG. 52(f), first to third comparators 134, 135 and 136, and first and second display circuits 137 and 138.

The sample-hold circuit 133 includes three sampling circuits 142a, 142b and 142c of a substantially identical construction each including a voltage buffer circuit 139 in the form of an operational amplifier, a capacitor 140 connected with one input of the voltage buffer circuit 139 for holding an input voltage and an analog switch 141 adapted to be triggered on in response to the associated timing signal S9, S10 or S11 fed from the signal generating unit 130.

This sample-hold circuit 133 is operable to individually and cyclically sample the voltage varying signal S13 corresponding to the intensity of the incident light 94 as shown in FIG. 52(f) and retain such detected value until the subsequent sampling timing.

Figure 51:
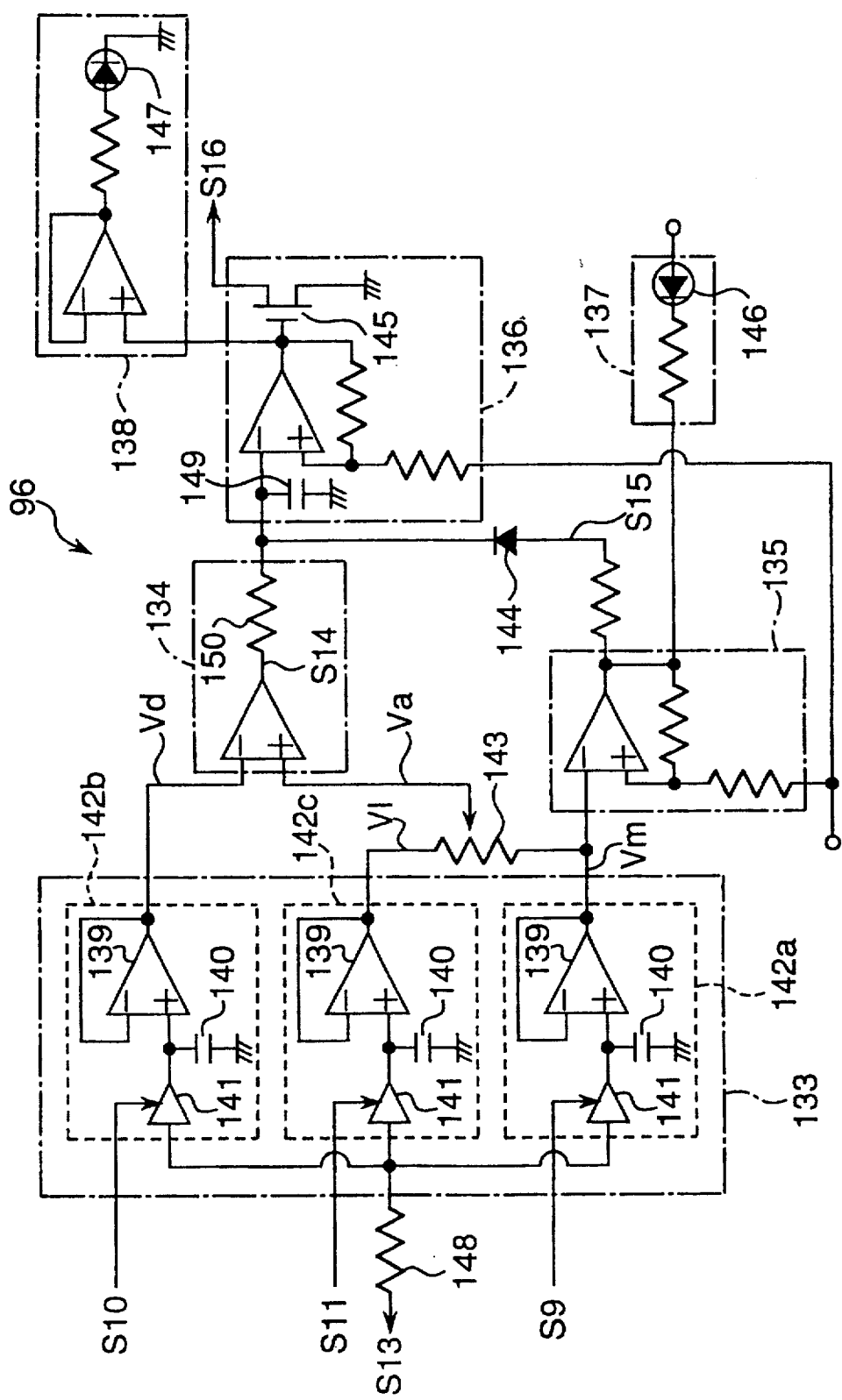
FIG. 51 is a block diagram showing the details of the mark detecting unit used in the apparatus shown in FIG. 50.

In this embodiment, the timing signal S9 shown in FIG. 52(c) is supplied to the first sampling circuit 142a (See FIG. 51) so that the maximum value Vm of the incident light 94 shown by a bold line in FIG. 52(e) is detected by the voltage immediately before the interruption of irradiation by the light 85. Also, the timing signal S10 shown in FIG. 52(d) is supplied to the second sampling circuit 142b so that the intensity of the afterglow is detected in the form of a voltage Vd shown by the broken line in FIG. 52(g) by the voltage immediately after the interruption of irradiation.

Also, the timing signal S11 shown in FIG. 52(e) is supplied to the third sampling circuit 142c so that the minimum value of the incident light 94 shown by the slender line in FIG. 52(g) is detected by the voltage V1 immediately before restart of irradiation by the light 85. In this way, change of the waveform of the incident light 94 is determined in the form of a change of the voltage so that the percentage of the intensity of the afterglow relative to the whole can be determined.

The first comparator 134 for determining the value of each detected value is employed in the form of an operational amplifier having a negative input terminal to which the voltage Vd proportional to the afterglow and outputted from the second sampling circuit 142b is inputted as the detected value. On the other hand, the difference between respective voltages outputted from the first and third sampling circuits 142a and 142b is divided by a variable resistor 142 to provide a voltage Vc which is inputted to the first comparator 134 as a reference value Vc as shown by the single-dotted line in FIG. 52(g). Thus, should the first comparator 134 determines that the detected value Vd exceeds the reference value Vc, a predetermined signal S14 is outputted from the first comparator 134 to the third comparator 136.

The second comparator 134 compares the maximum value Vx, outputted from the first sampling circuit 142a, with a predetermined reference value and outputs a predetermined signal S15 when the maximum value Vm decreases down below the reference value. However, if the maximum value Vm exceeds the predetermined reference value, the second comparator 134 ceases outputting the signal S15. This second comparator 134 is connected parallel to the first comparator 134 and has an output terminal connected with the third comparator 136 through a forward-biased diode 144 so that the signal S15 can be supplied to the third comparator 136.

The third comparator 136 is in the form of an operational amplifier having a negative input terminal adapted to receive respective outputs from the first and second comparators 134 and 135 and is operable to compare them with a predetermined reference value so that a switching element 145 in the form of a field effect transistor coupled with an output stage of the operational amplifier can be controlled. While during a period in which both of the respective output voltages from the first and second comparators 134 and 135 are lower than the predetermined reference value, a "1" signal descriptive of detection of the fluorescent mark 84 is outputted to the data processor 97, a signal S16 to be supplied to the data processor 97 will be rendered to be "0", descriptive of non-detection of the fluorescent mark 84, in the event that a high level signal is outputted from either one of the first and second comparators 134 and 135.

Accordingly, during a period in which an output signal S14 from the first comparator 134 is instable because the intensity of the incident light 94 is low, a high level signal S15 is supplied from the second comparator 135 to the negative input terminal of the third comparator 136, causing an output of the third comparator 136 to be forcibly rendered zero ("0") to acknowledge the data processor 97 that no fluorescent mark 84 has been detected.

Conversely, in a condition in which the intensity of the incident light 94 is of a value higher than a predetermined value and detection of the fluorescent mark 84 takes place normally, the second comparator 135 outputs a low level signal wherefore the third comparator 136 is operated in response to change in level of the output from the first comparator 134, that is, in response to detection of the fluorescent component, so that as shown in FIG. 52(h) the presence or absence of the fluorescent mark can be determined.

The timing at which the determination is carried out by the third comparator 136 is visually indicated by emission of light from a light emitting diode 146 of the first display circuit 137 coupled with an output of the second comparator 135. Also, the timing at which the fluorescent mark 84 is detected is visually indicated by emission of light from a light emitting diode 147 of the second display circuit 138 coupled with an output of the third comparator 136.

A capacitor 140 and a resistor 146 both disposed on an input stage of the sample-hold circuit 133 and a capacitor 149 and a resistor 150 both disposed on an input stage of the third comparator 136 constitute a respective integrating circuit operable to avoid any possible erroneous operation which would result from an abrupt increase of the input level in response to input of noise pulses.

The cycle of the drive signal S8 employed in the illustrated embodiment is about 1 msec which is about twice the persisting time of the fluorescent afterglow of the fluorescent substance forming the fluorescent mark 84, but the cycle and the persisting time can be suitably changed.

Also, the respective timings at which sampling signals S9 to S11 may be set to be about the timing at which the exciting light 85 is pulsated, in which case separation between the fluorescent light 86 and the reflected light 109 can be accomplished accurately. In such case, it is possible to detect the value of the fluorescent light 86 without detecting the afterglow, but in reference to the voltage immediately after the start of irradiation and immediately before interruption of the irradiation.

In addition, the analog operational amplifier used in the various comparators for comparing the detected values with the associated reference values may be replaced with a digital comparator such as, for example, a microprocessor. In such case, in place of or in addition to the selective sampling of the voltage value at a characteristic portion of the input waveform, the entire waveform may be detected so that a change thereof can be digitally processed.

Optical Reading Apparatus: Embodiment 7

The card 80 and the mark 84 used in connection with this seventh embodiment of the optical reading apparatus are similar to those used in connection with the previously described fifth embodiment and, therefore, the details thereof are not herein reiterated.

Figure 53:
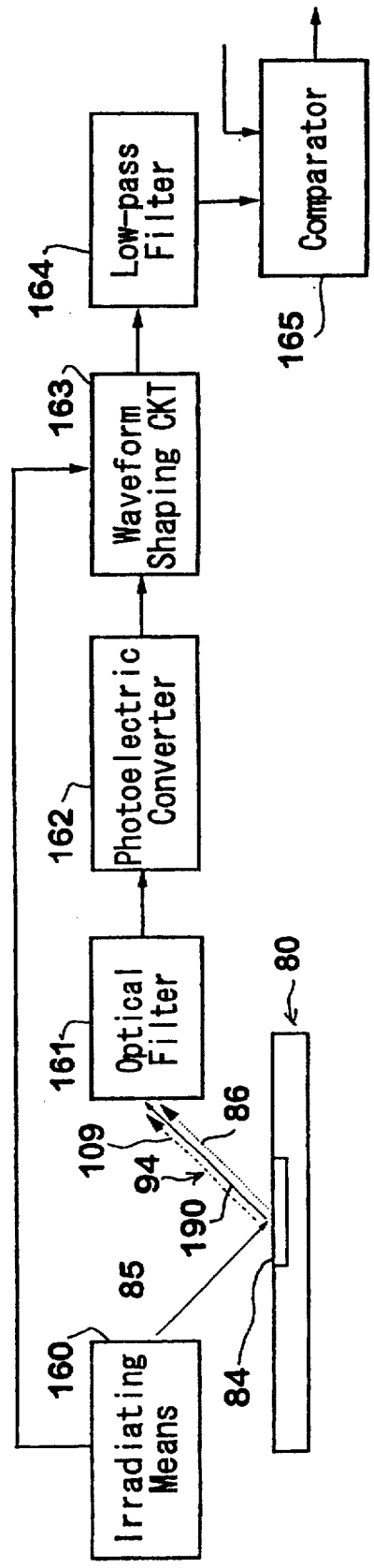
FIG. 53 is a schematic diagram showing a basic structure of an Example 7 of the optical reading apparatus.

The seventh embodiment of the optical reading apparatus is shown schematically in FIG. 53 and comprises an irradiating means 160 for intermittently irradiating the mark 84 by the exciting light 85 of a predetermined intensity at a predetermined cycle, a photoelectric converting means 162 for receiving the incident light 94 emerging from the position where the exciting light 85 is projected and converting the incident light 94 into an electric signal, a waveform shaping means 163 for inverting and amplifying a half of an output signal from the photoelectric converting means 162 in synchronism with the timing 90° displaced in phase from the irradiating period of the exciting light 85 from the irradiating means 160, a low pass filtering means 164 for selectively extracting a direct current component from an output signal from the waveform shaping means 163, and a comparing means 165 for comparing a detected voltage outputted from the low pass filtering means 164 with a reference voltage and for providing a predetermined mark signal therefrom in the event that the detected voltage exceeds the reference voltage.

Figure 54:
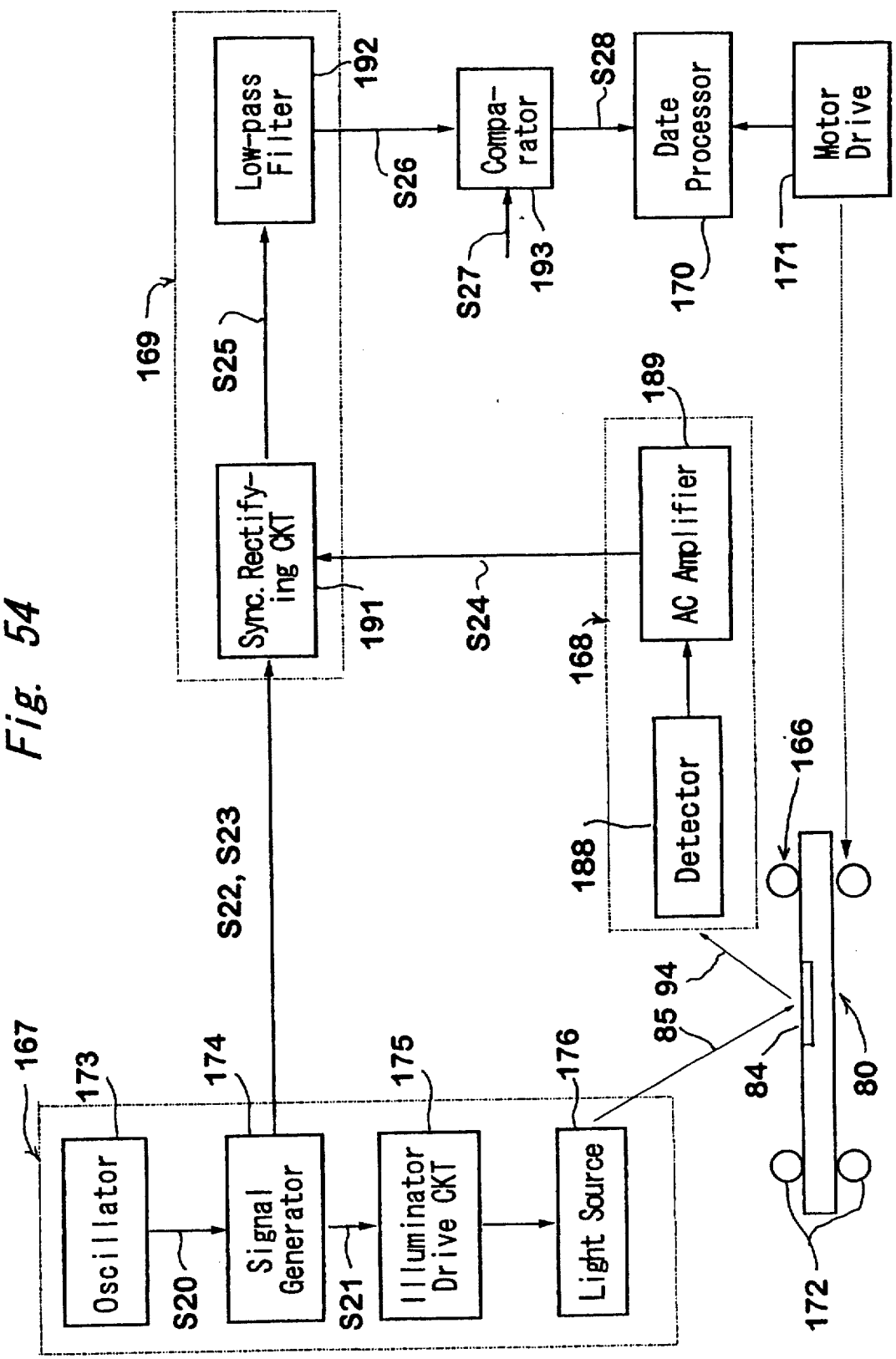
FIG. 54 is a block diagram showing an entire structure of the optical reading apparatus shown in FIG. 53.

More specifically, as shown in FIG. 54, the optical reading apparatus comprises a card transport 166 for transporting the card 80, an illuminating unit 167 for illuminating the marking 84 on the card 80, a photoelectric converting unit 168 for converting rays of light 94, emerging from the position of the mark 84 irradiated by the exciting light 85, into an electric signal, a fluorescent mark detecting unit 169 for outputting, based on the converted electric signal, a mark signal S28 descriptive of the position at which the mark 84 is formed, and a data processor 170 for determining contents of the data on the card 80 in reference to the detected mark signal S28.

The card transport 166 includes spaced pairs of rollers 172 adapted to be driven by a motor drive circuit 171 for transporting the card 80, while the latter is sandwiched in between the rollers 172 of the pairs, at a speed of, for example, about 200 to 400 mm per second with the fluorescent mark 84 on the card consequently moved beneath the illuminating unit 167 and the photoelectric converter unit 168. Data associated with the operating timing of the motor drive circuit 171 are fed back to the data processor 170 to acknowledge the timing at which a requisite data processing may take place to determine the contents of the mark 84.

The illuminating unit 167 includes an oscillator 173 for generating a clock signal S20 of a waveform as shown in FIG. 56(a), a signal generator 174 for generating two different control signals S22 and S23 and a drive signal S21 in synchronism with the timing of the clock signal S20, an illuminator drive circuit 175 for amplifying the power of the drive signal S21, and a light source 176 which is energized by the drive circuit 175 to emit the exciting light 85. The oscillator 173 is operable to continuously generate the clock signal S20 in the form of a train of pulses at intervals of, for example, 250 µsec as shown in FIG. 56(a).

Figure 55:
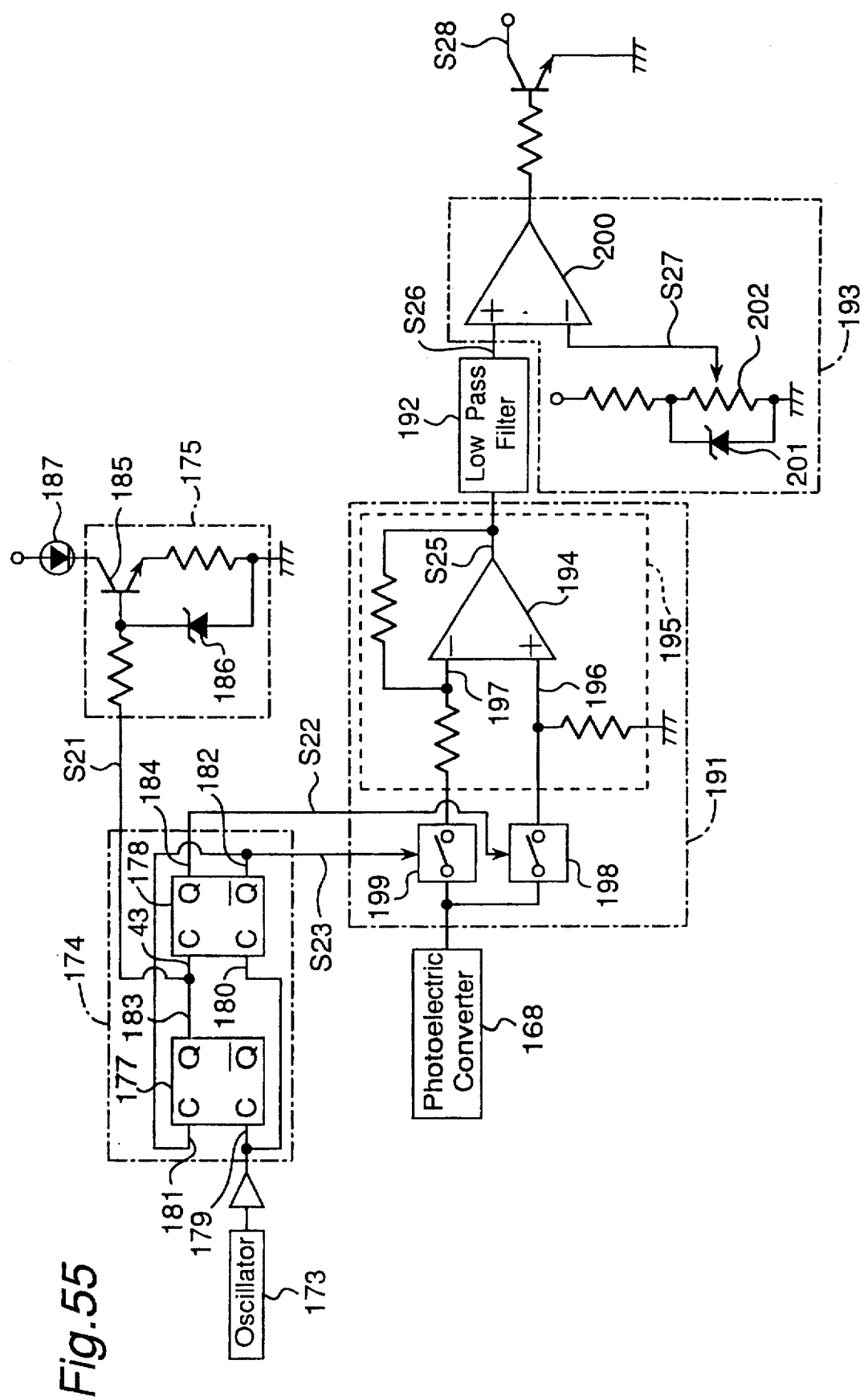
FIG. 55 is a block diagram showing the details of the mark detecting unit used in the apparatus shown in FIG. 54.

The signal generator 174 includes, as shown in FIG. 55, first and second D-type flip-flops 177 and 178 each having a clock signal input terminal 179 and 180 which is connected with an output terminal of the oscillator 173. The first flip-flop 177 also has a data input terminal 181 and a non-inverting output terminal 183 which are respectively connected with an inverting output terminal 182 and a data input terminal 43 of the second flip-flop 178.

With this structure, each time two pulses of the clock signal S20 are applied to the signal generator 174, the drive signal S21 of a rectangular waveform having its output level inverted at intervals of about 500 µsec is outputted from the non-inverting output terminal 183 of the first flip-flop 177. A first control signal S22 of a frequency equal to that of the drive signal S21, but retarded 90° in phase from that of the drive signal S21 is outputted from a non-inverting output terminal 184 of the second flip-flop 178, and a second control signal S23 of a frequency equal to that of the drive signal S21, but advanced 90° in phase from that of the drive signal S21 is outputted from an inverting output terminal 182 of the second flip-flop 178.

The illuminator drive circuit 175 is comprised of a transistor switch 185 adapted to be turned on in response to the drive signal S21 and includes a Zener diode 186 connected between the emitter and base of the transistor switch 185 for limiting the base voltage, said transistor switch 185 having a collector connected in series with a light emitting element 187.

The light source 176 comprises the light emitting element 187 such as a light emitting diode capable of emitting near infrared rays of light having an emission center wavelength in the vicinity of 800 nm, and a light guide made of a glass fiber and fitted to a light exit of the light emitting element 187. This light source 176 is so positioned that a free end of the light guide is spaced a minute distance of about 2 mm or smaller from the surface of the card 80 and the light guide itself is tilted a predetermined angle within the range of 45 to 60° in a plane perpendicular to the direction of movement of the mark 84 relative to the horizontal direction. (In this connection, see FIG. 44.)

The photoelectric converter unit 168 includes a detector 188 for converting the incident light into an electric current, and an alternating current amplifier 189 for converting the current into a voltage and then amplifying the converted voltage. The detector 188 includes a light receiving element such as a photocell or a photodiode having a light receiving sensitivity to the infrared region of light, an optical filter fitted to a light receiving face of the light receiving element for selectively passing only the wavelength of the fluorescent light emitted from the mark 84, and a light guide similar to the light guide used on the light source 176 and secured thereto through the optical filter.

The light guide of the detector 188 has its free end positioned in the vicinity of the free end of the light guide and is inclined at an angle within the range of, for example, about 105 to 115° in a plane perpendicular to the direction of movement of the mark 84 relative to the horizontal direction. By so positioning the light guide, rays of light 94 emerging from the position at which the exciting light 85 is projected onto the mark 84 can be received. As the incident light 94 includes a reflected light component 109 reflected from the position at which the mark 84 is irradiated by the exciting light 85, a fluorescent light component 86 and external light 190 (See FIG. 53) pass through the optical filter, only the reflected light 109 and the external light 190, that is, rays of light of a wavelength other than that of the fluorescent light component 86, are attenuated to a value as small as possible, and the light receiving element converts the incident light into an electric current proportional to the intensity thereof.

Also, after having been amplified to the predetermined value by the alternating current amplifier 189, a detected signal S24 of a waveform shown in FIG. 56(e) is inputted to the fluorescent mark detecting unit 169 so that a signal S28 descriptive of the position where the mark 84 is formed can be outputted selectively.

The seventh embodiment of the optical reading apparatus is characterized in the structure of the fluorescent mark detecting unit 169. As shown in FIGS. 54 and 55, the mark detecting unit 169 includes a synchronous rectifying circuit 191 for shaping the detected signal S24 into a predetermined signal S25 of a waveform as shown in FIG. 56(f) by the utilization of the first and second control signals S22 and S23, a low pass filter 192 for removing an alternating current component from the signal S25 to provide a signal S26 which varies in level in dependence on detection of the fluorescent light 86, and a comparator 193 for outputting a mark signal S28 when a significant signal S26 is inputted thereto.

The synchronous rectifying circuit 191 includes, as shown in FIG. 55, a differential amplifying circuit 195 utilizing an operational amplifier 194 having two input terminals 196 and 197 connected parallel to each other to receive the detected signal S24 and also connected in series with respective analog switches 198 and 199, which analog switches 198 and 199 are in turn adapted to be controlled respectively by the control signals S22 and S23.

In other words, the analog switch 198 connected with a positive input terminal 196 of the operational amplifier 194 is adapted to be turned on during a period in which the first control signal S22 is in a high level state, while the analog switch 199 connected with a negative input terminal 197 of the operational amplifier 194 is adapted to be turned on during a period in which the second control signal S23 is in a high level state.

While the period during which the first control signal S22 is in the high level state corresponds to the period retarded 90° in phase from the irradiating period during which the exciting light 85 is emitted from the light emitting element, the period during which the second control signal S23 is in the high level state corresponds to the period advanced 90° in phase from the irradiating period. Accordingly, of the detected signal S24 inputted to the synchronous rectifying circuit 191, a latter half period during which the exciting light is emitted and a first half period during which emission of the exciting light is interrupted are inputted to the positive input terminal 196 of the operational amplifier 194 through the analog switch 198 while a latter half period during which the emission of the exciting light is interrupted and a first half period during which the exciting light is emitted are inputted to the negative input terminal 197 of the operational amplifier 194 through the analog switch 199. As a result thereof, a signal S25 emerges from the synchronous rectifying circuit 191 which signal S25 has a waveform shown in FIG. 56(f) which assumes a plus voltage during a period in which the detected signal S24 is inputted to the positive input terminal 196 and a negative voltage during a period in which the detected signal S24 is inputted to the negative input terminal 197.

In the meantime, since the change in voltage of the detected signal S24 takes place in a pattern of a rectangular waveform as shown by the single-dotted line in FIG. 56(e) since only the reflected light 109 comes from the mark 84 and the card 80 during the period in which the exciting light 85 is not projected onto the fluorescent mark 84. Accordingly, the output signal from the synchronous rectifying circuit 191 is of such a waveform as shown by the hatched areas in FIG. 56(f) in which a first half of the reflected light component is inverted and a latter half thereof is not inverted and is in the form of a signal having plus and minus sides of an equal value.

On the other hand, when the exciting light 85 scans across the fluorescent mark 84, the fluorescent component increases exponentially, as shown by the solid line in FIG. 56(e), subsequent to the irradiation by the exciting light due to the persistency of the fluorescent light 86 and also decreases exponentially subsequent to the interruption of irradiation by the exciting light. Accordingly, the output signal S25 from the synchronous rectifying circuit 191 is selectively non-inverted and amplified during the period in which the fluorescent component is high, or inverted and amplified during the period in which the fluorescent component is low, and consequently, a signal having a plus side sufficiently higher than the minus side can be drawn from the synchronous rectifying circuit 191.

In view of this, in the illustrated embodiment, the output signal S25 from the synchronous rectifying circuit 191 is allowed to pass through the low pass filter 192 so that an alternating current component can be removed, leaving only a direct current component to be outputted from the low pass filter 192. In other words, as shown by the single-dotted chain line shown in FIGS. 56(e) and 56(f), no output emerge from the low pass filter 192 when the fluorescent mark 84 is not scanned, because the plus side and the minus side are of a equal quantity.

However, as shown by the solid line in FIG. 56(e), when the mask 84 is scanned, the external light 190 and the reflected light 109 are cancelled, but the fluorescent light 94 has a plus side considerably higher than the minus side. Accordingly, the signal S26 in the form of a positive direct current voltage is outputted from the low pass filter 192.

The signal S26 emerging from the filter 192 is in turn inputted to the comparator 193 utilizing an operational amplifier 20 and is compared in the comparator 193 with a reference voltage S27 which corresponds the voltage, stabilized by a constant voltage diode 102, that is divided by a variable resistor 202. When the significant signal S26 exceeding the reference voltage S27 is inputted to the comparator 193, an output voltage thereof is rendered to be in a high level state and the mark signal S28 descriptive of the detection of the mark position can be outputted from the comparator 193.

It is to be noted that in the illustrated embodiment the drive signal S21 has a cycle of about 1 msec which is about twice the persisting time during which the afterglow from the fluorescent substance forming the fluorescent mark 84 continues. However, it is pointed out that the cycle and the persisting time may be suitably varied.

Optical Reading Apparatus: Embodiment 8

Before the description of an eighth preferred embodiment of the optical reading apparatus proceeds, an example of the fluorescent mark will be discussed with reference to FIG. 57. As shown in FIG. 57, a fluorescent mark 210 in the form of a bar code is formed on a carrier 211 such as, for example, a card, by the use of a printing technique and covered by a protective sheet 213 bonded to the carrier 211 by means of a bond layer 212.

The fluorescent mark 210 is prepared by the use of a transparent inking medium containing fluorescent microparticles capable of being excited by irradiation of, for example, infrared rays of light, which microparticles are dispersed and retained in a binder. The fluorescent microparticles may be microparticles of an organic compound such as, for example, Rhodamine 6G, Thioflavine or Eosine or of an inorganic compound such as $NdP_5O_{14}$, $LiNdP_4O_{12}$ or $Al_3Nd(BO_3)_4$.

The binder used may be one or a mixture of, for example, wax, polyvinyl chloride-vinyl acetate copolymer, ethylene-vinyl acetate copolymer, polyester, polyurethane and carbonate. If desired, a suitable quantity of one or both of a plasticizer and a surface active agent may be employed.

As a printing method, any printing method may be employed such as, for example, a thermal transfer technique in which an ink ribbon comprising a ribbon base having one surface coated with the transparent inking medium is mounted on a thermal head so that the inking medium can be thermally transferred onto a surface of the merchandise as the carrier or a screen printing technique in which the transparent inking medium in a liquid form is printed onto the surface of the merchandise. The suitable printing method may be selected depending on the type and shape of the carrier.

The bond used to form the bond layer 212 may be a bonding agent of a non-solvent type such as, for example, a hot-melt bonding agent, in order to avoid any possible swelling, or deformation upon dissolution, of the fluorescent mark 210. The hot-melt bonding agent referred to above may be of a kind containing an ethylene-vinyl acetate copolymer, polyethylene, polyamide or polyester.

The protective sheet 213 may be a transparent resinous sheet made of, for example, vinyl chloride or polyester. The carrier 211 of the fluorescent mark 210 may have a while-color layer formed thereon for enhancing the reflection of light and also enhancing the level of a signal detected from the fluorescent mark 210.

As shown therein, when infrared rays of light 214 of a center wavelength matching with that at which the fluorescent substance used can be excited are projected onto the fluorescent mark 210, the fluorescent microparticles are excited in response to application of the infrared rays of light 214 to emit the fluorescent light 215 of a particular wavelength different from the center wavelength of the infrared rays of light 214. If the fluorescent light 215 is received and converted into an electric signal by a light receiving element and is subsequently digitized, a binary signal descriptive of the pattern of code bars forming the fluorescent mark 210 can be obtained so that information represented by the fluorescent mark 210 can be read out.

Figure 58:
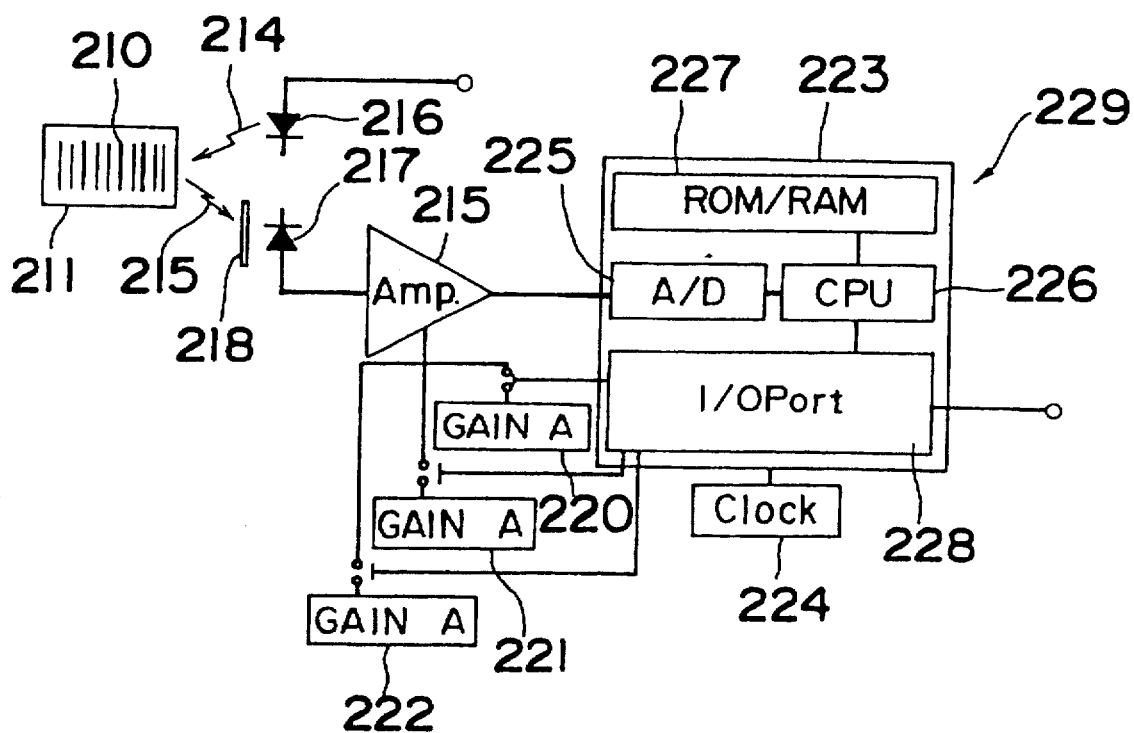
FIG. 58 is a block diagram showing an Example 8 of the optical reading apparatus.

FIG. 58 illustrates the optical reading apparatus according to the eighth embodiment. As shown therein, the optical reading apparatus comprises a light emitting element 216, a light receiving element 217, an optical filter 218, an amplifier 219, a first amplification setting unit 220 for maximizing the amplification factor of the amplifier 219, a second amplification setting unit 221 for setting the amplification factor to a medium value, a third amplification setting unit 222 for minimizing the amplification factor, a signal detector 223, and a clock signal generator 224 for applying a drive clock to the signal detector 223.

The signal detector 223 includes an analog-to-digital (A/D) converter 225 for converting an analog reproduction signal a into a digital signal, a processor (CPU) 226 for analyzing a bar code signal from a binary signal outputted from the A/D converter 225, a memory device 227 comprised of, for example, a program memory and a work memory, and an interface (I/O) port 228 for controlling inputs and outputs.

The I/O port 228 outputs a signal necessary to select one of the first to third amplification setting units 220, 221 and 22 based on instructions from the processor 226 which determines a favorable amplification factor in reference to the status of the analog reproduction signal a received by the A/D converter 225. The signal detector 223 is operable to reproduce the bar code signal from the analog reproduction signal a based on a program stored in the memory device 227 and then output the bar code through the I/O port 228.

Figure 59:
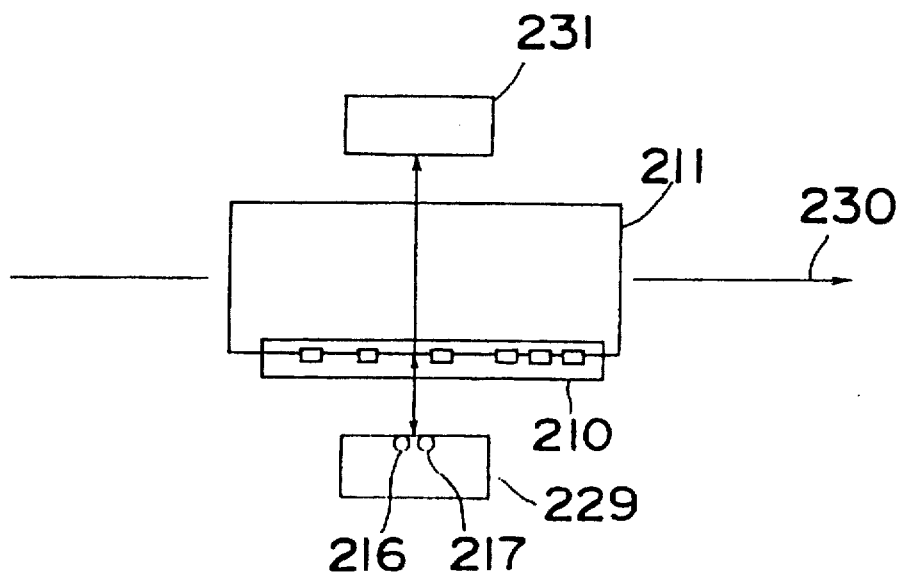
FIG. 59 is a schematic diagram showing the manner in which the optical reading apparatus of FIG. 58 is arranged.

The optical reading apparatus 229 of the above described structure is, as shown in FIG. 59, disposed so as to confront the path 230 of movement of the carrier 211. On one side of the path 230 of travel of the carrier 221 opposite to the side where the light emitting element 216 and the light receiving element 217 both mounted on the optical reading apparatus 229 are disposed, a reflector 231 is disposed so as to reflect the infrared rays of light from the light emitting element 216 back towards the light receiving element 217 across the path 230 of travel of the carrier. In this arrangement, the light receiving element 217 is adjusted to generate an output signal of a saturation level so long as the entire quantity of the infrared rays of light are reflected thereto by the reflector 231.

Figure 60:
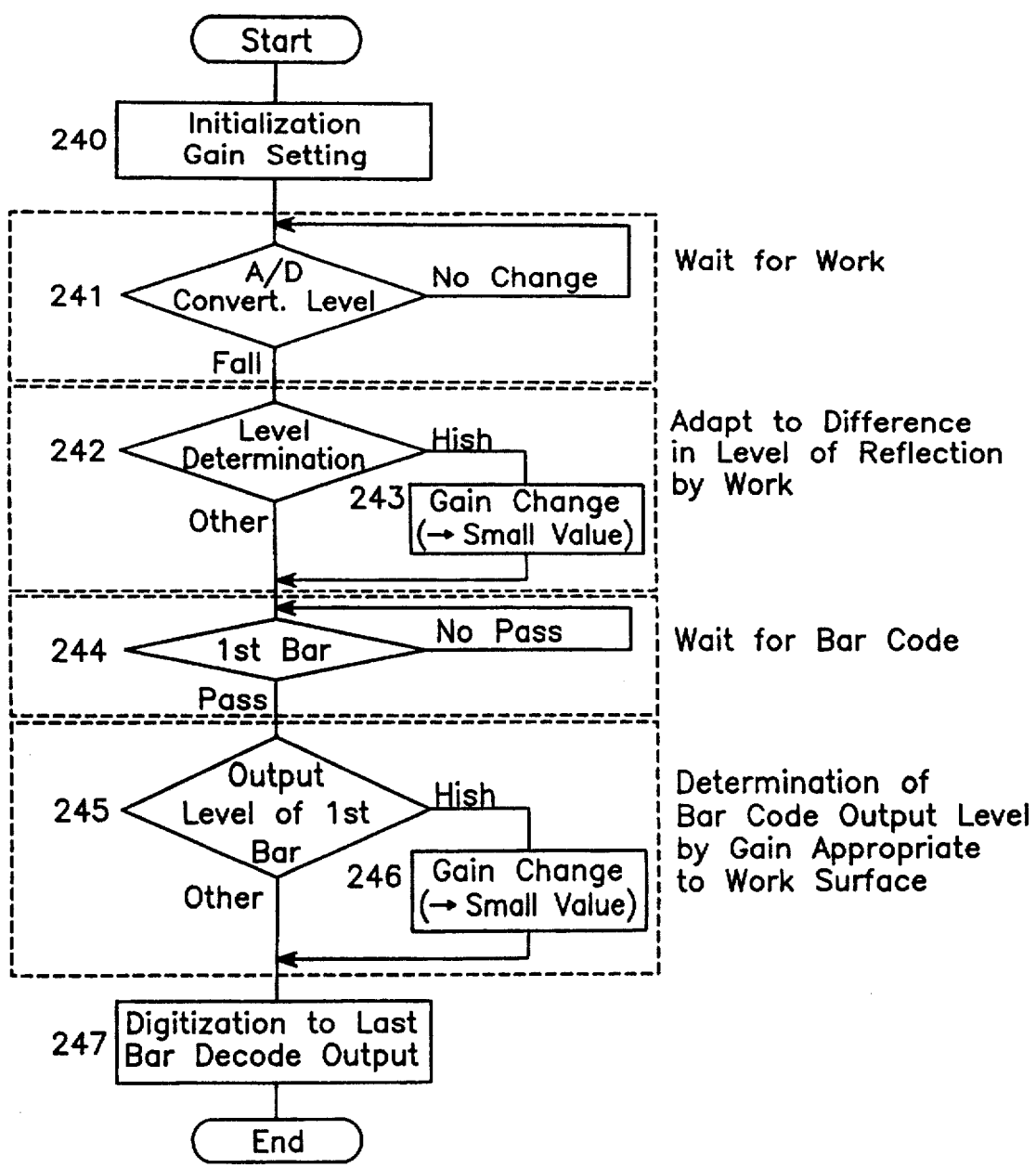
FIG. 60 is a flowchart showing the sequence of reading of the mark executed by the optical reading apparatus of FIG. 58.

The sequence of reading the fluorescent mark performed by this optical reading apparatus will now be described with reference to FIGS. 60 to 62.

Assuming that the apparatus is electrically powered, the first amplification setting unit 220 is selected according to instructions issued from the processor 226 at step 240 to determine the initial amplification factor of the amplifier 219. At step 241, a wait is made until the carrier 211 is moved past the reading station.

Although during this wait the infrared rays of light is projected from the light emitting element 216, and so long as no carrier 211 is present at the reading station between both of the light emitting and receiving elements 216 and 217 and the reflector 231, the infrared rays of light projected by the light emitting element 216 are reflected by the reflector 231 so as to be incident upon the light receiving element 217 and, therefore, as shown by an area A in FIG. 61(a), the analog reproduction signal a attains the saturation level Vref.

However, as the carrier 211 moves past the reading station between both of the light emitting and receiving elements 216 and 217 and the reflector 231, the infrared rays of light from the light emitting element 216 first impinge upon a non-mark area of the carrier 211 where no fluorescent mark 210 is printed and are then reflected thereby towards the light receiving element 217. In general, since the reflectance of the carrier 211 is lower than that of the reflector 231, the level of the analog reproduction signal a decreases as shown by an area B in FIG. 61(a).

At this time, the processor 226 determines at step 242 the level of the analog reproduction signal a. In the event that it is determined that the level of the analog reproduction signal a resulting from irradiation of the non-mark area of the carrier 211 is higher than a gain determination level at which the gain is changed (corresponding to carrier areas (a) and (b) shown in FIG. 61(a)), the second amplification setting unit 221 is selected according to instructions given by the processor 226 with the amplification factor of the amplifier 219 consequently lowered to an intermediate value at step 243. Thus, the level of the analog reproduction signal a attributable to the carrier areas (a) and (b) is lowered down to a value lower than the determining level Vth as shown by the broken line in FIG. 61(a).

In the event that the level of the analog reproduction signal a attributable to the non-mark area of the carrier is determined lower than the determining level Vth (corresponding to the carrier areas (c) and (d) shown in FIG. 61) at step 242, and after the amplification factor of the amplifier 219 at step 243 has been lowered, the program flow goes to step 244 at which a wait is made until the fluorescent mark 210 would be brought to the reading station. When while the infrared rays of light are continuously projected from the light emitting element towards the reading station the fluorescent mark 210 carried by the carrier 211 arrives at the reading station, the fluorescent substances contained in the fluorescent mark 210 is excited to emit a fluorescent light and, therefore, the level of the analog reproduction signal a increases.

At this time, the processor 226 executes step 245 to determine the level of the analog reproduction signal a. In the event that the peak value of the analog reproduction signal a attributable to the bar code area of the fluorescent mark 210 is determined higher than the gain determination level Vth (corresponding to the carrier areas (a) and (b) as shown in FIG. 61(b)), the third amplification setting unit 222 is selected according to instructions from the processor 226. Accordingly, the peak value of the analog reproduction signal a attributable to the carrier areas (a) and (b) is lowered to a value lower than the gain determination level Vth as shown by the broken line in FIG. 61(b).

In the event that the peak value of the analog reproduction signal a attributable to the bar code area is determined lower than the gain determination level Vth at step 245 (corresponding to the carrier areas (c) and (d) shown in FIG. 61(a)), and after the amplification factor of the amplifier 219 has been lowered at step 246, the program flow goes to step 247 at which the fluorescent mark 210 is digitized to the last code bar thereof.

Figure 62:
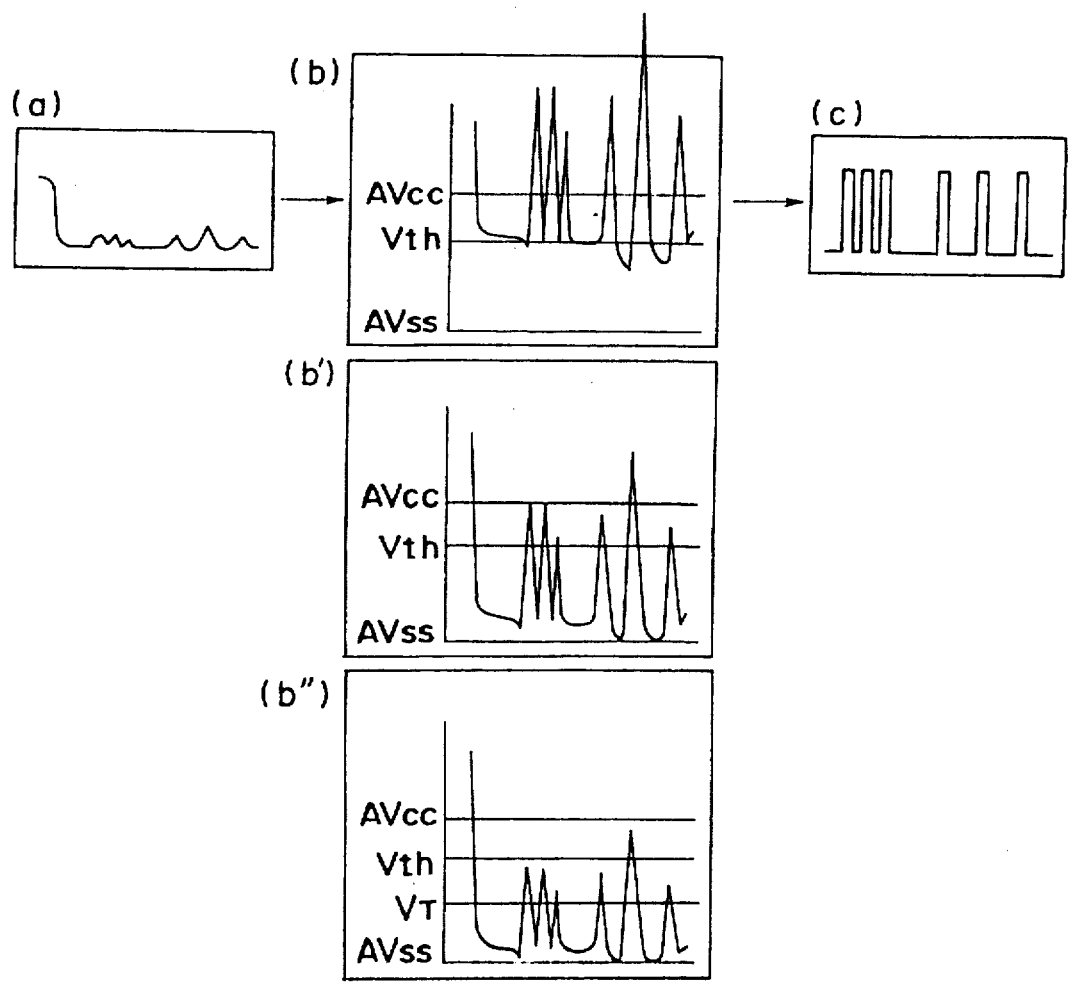
FIG. 62 is a flowchart showing the sequence of reading of the mark executed by the optical reading apparatus.

FIG. 62 illustrates the waveform of an output from the light receiving element 217, that of the analog reproduction signal outputted from the amplifier 219 and that of the binary signal outputted from the signal detector 223. FIG. 62(a) is a diagram showing the waveform of the output from the light receiving element 217, FIG. 62(c) is a diagram showing the waveform of the binary signal outputted from the signal detector 223, and FIG. 62(b) is a diagram showing the waveform of the analog reproduction signal outputted from the amplifier 219 when the first amplification setting unit 220 has been selected. FIG. 62(b') is a diagram showing the waveform of the analog reproduction signal outputted from the amplifier 219 when the second amplification setting unit 221 has been selected, and FIG. 62(b") is a diagram showing the waveform of the analog reproduction signal from the amplifier 219 when the third amplification setting unit 222 has been selected.

As can be seen from FIGS. 62(a) to 62(b"), if the amplification factor of the amplifier 219 is suitably changed depending on the level and the amplitude of the analog reproduction signal to thereby adjust the level and the amplitude of the analog reproduction signal to a predetermined value, the binary signal can be obtained by slicing the analog reproduction signal with a slice signal VT of a predetermined particular level.

Since the optical reading apparatus according to the eighth embodiment is so designed that the amplification factor of the amplifier 219 can be changed to one of three factors depending on the level and the amplitude of the analog reproduction signal a to thereby make the analog reproduction signal a match with the slice signal VT of the predetermined particular level at all times, there is no possibility that the signal reading from the mark would become inaccurate and/or impossible due to the difference in physical property of the carrier 211 and, therefore, the apparatus is excellent in versatility and reliability. Also, since the binary signal can be obtained by slicing the analog reproduction signal a with the single slice signal VT, the signal detector 223 can be made simple in structure.

Although in this embodiment the amplification factor of the amplifier 219 has been described as changed to one of the three factors depending on the level and amplitude of the analog reproduction signal a, the reflected light component from the carrier 211 and the fluorescent light component from the mark 210, it may be made to be changed to one of two or four or more factors. In addition, if an electronic potentiometer is employed for the amplification factor setting unit, a continuous change of the amplification factor of the amplifier 219 will be accomplished.

Optical Reading Apparatus: Embodiment 9

In the eighth embodiment described above, the reflector 231 has been disposed in face-to-face relation with both of the light emitting element 216 and the light receiving element 217. However, as shown in FIG. 63, in place of the use of the reflector 231, a light absorbent element 249 capable of absorbing the rays of light projected from the light emitting element 216 may be employed and disposed at the position confronting both of the light emitting and receiving elements 216 and 217 across the path 230 of travel of the carrier 211.

Figure 63:
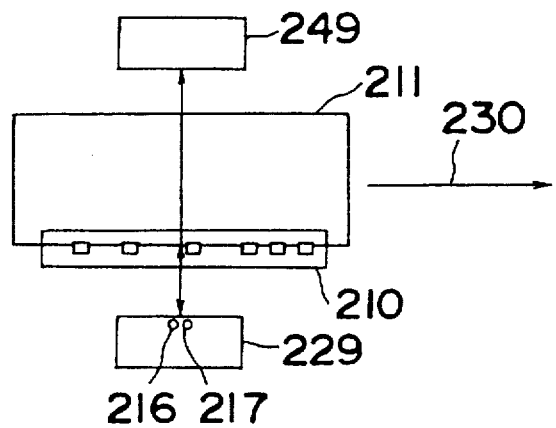
FIG. 63 is a schematic diagram showing the manner in which an Example 9 of the optical reading apparatus is arranged.
Figure 64A:
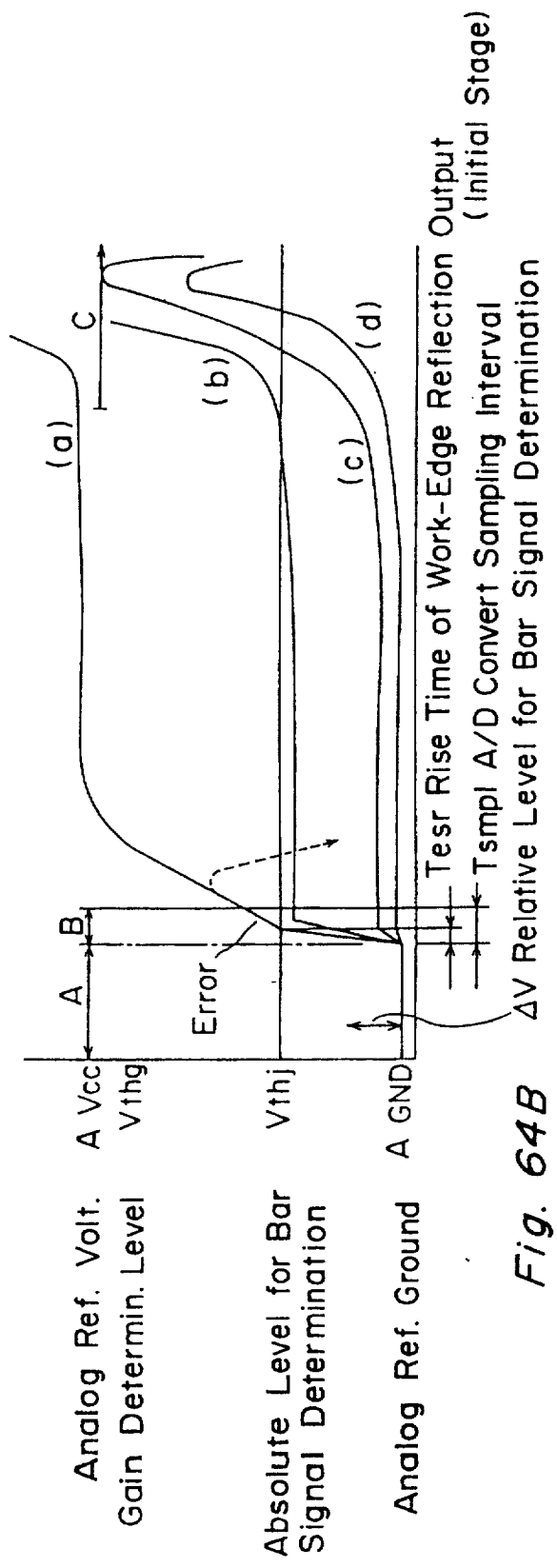
FIGS. 64A and 64B are diagrams showing waveforms of analog reproduction signals given by the optical reading apparatus of FIG. 63.
Figure 64B:
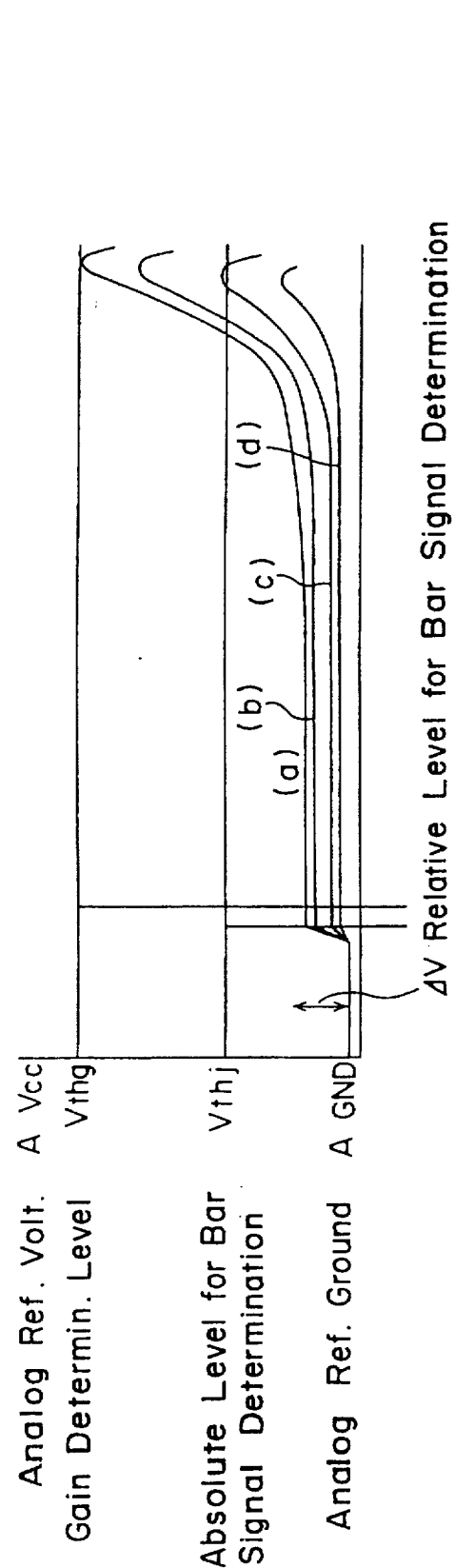

In the embodiment shown in FIG. 63, during a wait being made until the carrier 211 is moved past the reading station, the infrared rays of light projected from the light emitting element 216 are absorbed by the light absorbent element 249 with no light substantially impinging upon the light receiving element 217 and, therefore, as shown by an area A in FIG. 64(a), the analog reproduction signal a is substantially at a ground level AGND.

However, when the carrier 221 is brought to the reading station between the light emitting element 216 and the light absorbent element 249, a portion of the infrared rays of light from the light emitting element 216 is reflected by the carrier 211 so as to impinge upon the light receiving element 217 and, therefore, the analog reproduction signal a increases as shown by an area B in FIG. 64(a). When the mark 210 is subsequently brought in register with the reading station and is consequently irradiated by the infrared rays of light, the fluorescent light emitted from the fluorescent substance forming the mark 210 is received by the light receiving element 217 as well and, therefore, the analog reproduction signal a further increases as shown by an area C in FIG. 64(a). Accordingly, by determining if the level of the analog reproduction signal in the area B has exceeded the gain determination level Vth for the selection of the amplification factor and by lowering the amplification factor of the amplifier 219 in the event that it has exceeded such gain determination level Vth, the signal reproduction can be accomplished in a manner similar to that according to the previously discussed eighth embodiment.

Optical Reading Apparatus: Embodiment 10

Figure 65:
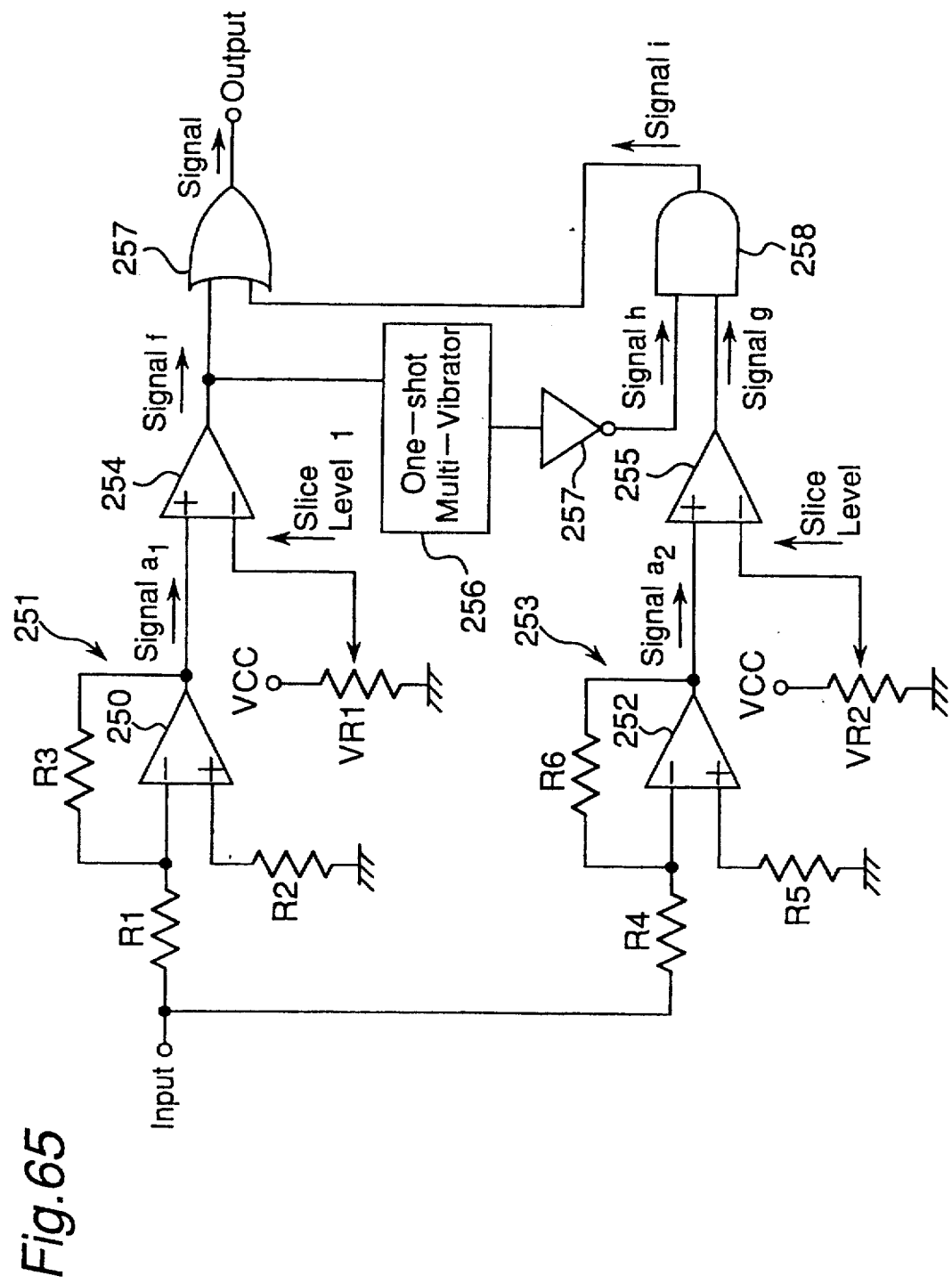
FIG. 65 is a circuit diagram showing amplifying and signal detecting units used in an Example 10 of the optical reading apparatus.

The details of the amplifier and the signal detector used in the tenth preferred embodiment of the optical reading apparatus are shown in FIG. 65. As shown therein, the optical reading apparatus comprises a first differential amplifier 251 including a first operational amplifier 25 and first to third resistors R1, R2 and R3; a second differential amplifier 253 including a second operational amplifier 252 and fourth to sixth resistors R4, R5 and R6; a first comparator 254 connected with the first operational amplifier 251; a first variable resistor VR1 for setting a slice level for the first comparator 254; a second comparator 255 connected with the second operational amplifier 253; a second variable resistor VR2 for setting a slice level for the second comparator 255; a one-shot multivibrator 256 adapted to be triggered by an output signal f from the first comparator 254 to generate a pulse of a predetermined pulse width each time it is triggered; an inverter 257 for inverting an output signal from the one-shot multivibrator 256; an AND gate 258 for providing a logical product of respective output signals g and h from the second comparator 255 and the inverter 257; and an OR gate for providing a logical sum of respective output signals i and f from the AND gate 258 and the first comparator 254.

According to the tenth embodiment, the amplification factor of the first differential amplifier 251 and that of the second differential amplifier 253 are adjusted to be low and high, respectively, and the slice level of the first comparator 254 is equalized to that of the second comparator 255. The pulse width of the pulse outputted from the one-shot multivibrator 256 is adjusted to a value equal to the length of time required for the irradiating light to scan the narrowest stripe between the neighboring code bars forming the fluorescent mark (bar code).

The operation of the optical reading apparatus will now be described.

Figure 66:
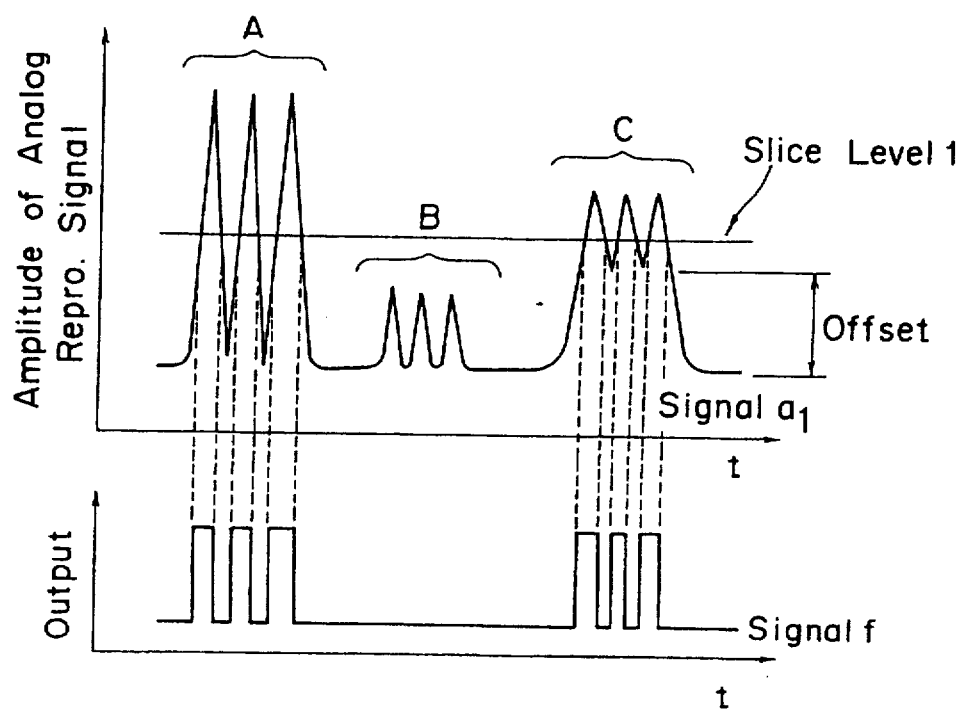
FIG. 66 is a diagram showing waveforms of an analog reproduction signal outputted from a first differential amplifier used in the optical reading apparatus of FIG. 63.

FIG. 66 illustrates the waveform of a first analog reproduction signal a1 outputted from the first differential amplifier 251. Reference character A in FIG. 66 represents the signal obtained when the level of the light reflected from a surface of the carrier is low and the level of the fluorescent light from the mark is high; reference character B represents the signal obtained when the level of both of the light reflected from the carrier and the fluorescent light from the mark is low; and reference character C represents the signal obtained when the level of the reflected light from the carrier and that of the fluorescent light from the mark are high and low, respectively. When this first analog reproduction signal a1 is digitized by the first comparator 254, such a binary signal f as shown in FIG. 68(a) can be obtained.

Figure 67:
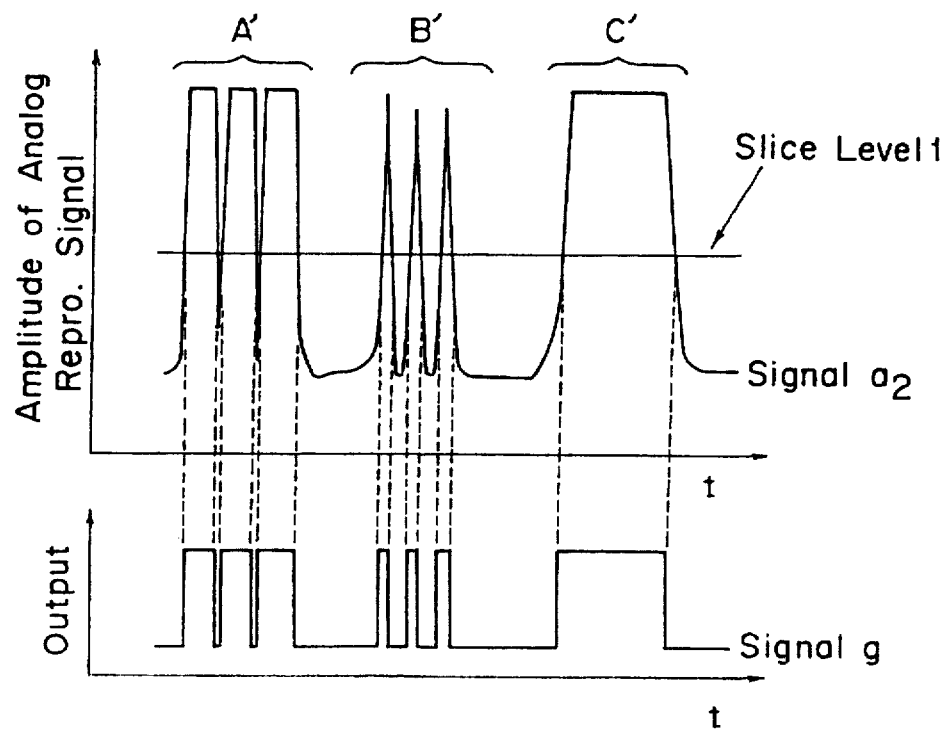
FIG. 67 is a diagram showing waveforms of an analog reproduction signal outputted from a second differential amplifier used in the optical reading apparatus of FIG. 63.

FIG. 67 illustrates the waveform of a second analog reproduction signal a2 outputted from the second differential amplifier 253. Reference characters A', B' and C' used in FIG. 67 corresponds respectively to A, B and C shown in FIG. 66. Thus, when the second analog reproduction signal a2 is similarly digitized by the second comparator 255, such a binary signal g as shown in FIG. 68(b) can be obtained.

The output signal h from the inverter 257 is such as shown in FIG. 68(c) since the pulse width of the pulse outputted from the one-shot multivibrator 256 is chosen to be equal to the length of time required for the exciting light to scan the narrowest stripe between the neighboring code bars forming the fluorescent mark (bar code). Accordingly, the logical product of the output signals g and h respectively from the second comparator 255 and the inverter 257 which is obtained from the AND gate 258 is represented by an output signal i from the AND gate 258, the waveform of which is shown in FIG. 68(d). Also, the logical sum of the output signals i and f respectively from the AND gate 258 and the first comparator 254 which is obtained from the OR gate 259 is represented by an output signal j from the OR gate 259, the waveform of which is shown in FIG. 68(e), and, accordingly, a bar code signal can be detected.

According to the tenth embodiment, the binary signal corresponding to the whole analog reproduction signals is obtained by preparing separately the first binary signal f corresponding to the detected signal of a high level and the second binary signal g corresponding to the detected signal of a low level and then providing the logical product and sum of those signals. Accordingly, even though the detected signal descriptive of a series of marks formed on the single carrier varies partly in level, an accurate information reading is possible.

While in the embodiment described above, the two comparators 254 and 255 have been described as having an equal slice level, the slice level of one of the comparators 254 and 255 may differ from that of the other of the comparators 254 and 255.

Optical Reading Apparatus: Embodiment 11

An eleventh embodiment differs from the optical reading apparatus of FIG. 65 in that the two differential amplifiers 251 and 253 have an equal amplification factor and the two comparators 254 and 255 have slice levels different from each other.

Figure 69:
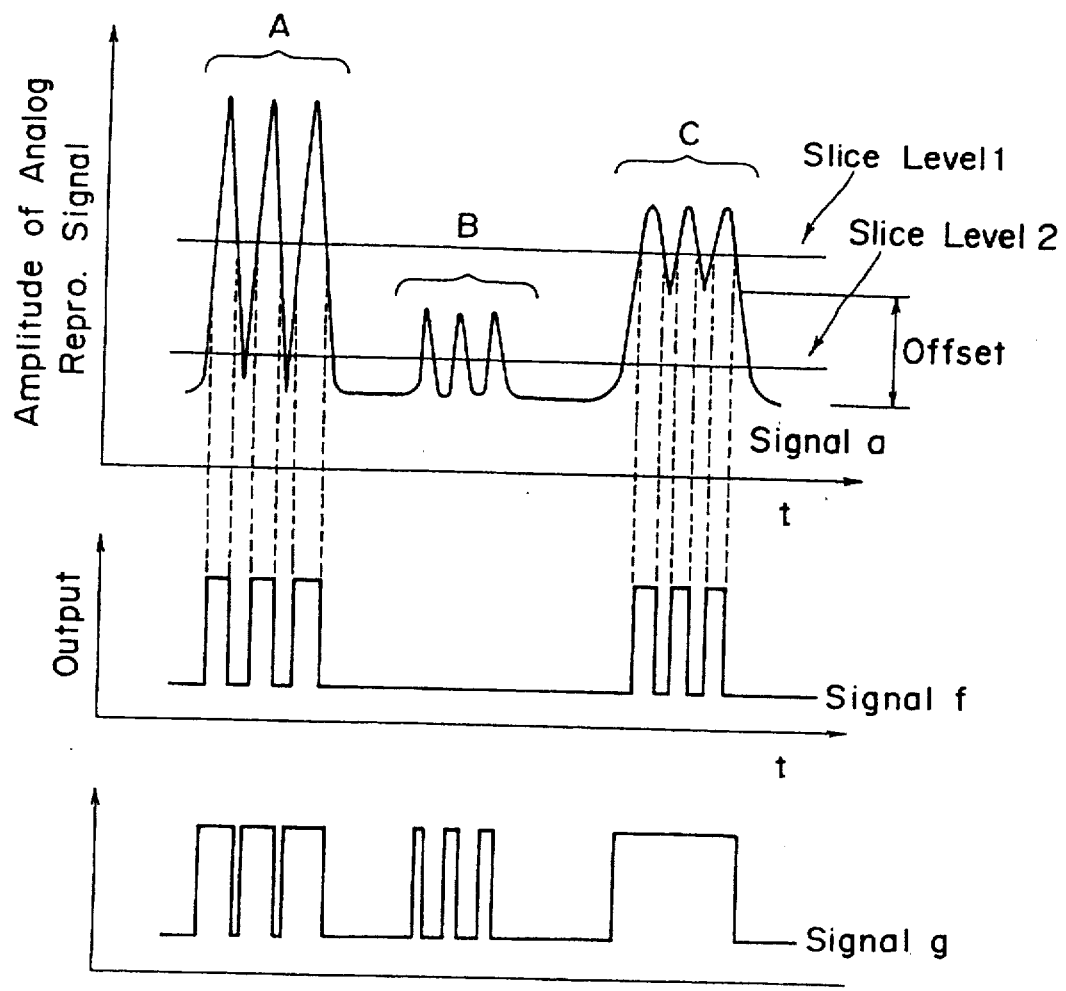
FIG. 69 is an explanatory diagram showing how the signal is digitized to provide the binary signal in an Example 11 of the optical reading apparatus.
Figure 70:
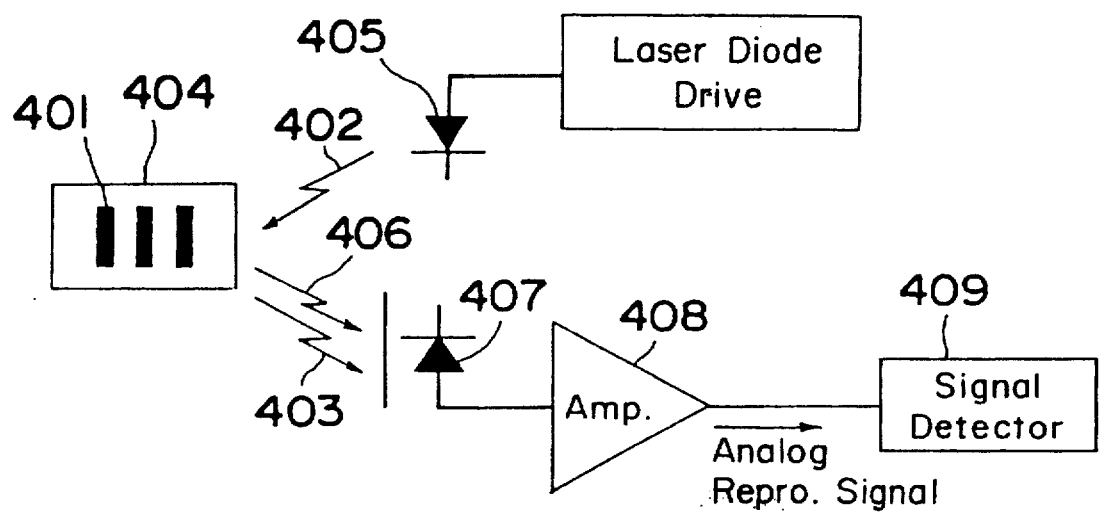
FIG. 70 is an explanatory diagram showing the structure of the prior art optical reading apparatus.
Figure 71:
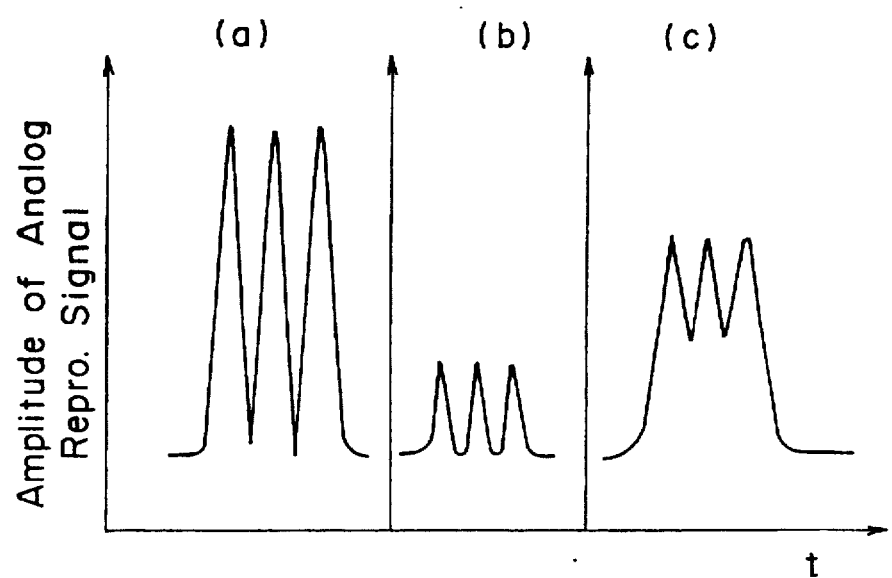
FIG. 71 is a diagram showing analog reproduction signals appearing in the prior art optical reading apparatus.

As shown in FIG. 69, the analog reproduction signals a outputted respectively from the first and second differential amplifiers 251 and 252 are of an equal level and are sliced respectively by the first slice signal Si, set in the first comparator 254, and the second slice signal S2 set in the second comparator 255.

The first slice signal Si slices high level portions A and C of the analog reproduction signal a to provide a binary signal f corresponding to that shown in FIG. 6(a). On the other hand, the second slice signal S2 slices a low level portion of the analog reproduction signal a to provide a binary signal g corresponding to that shown in FIG. 68(d). Accordingly, when the logical sum of the output signals f and g respectively from the first comparator 254 and the second comparator 255 is obtained from the OR gate 258, the output signal j shown in FIG. 68(e) can be obtained and, therefore, the mark information can be assured read from the detected signal then varying partly in level.

It is to be noted that although in each of the tenth and eleventh embodiments reference has been made to the use of the two differential amplifiers and the two comparators, the number of each of the differential amplifiers and the comparators may further be increased. The greater the number of each of the differential amplifiers and the comparators, an accurate information reading is possible from the detected signal or the analog reproduction signal which is more complicated.

INDUSTRIAL APPLICABILITY

The optical reading system of the present invention is applicable in the following applications and has the following features.

a) Factory Automation:

During automobile assemblage, car management, that is, classification of cars according to the brand, export destination, date of manufacture and/or product lot number, can be accomplished using a fluorescent mark without adversely affecting the appearance of each car.

b) Even if the fluorescent marking is printed on a black-color item such as tires or on a transparent item of glass or synthetic resin, which has hitherto been unable to read with the prior art reflective bar code, the mark can be assured read out.

c) Since even if any ornamental design is printed over the fluorescent mark, such fluorescent mark can readily be read out, a plurality of pieces of information can be overlapped one above the other and, therefore, a limited space such as found in a price tag or a product tag of the merchandise can be effectively utilized.

d) By a reason similar to (a) and (b) above, effective utilization is possible to products such as cosmetics and medicines, the design of which is considered of importance, or to boxes or packages which are required for a high quality sensation to be appealing.

e) Even under the environment in which the prior art reflective bar code cannot be used due to the presence of oil and dust such as found in a factory or plant, the fluorescent mark can assuredly be read out.

f) By a reason similar to (a) and (b) above, for the convenience on the part of a manufacturer, a concealed code may be provided on invoices issued to clients for management purpose. (In general, the invoices are specified by clients or of a format in which a client writes down.)

g) Information may be provided on a card-like item as a concealed code so that the card-like item can be used as a game card (bar code game).

h) By a reason similar to (a) and (c), if used in connection with management of books, literature or drawings, the design will not be adversely affected.

i) Not only can any possible forgery of a student's certificate or an ID card be prevented, but also the certificate or ID card can be reduced in size or space.

k) Not only can any possible forgery of a stamp card or a point card be prevented, but also the card can be reduced in size or space.

l) Any possible forgery can be prevented by introducing the system of the invention in a Pachinko gift-exchange system.

What is claimed is:

1. An inked ribbon characterized in that it comprises a tape-like carrier deposited with a fluorescent composition comprising a fluorescent substance containing at least one of Nd and Yb as an optical active element and, other than this optical active element, at least one oxide of one of Mo and W and an alkaline earth metal, which fluorescent substance is dispersed and retained in an organic binder, wherein the organic binder is a mixture of wax and resin, and wherein the fluorescent substance has an average particle size of not more than 1 micron.

2. The inked ribbon as defined in claim 1, wherein the length of time required for the intensity of an afterglow, emitted by the fluorescent substance, to attain 10% of the maximum intensity of a fluorescent light subsequent to interruption of irradiation of an exciting light is within 500 μsec.

3. The inked ribbon as defined in claim 1, wherein the yield of the fluorescent substance when the fluorescent substance is immersed in water for 500 hours and is subsequently dried after removal from the water is not smaller than 95 wt %.

4. The inked ribbon as defined in claim 1, wherein the atomic ratio of the optical active element relative to at least one oxide of Mo or W is higher than zero, but equal to or lower than 2.

5. The inked ribbon as defined in claim 1, wherein the atomic ratio of the alkaline earth metal relative to at least one oxide of Mo or W is higher than zero, but equal to or lower than 3.

6. The inked ribbon as defined in claim 1, wherein the fluorescent substance has the following general formula:

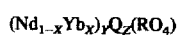

(Nd$_{1-x}$Yb$_x$)$_y$Q$_z$(RO$_4$)

wherein Q represents at least one element selected from the group consisting of Ca, Mg, Sr and Ba; R represents at least one element selected from the group Mo and W; X represents a value within the range of 0 to 1; Y represents a value greater than 0, but smaller than 1; and Z represents a value greater than 0, but smaller than 1.

7. The inked ribbon as defined in claim 1, wherein the fluorescent substance has the following general formula:

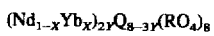

(Nd$_{1-x}$Yb$_x$)$_{2y}$Q$_{8-3y}$(RO$_4$)$_8$ wherein Q represents at least one element selected from the group consisting of Ca, Mg, Sr and Ba; R represents at least one element selected from the group Mo and W; X represents a value within the range of 0 to 1; and Y represents a value greater than 0, but equal to or smaller than 8/3.

8. The inked ribbon as defined in claim 7, wherein X and Y in the general formula are within the range of 0.02 to 0.6 and within the range of 1/3 to 5/3, respectively.

9. The inked ribbon as defined in claim 1, wherein the alkaline earth metal is Ca.

10. The inked ribbon as defined in claim 1, wherein the resin is at least one selected from the group consisting of a copolymer of polyvinyl chloride and vinyl acetate, a copolymer of ethylene and vinyl acetate, polyester resin, polyurethane resin and polycarbonate resin.

* * * * *

Disclaimer

6,688,789—Toshio Oshima, Osaka (JP); Yukinori Yamada, Toride (JP); Takanori Kamoto, Takatsuki (JP); Tomio Nabeshima, Suita (JP). FLUORESCENT SUBSTANCE, FLUORESCENT COMPOSITION, FLUORESCENT MARK CARRIER AND OPTICAL READER THEREFOR. Patent dated February 10, 2004. Disclaimer filed by the assignee May 3, 2005, Hitachi Maxell, Ltd.

Hereby disclaims the terminal part of said above-identified patent that would extend beyond July 9, 2015 of said patent.

*(Official Gazette, July 26, 2005)*